United States Patent [19]

Carney et al.

[11] Patent Number: 5,537,435
[45] Date of Patent: Jul. 16, 1996

[54] TRANSCEIVER APPARATUS EMPLOYING WIDEBAND FFT CHANNELIZER WITH OUTPUT SAMPLE TIMING ADJUSTMENT AND INVERSE FFT COMBINER FOR MULTICHANNEL COMMUNICATION NETWORK

[76] Inventors: Ronald Carney, 916 Flower St. NW., Palm Bay, Fla. 32907; Terry Williams, 204 Ash Ave., Melbourne Beach, Fla. 32951

[21] Appl. No.: 224,754

[22] Filed: Apr. 8, 1994

[51] Int. Cl.⁶ .................... H04B 1/38; H04L 5/16
[52] U.S. Cl. .............. 375/219; 375/232; 375/233; 375/260; 370/29; 370/23; 370/70
[58] Field of Search ................... 375/229–233, 375/219, 259, 260; 370/18, 29, 23, 58.1, 123, 70, 97

[56] References Cited

U.S. PATENT DOCUMENTS

| | | |
|---|---|---|
| 4,316,282 | 2/1982 | Macina . |
| 4,785,447 | 11/1988 | Ichiyoshi . |
| 4,881,191 | 11/1989 | Morton . |
| 5,289,464 | 2/1994 | Wang . |
| 5,299,192 | 3/1994 | Guo et al. ................... 370/70 |
| 5,323,391 | 6/1994 | Harrison . |

FOREIGN PATENT DOCUMENTS

| | | |
|---|---|---|
| 0501690 | 9/1992 | European Pat. Off. . |
| 0549451 | 6/1993 | European Pat. Off. . |
| 9410772 | 5/1994 | WIPO . |

OTHER PUBLICATIONS

Bonnerot, et al., "Digital Processing Techniques in the 60 Channel Transmultiplexer", IEEE Transactions on Communications vol. COM-26, May 1978, pp. 698–706.

Bellanger, et al., "TDM–FDM Transmultiplexer: Digital Polyphase and FTT", IEEE Transactions on Communications, vol. COM-22, Sept. 1974, pp. 1199–1205.

Bakhru, "Multi–Channel Digital Sonobouy Receiver", in MILCOM 90: IEEE Military Communications Conference Record, (New York: Institute of Electrical and Electronic Engineers, 1990), vol. 3, pp. 1250–1255.

Chester, et al., "Implementation of a Wide Band, High Dynamic Range Digital Drop Receiver", IEEE Proceedings of ICASSP 91, May 14–17, 1991.

Olmstead et al., "A Digital Tuner for Wideband Receivers", DSP Applications Magazine, Sept., 1992.

(List continued on next page.)

*Primary Examiner*—Stephen Chin
*Assistant Examiner*—Don Vo

[57] ABSTRACT

A physically compact, multichannel wireless communication transceiver architecture employs overlap and add or polyphase signal processing functionality, for wideband signal processing, together with a sample rate. A receiver section receives a plurality of multiple frequency communication channels and outputs digital signals representative of the contents of the plurality of multiple frequency communication channels. The receiver section contains an FFT-based channelizer that processes the digital signals output by a wideband digital receiver and couples respective channel outputs to a first plurality of digital signal processor units, which process (e.g. demodulate) respective ones of the digital channel signals and supply processed ones of the digital channel signals at respective output ports for distribution to an attendant voice/data network. On the transmit side, a transmit section contains a plurality of digital signal processors, respectively associated with respective ones of a plurality of incoming (voice/data) communication signals to be transmitted over respectively different frequency channels. Their processed (modulated, encoded) outputs are supplied to an inverse FFT combiner. The FFT combiner supplies a combined multichannel signal to a wideband transmitter which transmits a multiple frequency communication channel signal. Each of the channelizer and combiner may be implemented using overlap and add or polyphase filtering.

67 Claims, 29 Drawing Sheets

OTHER PUBLICATIONS

Haoui et al., "An All Digital Timing Recovery Scheme for Voice Band Data Modems", IEEE International Conference on Acoustics, Speech and Signal Processing, 1987, pp. 1911–1914.

Armstrong et al., "Symbol Synchronization Using Single Samples and Interpolation", IEEE Transactions on Communications, vol. 41, No. 2, Feb., 1993, pp. 318–321.

Gardner, F. M., "Interpolation in Digital Modems–Part I: Fundamentals", IEEE Transactions on Communications, Vol. 41, No. 3, Mar., 1993.

Gardner, et al., "Interpolation in Digital Modems–Part II: Implementation and Performance", IEEE Transactions on Communications, vol. 41, No. 6, Jun., 1993, pp. 998–1008.

Danesfahani et al, "Multirate extensions to COSSAP and lessons learnt from developing advanced models", IEE Colloquium on 'Communications Simulations and Modelling Techniques, 28 Sep., 1993, London, GB, pp. 7.1–7.6.

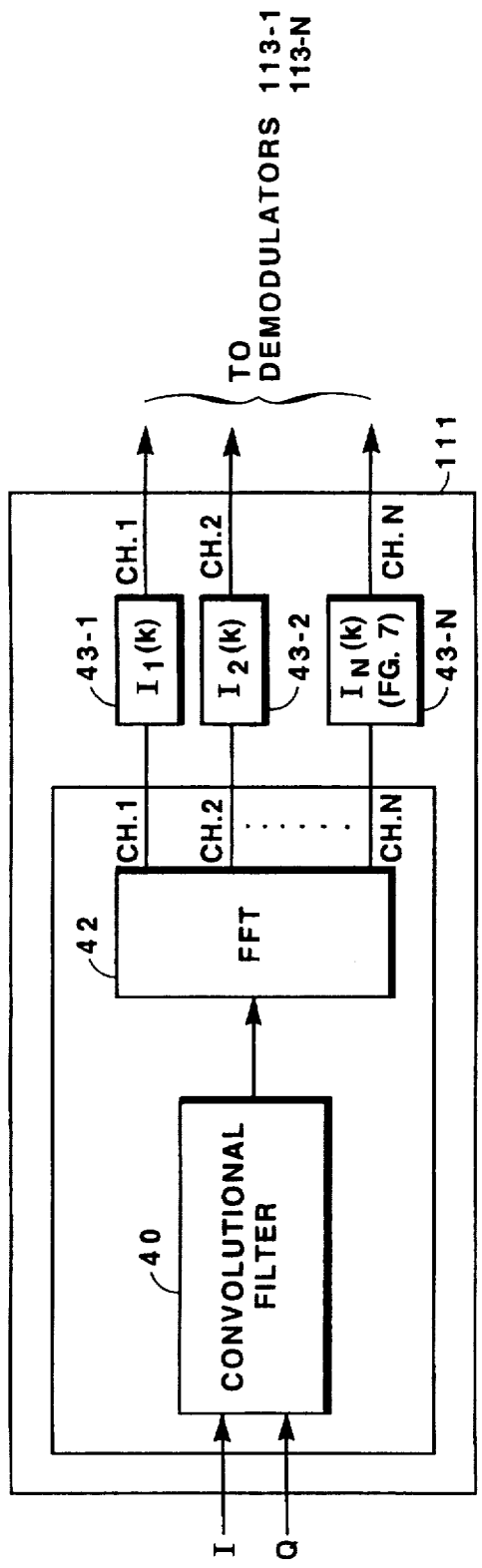
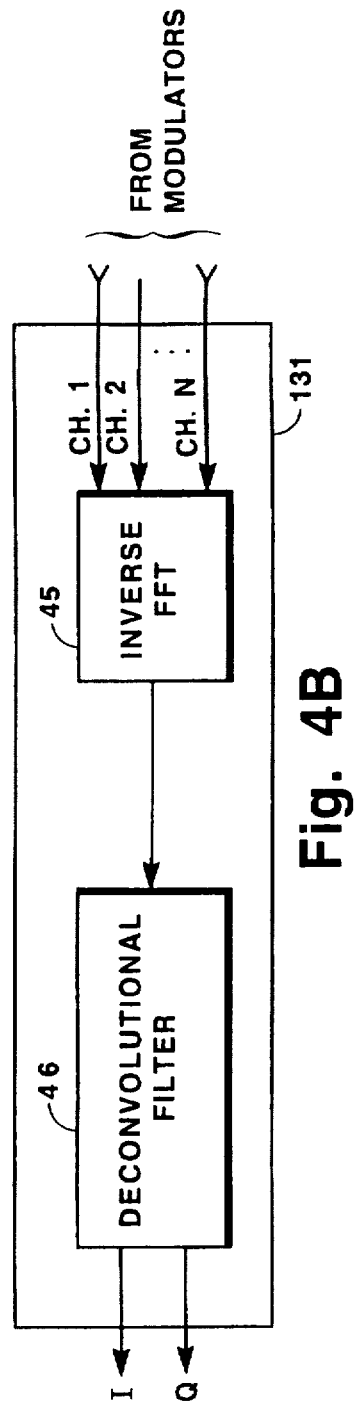
Fig. 4A
Fig. 4B

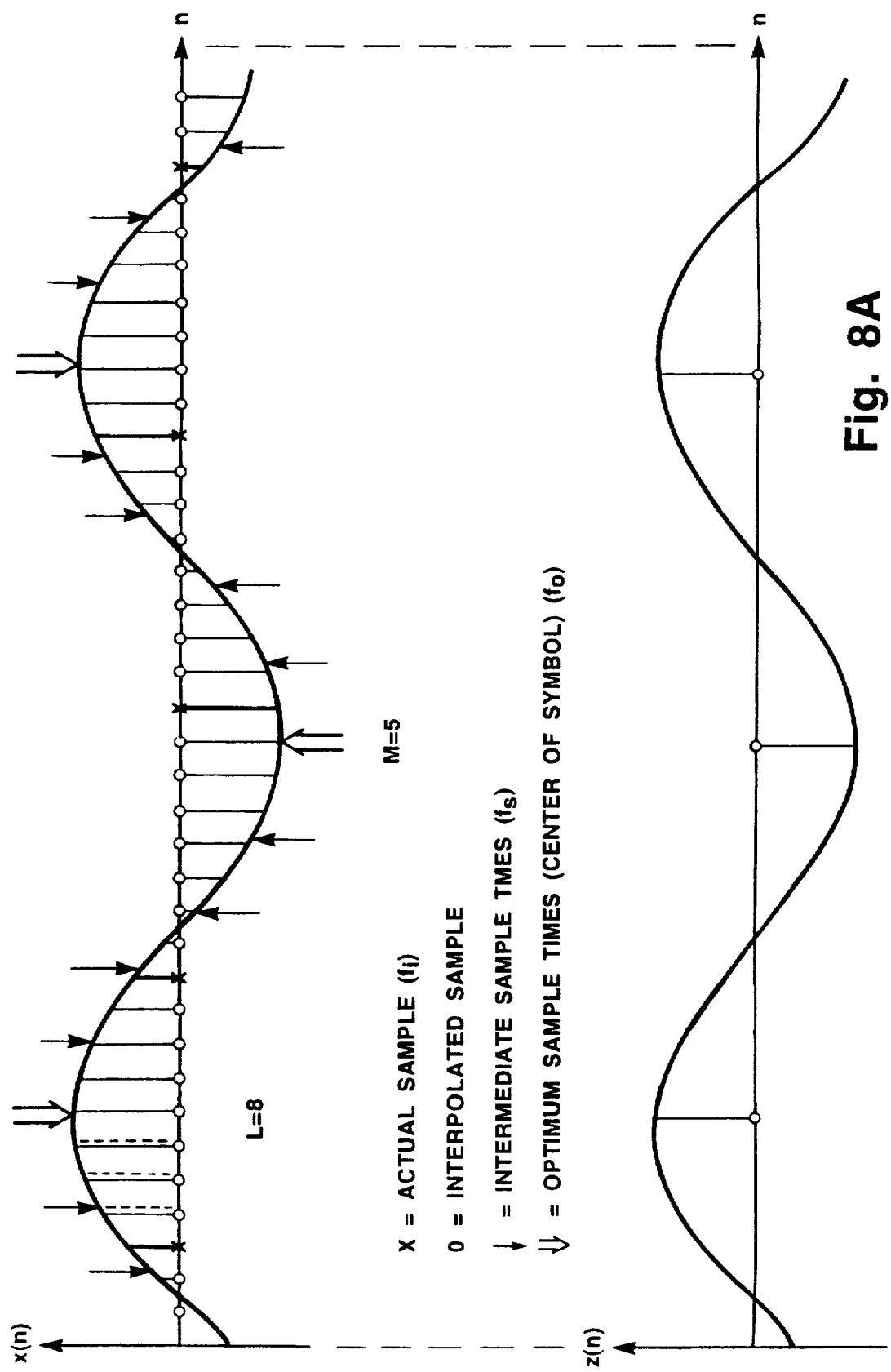

Fig. 11A

L = 8
g = 4  {# TAPS PER $h_p(x)$}

$$\mu = \frac{f\{X(n)\}}{f\{Z(n)\}} = \frac{45 \text{ksps}}{24.3 \text{ ksps}} = 1.851$$

Fig. 11B

(TWO x(o)'s PER SYMBOL)

$$\mu = \frac{f\{X(n)\}}{f\{Z(n)\}} = \frac{45 \text{ ksps}}{48.6 \text{ ksps}} = 0.925$$

TRANSCEIVER APPARATUS EMPLOYING WIDEBAND FFT CHANNELIZER WITH OUTPUT SAMPLE TIMING ADJUSTMENT AND INVERSE FFT COMBINER FOR MULTICHANNEL COMMUNICATION NETWORK

FIELD OF THE INVENTION

The present invention relates in general to wireless communication networks (e.g. cellular and personal communication systems (PCS)) and is particularly directed to a new and improved transceiver apparatus, a receiver section of which contains a wideband, fast Fourier transform based (FFT) channelizer to extract multiple channels from a digitized intermediate frequency (IF) signal, and a set of digital sample rate converters to effect optimum sample timing adjustment for each channel and a transmitter section of which contains a wideband inverse FFT based combiner to combine multiple digitized baseband channels into a single IF signal for transmission.

BACKGROUND OF THE INVENTION

In order to provide multi-channel voice and data communications over a broad geographical area, wireless (e.g. cellular) communication service providers currently install transceiver base-stations in protected and maintainable facilities (e.g. buildings). Because of the substantial amount of hardware currently employed to implement the signal processing equipment for a single cellular channel, each base-station is typically configured to provide multichannel communication capability for only a limited portion of the frequency spectrum that is available to the service provider. A typical base-station may contain three to five racks of equipment which house multiple sets of discrete receiver and transmitter signal processing components in order to service a prescribed portion (e.g. 48) of the total number (e.g. 400-30 kHz) channels within an available (e.g. 12 MHz) bandwidth. The receiver section of a typical one of a base-station's plurality (e.g. 48) of narrowband (30 kHz) channel units is diagrammatically illustrated in FIG. 1 as comprising a dedicated set of signal processing components, including a front end, or down-conversion section 10, an intermediate frequency (IF) section 20 and a baseband section 30.

The front end section 10 is comprised of a low noise amplifier 11 to which an antenna 12 at the transceiver site is coupled, a radio frequency-to-intermediate frequency (RF-IF) down-converting mixer 13 and an associated IF local oscillator 15. The IF section 20 is comprised of a bandpass filter 21 to which the output of mixer 13 is coupled, an amplifier 23, an if-baseband mixer 25 and an associated baseband local oscillator 27. The bandpass filter 21 may have a bandwidth of 100 kHz centered at a respective one of the 400-30 kHz sub-portions of a 12 MHz wide cellular voice/data communication band, diagrammatically illustrated in the multichannel spectral distribution plot of FIG. 2.

The baseband section 30 contains a lowpass (anti-aliasing) filter 31, an analog-to-digital (A-D) converter 33, a digital signal processing unit 35 which functions as a demodulator and error corrector, and an associated telephony (e.g T1 carrier) unit 37 through which the processed channel signals are coupled to attendant telephony system equipment. The sampling rate of the A-D converter 33 is typically on the order of 75 kilosamples/sec. The narrowband channel signal as digitized by A-D converter 33 is demodulated by digital signal processing (DSP) unit 35 to recover the embedded voice/data signal for application to telephony carrier unit 37. (A similar dedicated signal processing transmitter section, complementary to the receiver section, is coupled to receive a digital feed from the telephony system equipment and output an up-converted RF signal to the transceiver site's antenna.)

For a typical urban service area, in order to optimize service coverage within the entire bandwidth (e.g. 12 MHz) available to the service provider, and to ensure non-interfering coverage among dispersed transceiver sites at which the base-stations are located, cellular transceiver sites are customarily geographically distributed in mutually contiguous hexagonal cells (arranged in a seven cell set). Thus, each cell has its own limited capacity multi-rack base-station that serves a respectively different subset of the available 400 channels, whereby, over a broad geographical area, the frequency allocation within respective cells and the separation between adjacent cell sets may be prescribed to effectively prevent mutual interference among any of the channels of the network.

It will be readily appreciated that, since every channel has components spread over multiple equipment racks, such as those that make up a typical channel receiver section described above with reference to FIG. 1, and thus the cost and labor in geographically situating, installing and maintaining such equipment are not insubstantial. Indeed, the service provider would prefer to employ equipment that would be more flexible both in terms of where it can be located and the extent of available bandwidth coverage that a respective transceiver site can provide. This is particularly true in non-urban areas, where desired cellular coverage may be concentrated along a highway, for which the limited capacity of a conventional 48 channel transceiver site would be inadequate, and where a relatively large, secure and protective structure for the multiple racks of equipment required is not necessarily readily available.

Although wideband receivers have been used in certain other applications in the past, there are perhaps several reasons why they have not found widespread use in multichannel systems such as cellular and other PCS systems. One such concern has to do with the fact that each channel signal being received is a digitally encoded signal consisting of a series of symbols. In such an instance, the recovery algorithms used by the digital signal processor 35 typically require that the samples provided by the A-D converter 33 be taken at or near the time of peak amplitude of each symbol, in order to maximize the probability of correctly detecting each symbol.

In the prior art systems as discussed above, synchronization of a local clock to the optimum sampling time is fairly straightforward. That is because each channel is processed separately, and thus the channel signal output by the A-D converter 33 represents information from only one channel. Thus, the local receiver clock may be synchronized by using well-known phase-locked loop (PLL) techniques to generate a clock strobe for the A-D converter 33 which is synchronized to the symbol rate.

If the system uses a wideband front end, however, such that the low pass filter 31 covers the bandwidth occupied by several channels, then signals from more than one channel will be present in the output of the A-D converter 33. In a typical cellular or other PCS system, there is no requirement that the channel signals be synchronized with each other. Thus, there is no single optimum sampling time, and conventional phase locking techniques cannot be used to synchronize the A-D converter 33.

Additionally, even if it were possible to independently control the rate at which samples of the multiple digital channel signals are taken, this rate typically cannot be guaranteed to be an integer multiple of the symbol rate. This exacerbates the problem of properly synchronizing the sampling of the symbols in each digital channel signal, since even a very small difference in the rate of the digital symbols will quickly accumulate over the duration of even a short-duration channel signal, thereby again skewing the sample timing.

SUMMARY OF THE INVENTION

In accordance with the present invention, the limited channel capacity and substantial hardware requirements associated with signal processing architectures currently employed by multichannel wireless communication service providers, as well as the sample rate synchronization problems described above, are effectively obviated by a new and improved, relatively compact multichannel transceiver apparatus that makes it possible to significantly reduce the size and hardware complexity of a wireless (voice and data) communication network transceiver site.

The transceiver may thus be readily physically accommodated at a variety of installation sites, such as above the drop ceiling in an office building or on an electric utility pole, while having the capability of providing multichannel communication service (e.g. greater than one hundred channels) that spans the entire channel capacity offered by the service provider, rather than only a subset of the available channels.

For this purpose, the transceiver apparatus of the present invention contains a receiver section having a wideband Discrete Fourier Transform (DFT) channelizer for processing multiple channels of digitized received signals, and a transmitter section which contains a wideband inverse DFT combiner for processing multiple digitized transmit channel signals. Pursuant to the preferred embodiment, the DFT channelizer and DFT combiner may be implemented as, but are not restricted to, a fast Fourier transform (FFT), whereas the fast Fourier transform is an efficient algorithm for computing the discrete Fourier transform when the size of the transform is a power of two.

The multichannel receiver unit is operative to receive a plurality of input communication channel signals and to output digital signals representative of the contents of the plurality of input communication channel signals. A DFT-based channelizer unit is coupled to receive the digital signals output by the multichannel receiver unit and outputs respective digital channel signals representative of the contents of respective ones of the communication channels received by the multichannel receiver unit.

The digital channel signals output by the DFT-based channelizer are then fed to a set of sample rate converters, with one sample rate converter for each respective communication channel, The rate converters operate by determining interpolated digital channel signal values that are positioned in time such that optimum sampling of each channel occurs, even when the rate at which the digital channelizer provides output samples is not an integral multiple of the symbol rate.

In the preferred embodiment, each rate converter is implemented as a decimating, linear phase, low-pass digital filter, such as a finite impulse response (FIR) filter, wherein the filter coefficients for each channel are individually selected by determining a sampling phase differential during a preamble portion of each digital channel signal.

The respective interpolated digital channel outputs are then supplied to a first plurality of digital signal processor units, with a respective digital signal processor unit being associated with each of the digital channel signals output by the channelizer. The digital signal processor units process (e.g. demodulate) respective ones of the digital channel signals and then supply processed ones of the digital channel signals at respective output ports for distribution to an attendant voice/data network.

On the transmit side, the transceiver includes a second set of digital signal processor units, respectively associated with respective ones of a plurality of incoming (voice/data) communication signals to be transmitted over respectively different frequency channels, and being operative to process respective ones of the plurality of incoming communication signals and to supply processed ones of the communication channel signals at respective output ports for application of an inverse DFT processing combiner unit. The inverse DFT-based combiner unit is coupled to receive communication channel signals processed by the second plurality of digital signal processor units and outputs a combined signal representative of the contents of the communication channel signals processed by the second plurality of digital signal processor units.

A multichannel transmitter unit then, in turn, transmits a multiple frequency communication channel signal in accordance with the combined signal output by the discrete Fourier transform-based combiner unit.

More particularly now, in accordance with the invention, the DFT-based channelizer and combiner employed in the transmit and receive paths make use of convolutional and deconvolutional filters which may be implemented as overlap and add filter units or as polyphase filter units.

Pursuant to a first embodiment of the invention, the wideband channelizer employs an overlap and add filter structure together with an FFT processor to generate the digital channel signals. In this embodiment, digitized data samples output by a high speed A-D converter in the wideband receiver are applied first to an overlap and add unit. As received data samples are fed to an input rate buffer, the data is monitored by an amplitude monitor unit for the purpose of providing gain control for the input signals and ensuring full utilization of the dynamic range of the A-D converter. (For this purpose, the output of the amplitude monitor unit is fed back to the wideband receiver to control an attenuator that is upstream of the A-D converter.)

When the rate buffer contains a complete 'block' of M data samples, it signals a control unit to begin processing the block. The number, M, of samples of data in a block is equal to the decimation rate of the channelizer, which is given by the nearest integer of the input sample rate divided by two times the complex channel sample rate.

When the input sample rate is large (on the order of 30 MHz), a half band-filter may also be employed to reduce the clock rate of the data. The half band filter performs a real-to-complex conversion of the data and also decimates the data and clock rate by two. The clock reduction is necessary to implement the filtering structure with present day integrated circuits. If the input clock rate were significantly lower or, as the processing capability of future technologies increases, the half band filter may not be necessary.

The M samples are clocked out of the rate buffer into to the half band filter in bursts at a rate higher than the input sample clock rate, in order to accommodate the size of the FFT processor, which requires N samples, where N is greater than M. This implies that the overlap and add filter must operate at a clock rate faster than one-half the input sample rate.

The complex data values from the half band filter are clocked to a shift register employed within the overlap and add filter. The overlap and add filter is a real valued low pass filter with a cutoff frequency of one-half of the channel bandwidth. The basic architecture of the overlap and add filter is similar to that of a finite impulse response (FIR) filter. However, the filter of the invention differs from a conventional FIR filter by the use of feedback multiplexers and long delay line elements between filter taps.

More particularly, a shift register in the overlap and add filter is preferably implemented by cascading sets of delay memory units with interleaved 'feedback' multiplexers. A respective tap, or stage of the filter is formed of a pair of serially coupled memory sections, a feedback multiplexer, a coefficient memory and a coefficient multiplier. Each coefficient memory stores a respective set of filter coefficients, the number of which corresponds to the size of the FFT processor to which the output of the overlap and add filter is to be sent.

In an exemplary embodiment of the channelizer filter structure, four overlap and add filter tap stages may be employed. The outputs of the multipliers of the respective tap stages are summed together. Within a memory section, the length of an input memory stage is equal to the decimation rate M; the length of an output memory stage represents the filter 'overlap' is equal to N-M, where N is the size of the FFT processor.

In order for the FFT processor to process each block of M input samples, N clock signals are required, to supply the FFT processor with a sufficient number of data samples for FFT processing. During the first M of the N clock signals, M samples are clocked through a rate buffer and a half band filter and through the filter's memory stages that effectively for a shift register. During this time frame, data is shifted from left to right through each of the memory sections of the shift register. For the remaining N-M ones of the N data samples, data is not docked out of the rate buffer memory and there is not shifting of data through the input memories of each tap stage. Namely, data is not shifted through the shift register, as only the output memories are clocked. This clocking of the output memories is the mechanism used to effect the intended overlap and add operation.

As respective sets of coefficient-weighted data samples generated by the filter's tap stages are summed, they produce an N-sample, aliased, convolved output data sequence at the output of the overlap and add filter. This data sequence is in turn stored in a random access memory (RAM) in preparation for application to the FFT processor.

In order to maintain throughput for high processing rates, the FFT processor typically contains a plurality of FFT engines that have been programmed with the proper FFT size associated with the signal processing parameters of interest. Implementing the FFT processor with plural engines maintains data throughput as the processing time for a single engine is typically longer than the time required to collect N samples required for processing.

In accordance with a practical embodiment, the FFT engines may employ a radix-4 (block floating point) algorithm having FFT sizes that are a power of four. For a 512 point FFT processor, production of all 512 frequency bins is carried out by using two 256-point FFTs that are preceded by a decimation-in-frequency radix-2 butterfly.

For a 512-point FFT, the samples are read out of the RAM and supplied to an arithmetic logic unit (ALU), which sums successive pairs of even data samples and subtracts successive pairs of odd data samples. For even data sample processing, the ALU's output sum value is supplied directly to FFT processor engines. For generating odd bins of a 512-point FFT, as odd bin data samples are read out of the RAM, the difference between data samples provided by the ALU is multiplied by $W_N^n$ by a numerically controlled oscillator, modulator and clocked into the FFT processor.

Since the FFT engines employ a block floating point algorithm (outputting a four bit scaling factor with the complex FFT data), a scaling logic circuit is used to control a barrel shift circuit, to which the output of the FFT engine is coupled. The barrel shift circuit adjusts the data as it is read out from the FFT engines in accordance with the scaling factor, so as to ensure that consecutive FFTs are aligned to the same scale. The output of barrel shift circuit is coupled to an output RAM.

The output of the FFT processor must be multiplied by a complex exponential, $W_N^{-kmM}$, where m is the decimation rate, k is the FFT bin number, and M is the FFT (block) number. To execute an equivalent operation, the overlap and add embodiment of the channelizer makes use of the identity:

$$x[(n-r)_N]=FFT(W_N^{-rk*}X[k]),$$

where x[n] is the FFT input sequence, and $x[(n-r)_N]$ is the circular shift of x[n] by r modulo N. This circular shift causes the dual port output RAM to be addressed in a manner that accesses processed data values in an order that effects a circular shifting of the FFT's input data sequence.

The FFT thus outputs a number of digital channel signals, with each digital channel signal consisting of a sequence of samples of the signal associated with a particular channel. When FFT-processed data for each channel (frequency bin) has been written into the output RAM, an attendant time division multiplexed (TDM) bus interface circuit asserts the data onto a TDM bus, so that it may be applied to digital signal processors on the bus, which are operative to interpolate and then demodulate and extract voice or data from the channel data. Data on the TDM bus is preferably divided into a plurality of time slots. The bus connected processors are synchronized to the TDM bus by a conventional flaming signal, so that the processors will know the correct time slot from which to read data.

Before demodulating and extracting voice and/or data from each channel signal, the digital signal processors first process each digital channel signal through a rate converter consisting of a linear-phase, interpolating low pass digital filter. By decimating the output of the interpolating digital filter appropriatel, the rate converter adjusts the effective timing of the sample values in each digital channel signal. The interpolation and decimation filters preferably make use of multirate digital signal processing techniques, to minimize the amount of necessary computational functionality.

The rate converter associated with each respective input channel signal determines interpolated digital signal values that correspond to optimum sampling of that channel. In particular, each rate converter provides samples of its respective digital channel signal taken at or near a position of peak symbol amplitude. Mathematically, the functions of the rate converter are equivalent to creating a zero-padded extension of the corresponding output of the respective FFT channel, filtering the zero padded signal with a low-pass, linear phase, finite impulse response (FIR) filter, and then decimating the FIR filter output signal, such that only the samples positioned closest to a peak symbol amplitude are selected.

However, rather than actually perform each of these identical operations mathematically, the invention takes advantage of certain multirate signal processing techniques to reduce the number of operations required to obtain the same result. In particular, the rate converter consists of a lowpass filter which has one of several possible sets of filter coefficients. The various available sets of filter coefficients represent the various possible phase shifts for the interpolating low pass filter operation on the zero-padded digital channel signal. The particular set of filter coefficients which result in an optimum output signal phase are determined in advance of filtering actual data from the digital channel signal. For example, this is typicaly done during a preamble portion of the digital channel signal, when the expected values of the received digital channel signal are known in advance. This permits the use of correlators to determine the output signal energy detected by each possible phase shift of the FIR filter. The optimum phase shift of the filter is thus the one with the maximum correlation power level.

Thus, each one of the rate converters also consists of a filter phase selection mechanism which, after detecting that a preamble portion of the respective digital channel signal is presently being received, compares the results of filtering the received channel signal with each of the possible interpolating low pass filters, to determine which one of the possible sets of low pass filter coefficients results in the greatest probability of correctly detecting the symbols in the data portion of the digital channel signal.

Optionally, the rate converters may also perform a sample rate difference adjustment to affect any necessary difference in the rate of the samples provided by the discrete Fourier transform and the optimum sample rate expected by the demodulator. To effect any necessary sample timing adjustment, the times at which samples are advanced through the interpolating low-pass filter are precisely controlled by an output sample counter which operates at the rate of the desired output samples. This output sample counter provides a sample index number which is, in turn, multiplied by a sample rate adjustment factor. The result of this multiplication is used to control which of the input samples are presently being processed by the interpolation filter, as well as to adjust the index of the particular set of filter coefficients being used at any given instant in time. In this manner, any difference in the desired sample rates of the input digital channel signal and output digital channel signal may be accommodated. The interpolated digital channel output signals from the channelizer are then provided to the demodulator functions performed by the digital signal processors.

The signal processing architecture of a multichannel combiner, which is complementary to the wideband channelizer having the overlap and add filter structure described above, employs a custom TDM bus for collecting data for a large number of channels at relatively high data rates, since the aggregate data rate from all channels typically exceeds the bus bandwidth of standard bus protocols, (e.g. VMEbus'").

The sources of the channelized (voice/data) signals that are asserted onto the TDM bus are DSP processors that format (e.g. to a cellular standard) and modulate incoming voice or data signals from an attendant telephone network, thereby providing a baseband analytic signal. Each data source is assigned one or more time slots during which it will transfer a single complex sample when requested by the combiner. No two sources can be allocated the same time slot. Time slots are assigned by a system controller (a separate central processing unit (CPU) on a VMEbus'") during system initialization. The system controller also programs the combiner to specify all times slots that contain valid data.

A sample from each DSP processor is requested via control signals applied to the TDM bus from a TDM bus controller and associated buffer/drivers. This sample is written into an input (RAM) buffer. The TDM bus controller synchronizes the addressing of the RAM buffer to framing signals of the TDM bus, thereby insuring that each channel is written to the proper address in the dual port RAM. When the combiner has collected data from all operative channels, the TDM bus controller couples control signals to an FFT control logic unit, causing the FFT control logic unit to initiate FFT processing.

Complementary to the forward FFT processor functionality of the overlap and add channelizer, the overlap and add combiner causes an inverse FFT to be performed. In terms of a practical implementation, generation of an inverse FFT is effected using a forward FFT. The FFT processor is configured to have a size equal to the next 'power of two' greater than the number of channels to be combined. To maintain throughput, the FFT processor contains a plurality of FFT engines that have been programmed with the proper FFT size associated with the signal processing parameters of interest. Implementing the FFT processor with plural engines maintains data throughput as the processing time for a single engine is typically longer than the time required to collect N samples required for processing.

Zeros are written sequentially into an FFT engine for a prescribed (relatively limited) number of frequency bins. For a subsequent plurality of bins, data may be read from an input dual port RAM for the active channels. If the channel is not an active channel, the control logic unit writes a zero into that bin. The identities of those channels that are active are programmed into control logic unit during system initialization. For the remaining (relatively limited) number of bins, zeros are written into those bins.

In order to generate an inverse FFT using a forward FFT, the following identity is used:

$$x[n]=K*FFT(X[((-k))_K]),$$

where x[n] is the inverse FFT of X[k], n is the sample number, k is the FFT bin number, K is the FFT size, and $X[((-k))_K]$ is equal to the reverse order of sequence X[k], by modulo K. By generating a mirror image of the input data to the FFT about bin 0, the forward FFT becomes an inverse FFT scaled by the FFT size. The FFT control logic unit addresses the input RAM in a reverse order when writing data into the FFT engines.

As in the overlap and add channelizer, order to generate a 512-point FFT in the combiner architecture, the FFT engines employ a radix-4 (block floating point) algorithm having FFT sizes that are a power of four. Using a radix-2 decimation time butterfly, N/2-point FFTs are generated from even and odd samples of the 512-point input sequence. Multiplication of odd sample FFT data values is performed by a numerically controlled oscillator, modulator (NCOM). To process the first 256 bins of a 512-point FFT, the output of a first half of the dual port RAM is summed with the output of a second half of the RAM by means of an ALU. For the second 256 bins, the output of the two RAM halves are subtracted from each other. To accommodate the propagation delay through the NCOM and ensure that the proper pair of samples are processed by the ALU, a set of delay registers are coupled in the output path from the RAM to the ALU.

The combiner algorithm requires that the input sequence of the inverse FFT be multiplied by a complex exponential, $$W_K^{kmR},$$

where k is the input frequency bin number, K is the inverse FFT size, m is the inverse FFT number, R is the interpolation rate of the combiner, and $$W_k = e^{-j*2*\pi/K}.$$

Using a mathematical identity, this multiplication operation can be effected by a circular rotation of the output samples of the inverse FFT, i.e.:

$$x[((n-r))_k] = \text{inverse } FFT(W^{-rk*}X[k]),$$

where r is equal to −mR. By rotating the inverse FFT output samples by −mR, the phase shift of the complex exponential is generated. This rotation is performed by the FFT output addressing logic. Since the FFT engines generate FFTs using a block-floating point algorithm, which provides a scaling factor dependent upon the characteristics of the input data, barrel shifting circuits are coupled in the signal flow input paths to the ALU, in order to adjust the FFT data to the same scale to properly align the data for subsequent processing. Like the channelizer, the overlap and add filter of the combiner comprises plural filter tap stages. The FFT size and the number of stages set the overall length of the filter. The filter is designed as a real low pass filter with a cutoff frequency equal to one half the channel bandwidth. A respective stage of the filter is formed of one or both of a pair of delay memory elements of a shift register, a feedback multiplexer, a coefficient memory, a multiplier and an internal adder. Each coefficient memory stores a respective set of N filter (weighting) coefficients, the number of which corresponds to the size of the FFT processor. The output of the FFT processor from the ALU is distributed to multipliers of all filter stages and multiplied by the coefficients of each stage simultaneously. The outputs of a tap stage multiplier is summed with data being accumulated and shifted through the delay memories in the tap stage adder for application to the next stage of the filter.

The first filter tap stage of the filter does not require an input delay memory section since zeros are shifted into the first filter stage. The length of each delay memory is determined by the filter interpolation rate, which is defined in accordance with the channel and output sample rates. The filter interpolation rate, R, is the nearest integer of the quotient of the output and channel sample rates:

R=round (output sample rate/channel sample rate).

The length of each of the output delay memory sections is R, while the length of each input delay memory section, also known as the filter overlap, is N−R.

The interpolation rate R also specifies the required signal processing rate of the overlap and add filter. The minimum clock rate that the filter must process data to maintain throughput is given by:

filter processing rate=output rate*N/R.

For every N samples output by the inverse FFT processor, the overlap and add filter outputs R samples. For the first R samples of each inverse FFT, a first input port through the multiplexers is selected. During this time, all data is docked and summation values produced by an adder in the last stage of the filter are input to a half band filter. For the remaining N−R samples, a second port of each multiplexer is selected, and the outputs of the internal adders of the respective stage are fed back to their delay memory sections. During this time input memory sections are not shifted and the data from the adder in the last stage is not docked into the half band filter. Again, as in the overlap and add filter of the channelizer, the feedback of the last N−R samples provides the filter overlap.

The half band filter is configured as an integrated circuit that provides complex to real data conversion, which doubles the output sample rate. Although the entirety of the combiner could be implemented as a completely real system, this would require all sample rates, processing rates and FFT sizes to be doubled, increasing complexity and cost. A rate buffer is coupled to the output of half band filter to allow a continuous flow of data from the combiner. Data stored in the rate buffer is coupled via an output driver unit to an output data link for application to a D-A converter of the transmit side of the transceiver site. A half full flag from the rate buffer is supplied over a control signal line to a control logic circuit, to indicate to the TDM bus interface unit when to request data. When the quantity of data stored in the rate buffer falls to less than half its capacity, the flag becomes inactive, which signals the TDM bus interface to request channel data from its active channels to maintain a continuous flow of output data.

As in the overlap and channelizer architecture, respective oscillators are provided for each output sample rate required. A further set of logic circuits is included to generate additional clock signals employed by the combiner. The clock output of a high rate oscillator is divided down by counters to generate the necessary filter processing clock, TDM bus dock, and FFT engine system clock.

A second embodiment of the wideband channelizer of the present invention is configured as a polyphase filter structure. As in the overlap and add channelizer embodiment, the architecture of an FFT-based polyphase filter bank analysis (channelizer) system accepts real-time wide band IF (intermediate frequency) signals and performs frequency translation and channelization to a number of individual narrow baseband analytic signals. The polyphase filter channelizer provides full programmable control of the system parameters via a standard VMEbus™ interface (as defined by the Institute of Electrical and Electronics Engineers (IEEE) standard Std 1014-1987) and channelized data distribution over a custom, time division multiplexed (TDM) data bus.

In the polyphase channelizer architecture, the input sample rate is an integral multiple of the channel sample rate, which implies that the channel sample rate must be a multiple of the channel bandwidth. Channelized data is distributed by the channelizer as analytic baseband signals. The channelizer's input interfaces to the digital data output link from an A-D converter of an upstream wide band digital receiver. The input sample clock rate is determined by the number of channels being received and the bandwidth of those channels. As in the overlap and add embodiment, an amplitude monitoring logic circuit monitors the input data, in order to provide automatic gain control of the input signal, and insure that the full dynamic range of the A-D converter in the receiver is being utilized.

Input samples are clocked into a half band filter that performs a real-to-complex conversion of the input data. The half band filter also decimates the data by two, reducing the clock rate of the data by half. The complex data samples are then fed into a shift register of a polyphase filter, specifically, clocked into a delay memory that forms a portion of a shift register within a first filter stage. The length of each delay memory is equal to the FFT size in the channelizer. The output of each delay memory is applied to coefficient multipliers which operate at a rate that is I times the clock rate of shift register, where I is an oversampling factor of two. This implies that each sample at the output of the delay memories is multiplied to two (I=2) filter coefficients, prior to being clocked into the next delay memory.

In an exemplary embodiment of the polyphase filter architecture, four filter stages are employed. The FFT size, oversampling factor, and the number of stages establish the overall length of the filter. N filter coefficients are stored in coefficient RAMs of each filter tap stage. The filter coefficients are decimated by the number of taps (e.g. four) when loading coefficient RAMS. The outputs of respective coefficient, data multipliers are summed and written into a dual port RAM, in preparation for application to the polyphase channelizer's FFT processor.

The FFT processor of the polyphase channelizer has effectively the same configuration and operates in substantially the same manner as the FFT processor of the overlap and add channelizer described above. Once FFT-processed data for each channel (frequency bin) has been written into an output RAM, an FFT control logic unit signals an attendant TDM bus interface circuit to assert the data onto a TDM bus, so that it may be applied to attendant digital signal processors on the bus, which are operative to demodulate and extract voice or data from the channel data. The polyphase channelizer may also be configured to write one or more channels of data into a test memory, which allows a CPU on the VMEbus$^{tm}$ to collect and analyze channel data without interfacing to custom TDM bus.

The signal processing architecture of the polyphase combiner, which is complementary to the wideband channelizer having the polyphase filter structure described above, also allows real-time processing of multiple digital voice or data signals, and performs frequency translation and signal combining to an IF (intermediate frequency) output sample rate, again providing fully programmable control of the system parameters via a VMEbus$^{tm}$ interface and channelized data collection over a custom, time division multiplexed (TDM) data bus.

The front end (FFT processor) of the polyphase combiner is the same as that of the overlap and add architecture described above, but employs a different filter structure, in which adders are not internally cascaded with respective delay memories as in the overlap and add combiner filter. Instead the polyphase combiner filter structure corresponds to that employed in the polyphase channelizer. The output of the polyphase filter is coupled to a half band filter, which provides complex to real data conversion, which doubles the output sample rate. The output of the half band filter to an output data link for application to D-A converter of the transmit side of the transceiver site.

Of course, even when the polyphase architecture is used to implement the convolutional filter, the interpolation filter as described above is still used, to effect optimum sampling of the resulting digital channel signal.

BRIEF DESCRIPTION OF THE DRAWINGS

FIG. 4A diagrammatically illustrates a channelizer portion of the multichannel transceiver apparatus;

FIG. 4B diagrammatically illustrates a combiner portion of the multichannel transceiver apparatus;

FIGS. 8A and 8B show several discrete time plots of an exemplary digital channel signal x(n), an exemplary rate converter output signal z(n), and the time domain responses of an exemplary interpolation filter, h(n);

FIGS. 11A and 11B are discrete time plots showing the relative timing of a digital channel signal x(n) and interpolated channel signal z(n), for a situation where approximately one sample per symbol and two samples per symbol, respectively, are desired;

DETAILED DESCRIPTION

Figure 1:
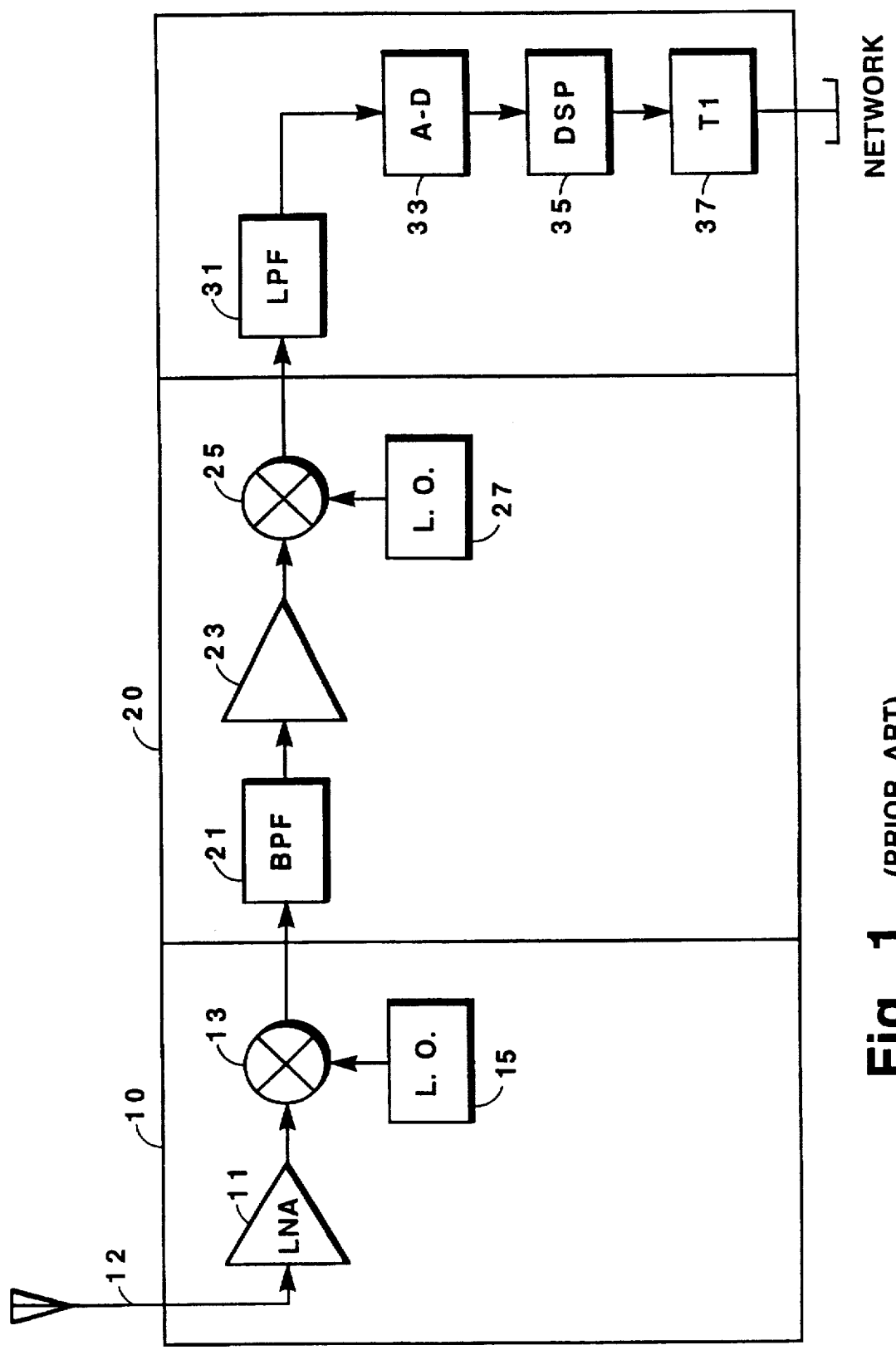
FIG. 1 diagrammatically illustrates the receiver section of a conventional cellular communication basestation channel unit.
Figure 2:
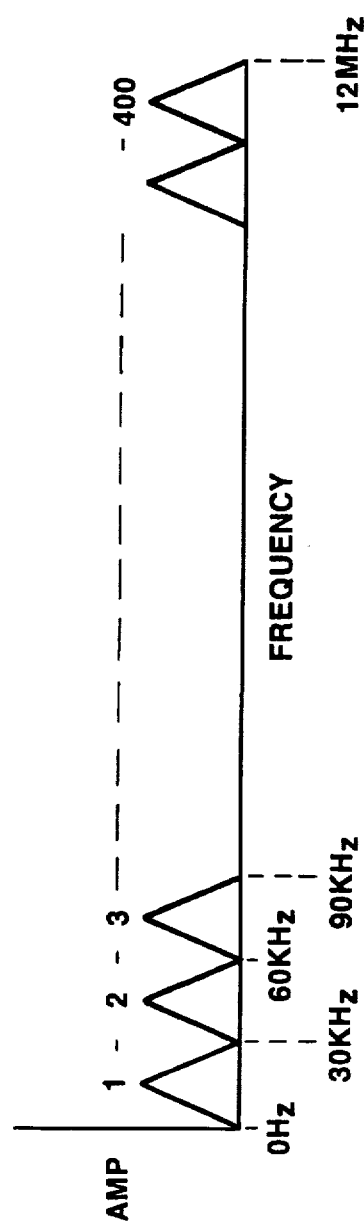
FIG. 2 is a multi-channel spectral distribution plot of four hundred (400)-30 kHz sub-portions of a 12 MHz wide voice/data communication band.

Before describing in detail the particular improved wideband multi-channel transceiver apparatus in accordance with the present invention, it should be observed that the present invention resides primarily in a novel combination of commercially available communication and signal processing circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 3:
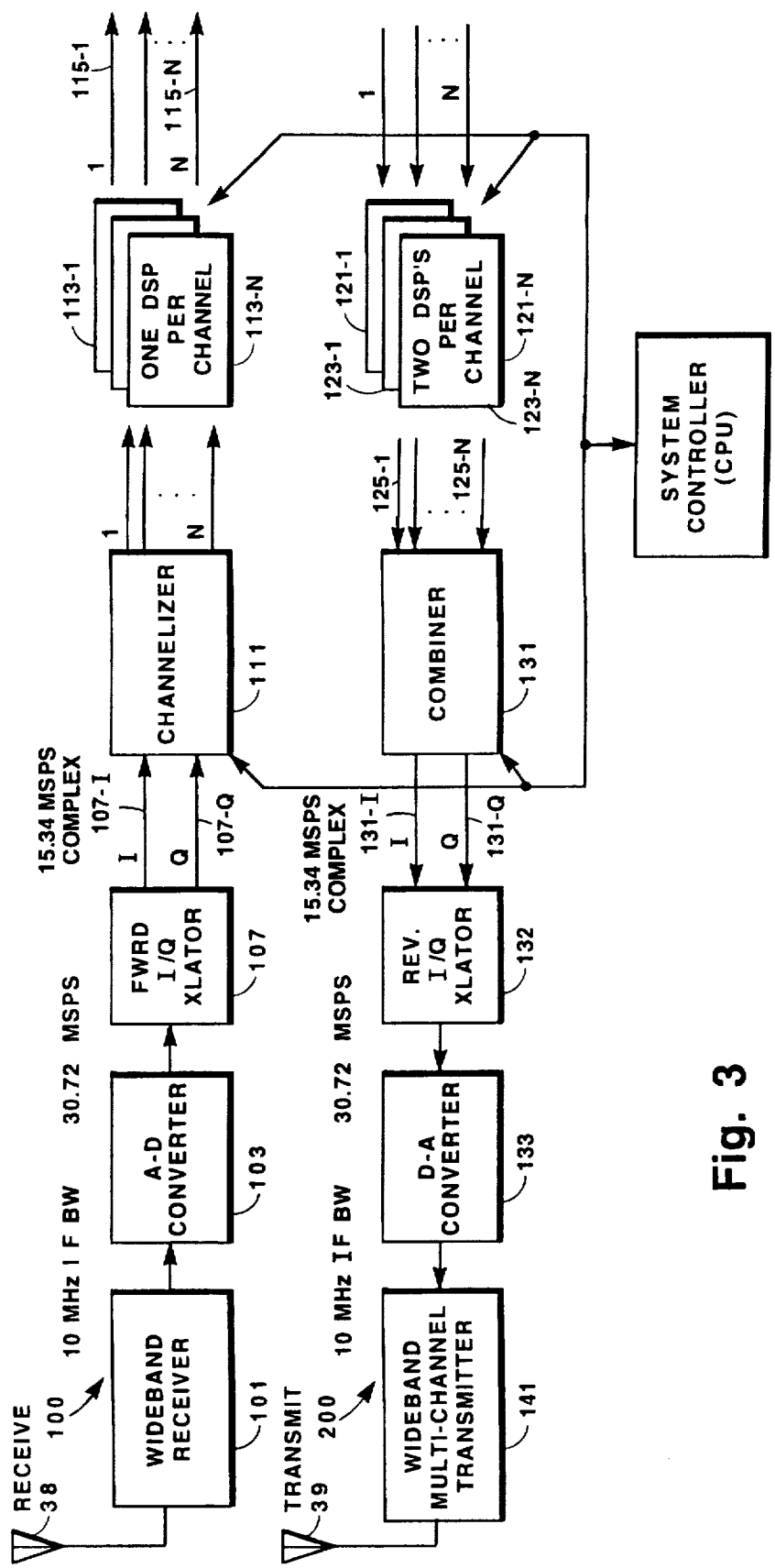
FIG. 3 diagrammatically illustrates a wideband multichannel transceiver apparatus in accordance with the present invention.

Referring now to FIG. 3, the transceiver apparatus of the present invention is diagrammatically illustrated as comprising a receiver section 100 and a transmitter section 200. Receiver section 100 is coupled between an antenna 38 and a wideband receiver 101 capable of receiving any of channels offered by a communications service provider. As a non-limitative example, the wideband receiver 101 may comprise a WJ-9104 receiver, manufactured by Watkins-Johnson Company, 700 Quince Orchard Road, Gaithersburg, Md. 20878-1794.

The radio frequency spectrum of interest may be as described previously, e.g., a 12 MegaHertz (MHz) band comprised of four hundred (400) channels, each of which are 30 kilohertz (kHz) wide. It should be observed however, that the present invention is not limited to use with this or any other set of communication system parameters. The values given here are merely for purposes of providing an illustrative example. Also, while the term 'wideband' is not limited to any particular spectral range, it is to be understood to imply a spectral coverage of at least the entirety of the useful range of the communication range over which the system may operate (e.g. 12 MHz). Narrowband, on the other hand, implies only a portion of the spectrum, for example, the width of an individual channel (e.g. 30 kHz).

The output of wideband receiver 101 is a down-converted, multi-channel (baseband) signal containing the contents of all of the 30 kHz voice/data channels currently operative in the communication system or network of interest. This multichannel baseband signal is coupled to a high speed A-D converter 103, such as a Model AD9032 A-D converter manufactured by Analog Devices, one Technology Way, Norwood, Mass. 02062-9106. Advantageously, the dynamic range and sampling rate capabilities of currently commercially available A-D converters, such as that referenced above, are sufficiently high (e.g. the sampling rate may be on the order of 25 Mega-samples per second (Msps)) to enable downstream digital signal processing (DSP) components, including a Discrete Fourier Transform (DFT) channelizer 111, to be described below with reference to FIGS. 4A–B, to process signals within any of the 400-30 kHz channels of the system and output such signals onto respective channel links to the carrier interface (e.g. T1 carrier digital interface) of the telephony network.

Fast Fourier transform (FFT) channelizer 111 processes the output of A-D converter 103, which is coupled thereto by way of a digital in-phase/quadrature (I/Q) translator 107. I/Q translator 107 outputs respective I and Q channel (i.e., complex) digitally formatted signals over I and Q links 107I and 107Q, respectively. FFT channelizer 111 then extracts, from the composite digitized multichannel (I/Q) signal, respective narrowband channel signals representative of the contents of respective ones of the (30 kHz) communication channels received by wideband receiver 101. The respective channel signals are coupled via N output links (e.g., N=400 in the present example) to respective digital receiver processing units 113-1 ... 113-N, each of which demodulates and performs any associated error correction processing embedded in the modulated signal, just as in the conventional transceiver unit of FIG. 1. For this purpose, each of digital receiver processing units 113 may comprise a Texas Instruments TMS32OC50 digital signal processor, manufactured by Texas Instruments, Post Office Box 655303, Dallas, Tex. 75265. The demodulated signals derived by digital receiver processing units 113 are coupled over respective channel links 115-1 ... 115-N to a telephony carrier interface (e.g. T1 carrier digital interface) of an attendant telephony network (not shown).

The transmitter section 200 includes a second plurality of digital signal processing units, specifically transmitter signal processing units 121-1 ... 121-N, that are coupled to receive from the telephony network respective ones of a plurality of channel digital voice/data communication signals to be transmitted over respectively different narrowband (30 kHz) frequency channels of the multichannel network. Like the receiver digital signal processing units 113 in receiver section 100, a respective transmitter digital signal processing unit 121 may comprise a model TMS32OC50 digital signal processor manufactured by Texas Instruments. Transmitter signal processing units 121 modulate and perform pre-transmission error correction processing on respective ones of the plurality of incoming communication signals, and supply processed ones of the narrowband communication channel signals at respective output ports 123-1 ... 123-N. From output ports 123-1 ... 123-N of the transmitter signal processing units 121, the modulated narrowband channel signals are coupled over channel links 125-1 ... 125-N to respective input ports of an inverse FFT-based multichannel combiner unit 131, to be described below, which outputs a combined signal. This combined signal is representative of the contents of a wideband signal which is a composite of the respective narrowband communication channel signals input to the digital transmitter signal processing units 121. The output of the multichannel combiner unit 131 is coupled to an I/Q translator unit 132. I/Q translator receives respective in-phase and quadrature signal components from combiner 131 on links 131I and 131Q and provides a combined output signal to a digital-to-analog (D-A) converter 133. A digital-to-analog (D-A) converter 133, like high speed A-D converter 103 in receiver section 100, preferably comprises a currently commercially available unit, such as a model AD9712A D-A converter manufactured by Analog Devices. The output of the D-A converter 133 is coupled to a wideband (multichannel) transmitter unit 141, which transmits a wideband (multichannel) communication channel signal containing the composite signal output by the inverse fast Fourier transform-based combiner unit 131. The output of transmitter unit 14 1 is the coupled to an antenna 39 for transmission.

One of the features of the present invention that reduces the amount of hardware required to provide broad coverage for an increased (full spectrum) capacity cellular transceiver site is the application of convolutional-decimation spectral analysis techniques to each of a wideband multichannel signal extraction architecture (channelizer 111) and a wideband multichannel signal combining architecture (combiner 131). Because all of the channels of the operational communication band available to the service provider can be processed using digital processing components which operate at very high data rates that accommodate the substantial bandwidth of present day wireless communication systems, it is no longer necessary to either construct a separate narrowband signal processing unit for each channel, nor is it necessary to limit the number of channels per site to less than the full capacity of the network.

More particularly, the present invention makes it possible to significantly reduce the size and hardware complexity of a wireless communication network transceiver site by the use of either overlap and add or polyphase channelizer and combiner architectures, the fundamental signal processing functionalities of which are mathematically detailed in Chapter 7 of the text "Multirate Digital Signal Processing," by R. E. Crochiere et al., and published by Prentice-Hall, Inc. Since the algorithms for each of these two types of filter transform functions are rigorously set forth in the Crochiere text, they will not be repeated here. For a more detailed description of overlap and add and polyphase signal processing, involved, attention may be directed to the Crochiere text, per se.

The description to follow will detail practical embodiments of both the overlap and add, and polyphase, implementations of each the channelizer and combiner employed in the inventive transceiver apparatus, for real-time wide band wireless IF signal processing, which performs frequency translation and channelization of a plurality of individual narrow baseband signals.

In addition, the description to follow includes a detailed discussion of a sample timing adjustment filter, which makes use of interpolation and decimation digital signal processing techniques, effects optimum sample timing in each digital channel signal output by the channelizer, while minimizing the rate at which discrete Fourier Transforms must be performed.

THE CHANNELIZER AND COMBINER, GENERALLY (FIGS. 4A AND 4B)

FIG. 4A is a high level block diagram of a channelizer 111 according to the invention which includes a convolutional filter 40, an FFT processor 42, and a plurality of sample rate converters 43-1, 43-2, . . . , 43-N. A single rate converter is associated with each of the N output channels provided by the channelizer 111.

The convolutional filter 40 accepts I and Q samples from the forward I/Q translator 107 (FIG. 3) and performs a first portion of a set of operations necessary to separate the wideband digital input into separate digital channel signals, each of which represent the contents of a respective one of the communication channels received by the wideband multi-channel receiver 101 (FIG. 3). As discussed in more detail below, the convolutional filter 40 may be embodied using an overlap and add structure or a polyphase structure. Each of these implementations of the convolutional filter 40 is discussed more fully below, in connection with FIGS. 5–5A and FIGS. 14–14A, respectively.

Briefly, the convolutional filter 40 acts as a sliding analysis window which select out and weights successive short time segments of the I and Q samples 107I and 107Q output by the translator 107. The discrete Fourier transforms of the sequences provided by the FFT then produce short time spectra, for example, with a particular sampling frequency. The size of the analysis window, that is the tap length of the filter 40, and the number of samples of the Discrete Fourier Transform determine, respectively, the time and frequency resolution of the resulting short time spectrum. The overlap and add structure, as described in detail in connection with FIGS. 5–5A, efficiently realizes these functions by taking advantage of an efficient method of sharing filter computation among channels.

The output of the convolutional filter 40 is a complex-valued digital signal that is passed to a discrete Fourier transform unit which may typically be implemented as, but which is not restricted to, a fast Fourier transform (FFT) unit 42. The FFT unit 42 produces a number, N, of output signals referred to as digital channel signals. Each of the N digital channel signals output by the FFT unit 42 represents the contents of a respective one of the communication channels received by the multi-channel receiver 101.

A preferred embodiment of the FFT unit 42 is described in more detail in connection with FIGS. 5B–5C for the overlap and add embodiment, and is described in FIGS. 14B–14C for the polyphase embodiment.

The digital channel signals output by the FFT unit 42 are then fed to the plurality of rate converters 43-1, . . . , 43-N. There is one rate converter 43 associated with each respective input channel signal. The rate converters 43-1, . . . , 43-N operate by determining interpolated digital signal values that correspond to the optimum sampling of each digital channel signal.

In particular, each rate converter 43 provides samples of its respective digital channel signal taken at or near a position of peak symbol amplitude. Mathematically, this operation is equivalent to creating a zero-padded extension of the corresponding output bin of the FFT unit 42, and then filtering the zero padded signal with a low-pass, linear phase, finite impulse response (FIR) filter. The positions of the samples closest to the peak amplitudes of this low-pass filtered signal are then determined. The output of the filter is then decimated with the proper timing, so that only the samples nearest the postion of the peak amplitudes remain.

Optionally, the rate converters 43-1 ,. . . , 43-N may also perform a sample rate difference adjustment to effect any necessary difference in the rate of the samples provided by the FFT 42 and the sample rate expected by the demodulators 113.

The rate converters 43-1, . . . , 43-N are discussed in greater detail in connection with FIGS. 7 through 13 below. After rate conversion, the N digital channel signals are then fed to the demodulator functions performed by the digital signal processors 113-1, . . . , 113-N of FIG. 3.

OVERLAP AND ADD CHANNELIZER (FIGS. 5A–5C, and 6)

Figure 5:
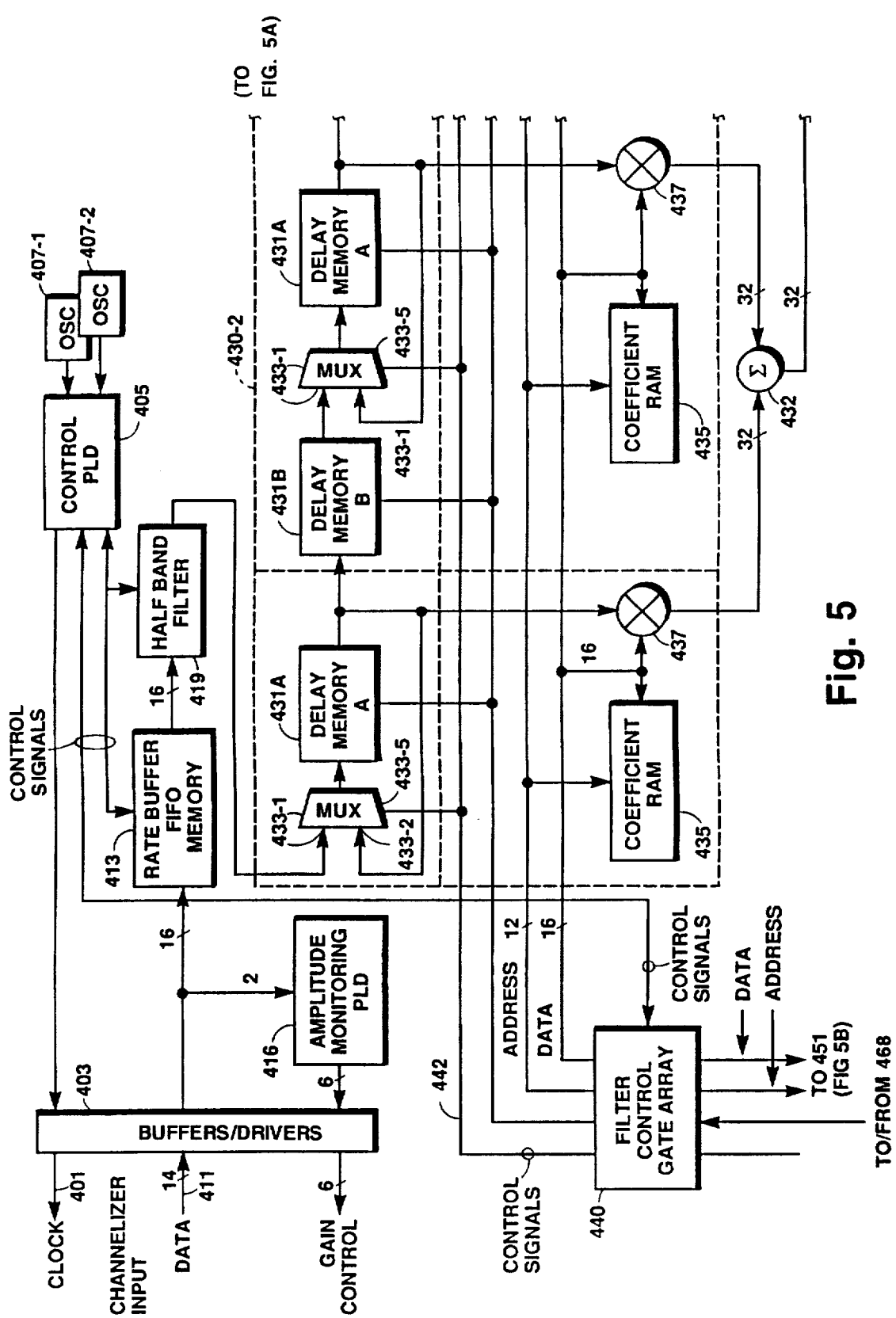
FIGS. 5–5A diagrammatically illustrate the configuration of an overlap and add embodiment of a convolutional filter that may be employed in the channelizer apparatus of FIG. 4A in accordance with a first embodiment of the present invention.
Figure 5A:
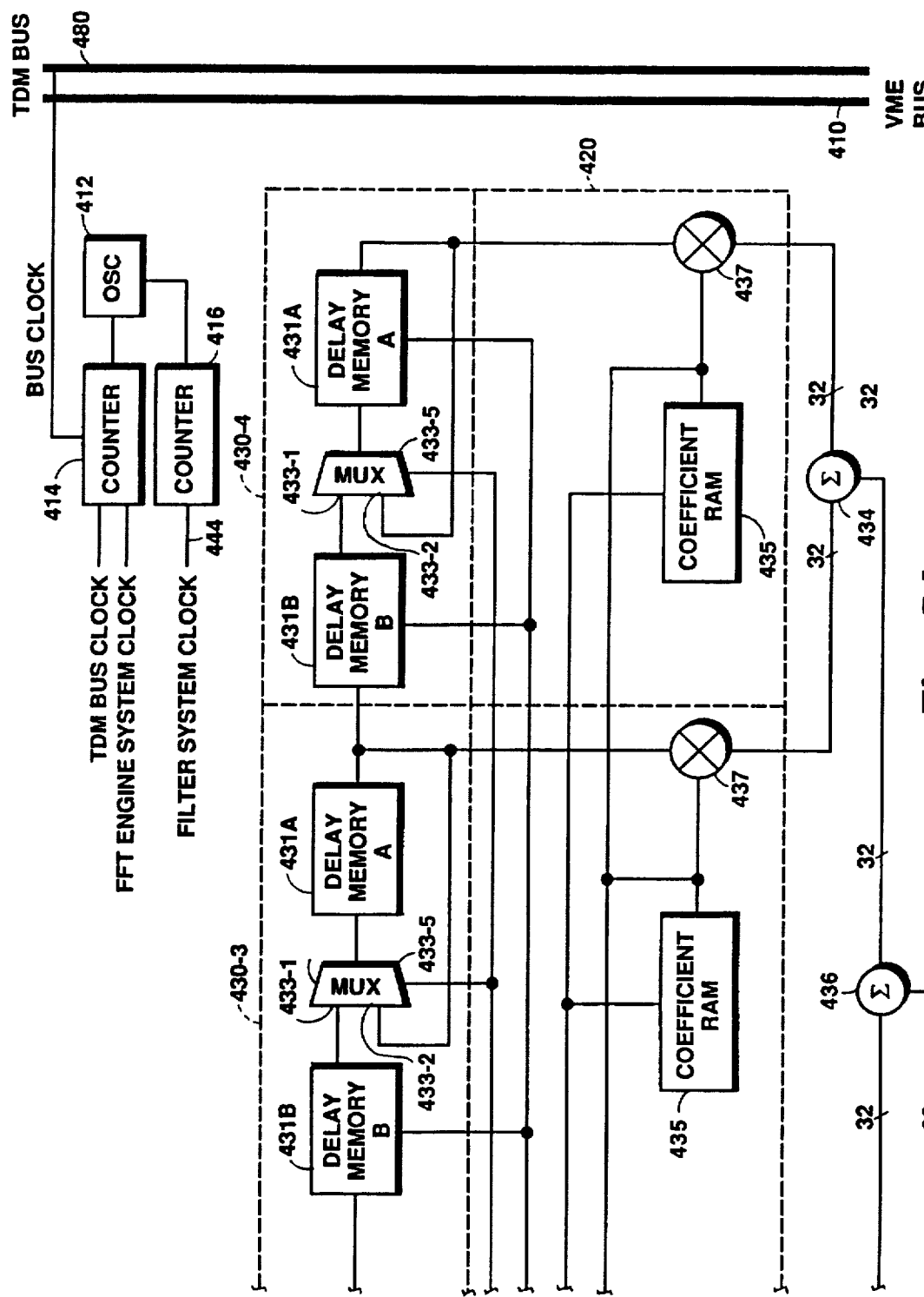
Figure 5B:
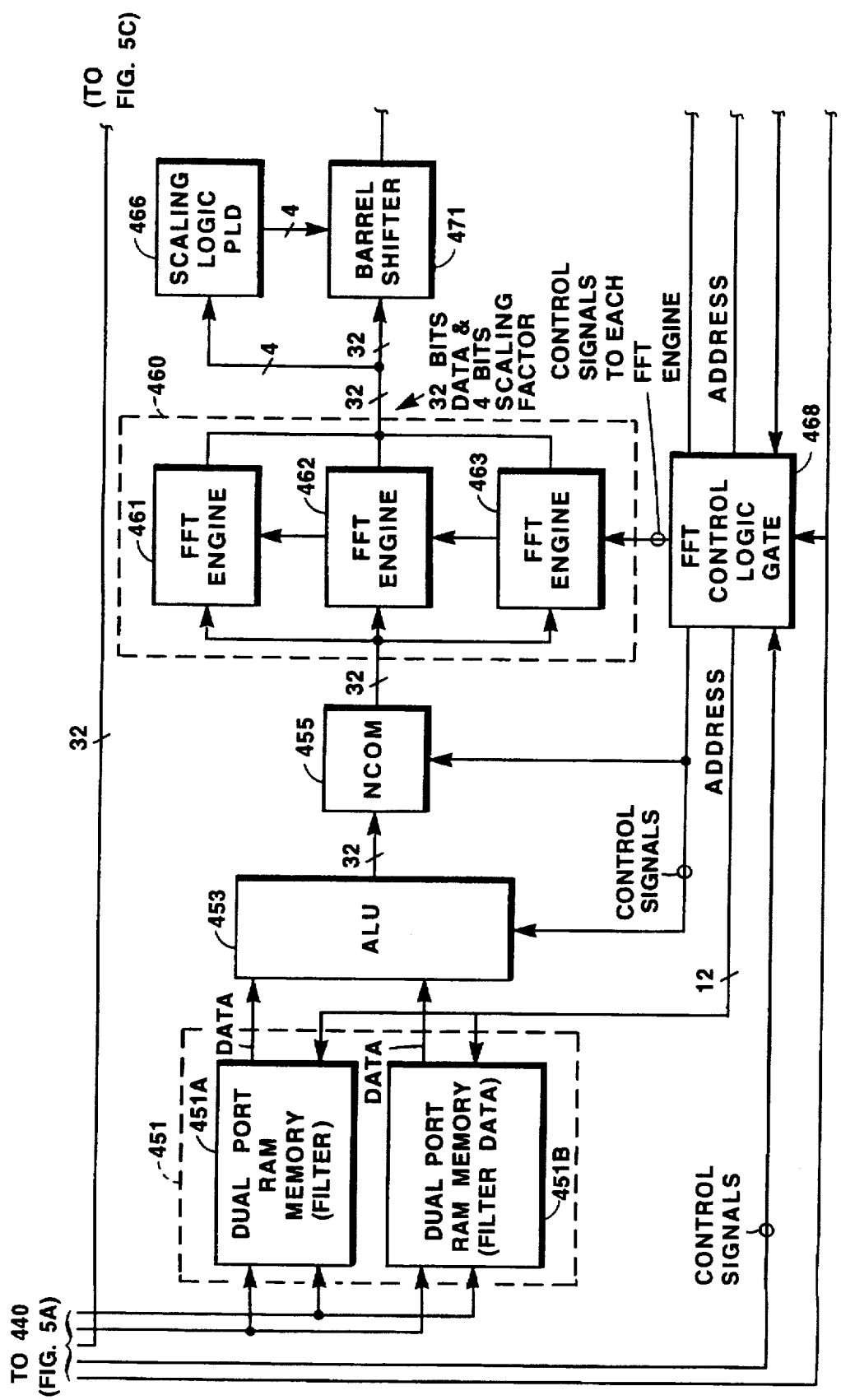
FIGS. 5B–5C diagramatically illustrate the configuration of a fast Fourier transform (FFT) that may be employed in the channelizer together with the overlap and add convolutional filter of FIGS. 5–5A.
Figure 6:
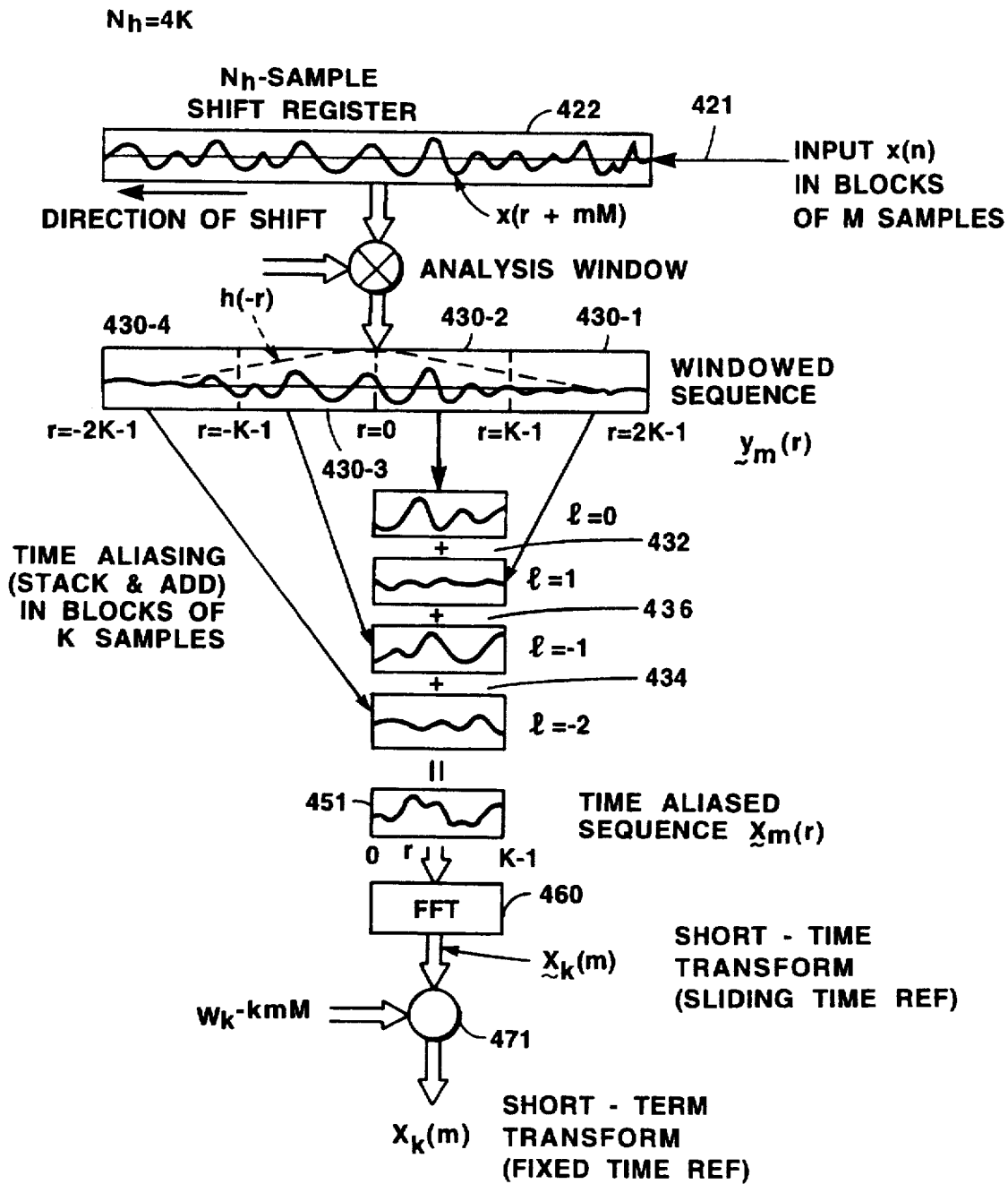
FIG. 6 is a functional diagram associated with the signal processing mechanism executed by the overlap and add channelizer of FIGS. 5–5A.

Before discussing the detailed implementation of the overlap and add channelizer shown in FIGS. 5A and 5B, reference should be made to FIG. 6 which illustrates the sequence of operations necessary to implement a weighted overlap and add structure for a DFT filter bank analyzer. Input data, x(n), are first shifted in to a $N_{(h)}$ sample shift register 422 in blocks of M samples, where $N_h$ is the number of taps in the analysis window H(n). Here it is assumed that $N_h$ is equal to four K; that is the size of the window is four times the size of the transform. The data in the shift register are then weighted with the time reverse window H(-R) to produce the short-time sequence $y_m(r)$. This sequence is then divided into blocks of K samples starting at r=0, which are time aliased to produce the K-sample aliased sequence $x_m(r)$. The K-point DFT of $x_m(r)$ is then computed to obtain the short time Fourier transform $x_k(m)$ which is a referenced to the sliding time frame. Finally, this transform is multiplied by a factor $W_K^{-KnM}$ to convert to a desired fixed time frame transform $X_k(m)$. For more details of this particular filtering algorithm, reference should be made to the Crochiere et al. text previously cited above.

The implementation of this overlap and add filter depicted in FIGS. 5A and 5B provides full programmable control of the system parameters by way of a standard VMEbus$^{tm}$ interface, and channelized data distribution over a custom, time division multiplexed (TDM) data bus. For purposes of providing a non-limiting illustrative example, both a four hundred (400) channel, 30 kHz system (which may be employed in a North American Digital Cellular (NADC), as defined by the Electronics Industries Association and Telecommunications Industry Association standard TIA/EIA IS-54) cellular system) and a fifty (50) channel, 200 kHz system (which may be employed with the Pan-European Groupe Speciale Mobile (GSM) cellular standard) will be described, in order to facilitate an appreciation of the relationship between system parameters (channel bandwidth, number of channels, sampling and processing rates, etc.) and the control parameters of the channelizer itself. For the 400 channel, 30 kHz system, an FFT output sample rate of 50 kHz is assumed. For the 200 kHz system, an FFT output sample rate of 300 kHz sample is assumed. Channelized data is output by the channelizer as analytic baseband signals, and the channel sample rates will depend upon the channelizer's filter design, as will be described.

As pointed out above, the raw data upon which the channelizer 111 is to operate is derived from wideband receiver 101 (FIG. 3). The sampling rate of the receiver's associated A-D converter 103 is controlled by a sample rate clock signal supplied over link 401 from a buffer/driver interface 403 under the control of a control unit 405. Control unit 405 preferably is comprised of a set of combinational logic and flip-flops that are driven by associated clock sources 407, so as to implement a state machine sequence control function to be described. The input sampling clock rate is determined by the number of channels being received and the bandwidth of the received channels.

Clock signals for the filter system, FFT processor and output TDM bus, to be described, are derived from a high rate (e.g. 200 MHz) reference oscillator 412 and associated down counters 414 and 416.

Since the channelizer 111 is FFT-based, the total number of channels must be a power of two. Due to characteristics of the anti-aliasing filter contained in the wideband receiver, channels that are near to the edges of the band are typically not useful. In order to process the 400 30 kHz channels, the size of the FFT channelizer must be a 512 point processor. To process the 50 200 kHz channels, a 64 point FFT processor is required.

The total input bandwidth that is to be sampled is N times the channel bandwidth, where N is the size of the FFT processor. The channelizer algorithm requires an input sampling rate equal to 2*N* channel bandwidth, which is the sample rate equal to the minimum rate required by the Nyquist sampling theorem.

Thus, for a 30 kHz channelizer, the minimum clock rate is 25.62 MHz, while the filter minimum clock rate for the 200 kHz channelizer is 19.05 MHz. In the present example, in order to accommodate each of these sampling rates, clock unit 407 may contain respectively dedicated oscillators 407-1 and 407-2, as shown. Which oscillator is employed may be determined during initialization by a system controller (e.g., a CPU (not shown) attached to a system VMEbus$^{tm}$ 410)).

For 30 kHz channels, a 512 point FFT channelizer covers a bandwidth of 15.36 MHz, while 400 30 kHz channels cover 12 MHz. The receiver must, therefore, center the 400 30 kHz channels in the center of the 15.36 MHz band, thereby providing 56 channels or 1.68 MHz of guard bands on both ends of the band to allow for aliasing. Similarly, for 200 kHz channels, a 64 point FFT channelizer covers a bandwidth of 12.8 MHz. Centering 50 channels provides 7 channels or 1.4 MHz guard band spacing on both ends of the band to allow for aliasing.

The digitized data samples output by the receiver's high speed A-D converter are sequentially clocked over link 411 through buffer/driver interface 403 and loaded into a rate buffer FIFO (first-in, first-out) memory 413, via control signals on bi-directional link 415 from controller 405. As the data is fed to rate buffer FIFO its two most significant bits are monitored by logic circuitry 416 which serves as an amplitude monitor unit for the purpose of providing gain control for the input signals and ensuring full utilization of the dynamic range of the A-D converter. The output of unit 416 is fed back to the wideband receiver to control an attenuator (not shown) that is upstream of the A-D converter.

When the FIFO rate buffer 413 contains a block, of M samples, it signals the control unit 405 to begin processing the block of data. These M samples are then clocked out of the FIFO 413 over link 417 to a half band filter 419 in bursts at a rate higher than the input sample clock rate in order to accommodate the size of the FFT processor, which requires N samples. As will be explained in detail below, N>M implies that the overlap and add filter must operate at a clock rate faster than one-half the input sample rate.

Half-band filter 419 performs real-to-complex conversion of the input data and also decimates the data by a factor of two, thereby dividing the clock rate in half. These complex data values are clocked over link 421 to a shift register 422 employed within an overlap and add filter 420. Filter 420 comprises two real low pass filters with a cutoff frequency of one-half of the channel bandwidth. The overall length of filter 420 is given by:

$$\text{filter length} = [N * \text{number of filter taps}.$$

Shift register 422 is preferably implemented by cascading sets of delay memory units 431 with interleaved 'feedback' multiplexers 433, as shown. A respective tap stage 430 of filter 420 is formed of memory elements 431A and 431B, a feedback multiplexer 433, a coefficient memory 435 and a multiplier 437. Each coefficient memory 435 stores a respective set of filter coefficients, the number of which corresponds to the size of the FFT processor. During initialization, the coefficients are downloaded to the coefficient memory by a system controller via the 20 VMEbus$^{tm}$ 410.

In the illustrated embodiment, there are four tap stages 430-1 . . . 430-4. The outputs of multipliers 437 of the respective tap stages summed together via summation stages 432, 434, 436. Thus, as functionally illustrated in FIG. 5, shift register 422 may be considered to be formed of a set of J cascaded K-stage shift registers (J is equal to four in a preferred embodiment), or a single shift register which is J*K stages in length, to which the digital data sample outputs are supplied. The overall length (J*K) of shift register 422 is given by the desired (time domain) window length of a convolutional filter, so that the longer (greater the number of stages of) the register, the sharper the characteristic of the filter. For the 30 kHz channelizer of the present example, a 512-point FFT with a 50 kHz channel sample rate must be produced every 20 microseconds, while for a 200 kHz channelizer with a 300 kHz sample rate, a 64-point FFT must be generated every 3.333 microseconds. For the 200 kHz channelizer, which employs a 64 point FFT processor, filter 420 has an overall length of 256 stages.

As shown in FIG. 5A, the basic architecture of an overlap and add filter 420 is similar to that of a finite impulse response (FIR) filter. However, the filter of the invention differs from a conventional FIR filter by the use of feedback multiplexers 433 and long delay line elements (memories 431) between filter taps. The lengths of memories 431 are configured by the system controller during initialization and a determined in accordance with the filter's decimation rate M, referenced above. The decimation rate is defined as:

$$M = \text{round (input sample rate/2*channel sample rate)}.$$

For the 30 kHz channelizer example, the decimation rate is therefore $$M = 3.072 * 10^7 / (2 * 5.0 * 10^4) = 307.$$

For the 200 kHz channelizer example, the decimation rate is:

$$M = 2.56 * 10^7 / (2 * 3 * 10^5) = 43.$$

Within memories 431, the length of memory 431B is the decimation rate M; the length of memory 431A, which represents the filter 'overlap' is equal to N–M, where N is the size of the FFT processor. Therefore, for the example of the 30 kHz channelizer, the length of a respective memory 431A or 'overlap' is 512–307=205 samples, while, in the case of 200 kHz channels, the overlap length of memory 431A is 64–43=21 samples.

As pointed out above, input data is processed in 'blocks' of M samples of data, which are clocked out of FIFO 413 in bursts at a rate higher that the input sample clock rate, in order to accommodate the size of the FFT processor, which requires N samples. Namely, N>M implies that the overlap and add filter must operate at a clock rate faster than one-half the input sample rate. The minimum clock rate of the filter may be defined as:

$$\text{filter sampling rate} = \text{input sample rate} * N/(2*M).$$

Thus, for the 30 kHz channelizer, the minimum sampling rate is 25.62 MHz, while the minimum sampling rate for the 200 kHz channelizer is 19.05 MHz.

In order to process each block of M input samples, N clock signals are required to supply the FFT 42 (FIG. 4A) with a sufficient number of data samples for FFT processing. During the first M of the N clock signals, M samples are docked through rate buffer 413 and half band filter 419 and into shift register 422. During this time frame, a state machine-implemented filter control unit 440 applies a select control signal over link 442 to the select input port 433S of multiplexer 433 to select its upper port 433- and a clock signal via link 444 to the delay memories 431, so that data is shifted from left to right through each of the delay memories 431. For the remaining N–M ones of the N data samples, gate control unit 440 causes each multiplexer 433 to select its lower port 433-2, so that data is not clocked out of rate buffer memory 413 and there is not shifting of data through the delay memories 431B. Namely, data is not shifted from left to right through the shift register, as only the memories 431A are docked. This clocking of the memories 431A is the mechanism used to effect filter overlap diagrammatically illustrated in the functional flow of FIG. 6.

More particularly, during the N clock times, the outputs of the delay memories 431A are multiplied by the filter coefficients stored in coefficient memories 435 of the four tap stages 430-1 . . . 430-4. The first N coefficients are stored in the coefficient memory 435 of tap stage 430-1; the second N coefficients are stored in the coefficient memory 435 of tap stage 430-2; the third N coefficients are stored in the coefficient memory 435 of tap stage 430-3; and the fourth N coefficients are stored in the coefficient memory 435 of tap stage 430-4. It should be observed that the number of tap stages is not limited to four or any other number. More stages may be employed to increase the length of the filter, so as to reduce aliasing within the channel, increase channel selectivity and allow a reduction in channel sample rate. Namely, the rate at which data is shifted into the convolutional filter operator corresponds to the decimation rate M of the filter and thereby controls the sharpness of filter roll-off Setting M for optimized system performance depends upon FFT processing capability and the available sampling rate of the digitizing components (A-D converter 103).

OVERLAP AND ADD FFT PROCESSOR (FIGS. 5B–5C)

As the four sets of coefficient-weighted data samples generated by filter stages 430-1 . . . 430-4 are summed together via summation stages 432, 434 and 436 they produce an N sample aliased convolved data sequence which is stored in a dual port RAM 451 comprised of RAM sections 451A and 451B, so that it may be applied to the FFT 42. As shown in FIG. 5B, the preferred implementation of the FFT 42 thus including the dual port RAMs 451, an arithmetic logic unit (ALU) 453, a numerically controlled oscillator/modulator (NCOM) 455, an FFT engine 460, scaling logic 466, barrel shafts 471, dual port output 473 and other components. The addressing of dual port RAM 451 and the rest of the FFT 42 are controlled by a state machine, preferably implemented as a logic gate array 468.

The processing rate of the FFT 42 is defined as:

$$FFT \text{ rate} = 1/(\text{channel sample rate}).$$

For the 30 kHz channelizer example under consideration, generation of a 512-point FFT with a 50 kHz channel sample rate requires 20 microseconds, while the rate at which a 64-point FFT must be generated for a 200 kHz channelizer with a 300 kHz sample rate is 3.333 microseconds. Since currently available typical FFT devices do not operate at theses speeds, then in order to maintain throughput, FFT unit 42 (FIG. 4A) contains a plurality of FFT engines (three—461, 462, 463 in the example) illustrated in FIGS. 5B–5C that have been programmed with the proper FFT size associated with the signal processing parameters of interest. Implementing the FFT 42 with three engines 461, 462, 463 decreases the FFT revisit time for the 512 point FFT processor to 60 microseconds, and 10 microseconds for the 64 point FFT processor and allows the FFT processors to maintain real time data throughput with currently available integrated circuits.

In accordance with a preferred embodiment, the FFT engines employ a radix-4 (block floating point) algorithm having FFT sizes that are a power of 4. For a 512 point FFT processor, production of all 512 frequency bins is carried out by using two 256-point FFTs that are preceded by a decimation-infrequency radix-2 butterfly. To generate the even bins of an N-point FFT using an N/2 point FFT, it is necessary that:

$$X[2k]=FFT(x[n]+x[n+N/2]),$$

where x[n] is the N-point input sequence of the FFT, k is the FFT bin number and X[k] is an FFT bin sample.

For the case of a 512-point FFT, The samples are read out of dual port RAM 451 and supplied to arithmetic logic unit (ALU) 453, which, under the control of FFT control logic unit 468 sums the data samples x[n] and x[n+N/2]. During this time the downstream numerically controlled oscillator modulator 455, the output of which is may be driven by the output of the ALU 453, is disabled by FFT control logic gate array 468. The sum value is supplied to FFT processor 460 which generates the FFT of the even frequency bins, i.e.

$$X[2k]=FFT(x[n]+x[n+N/2]),$$

as set forth above.

For generating the odd bins of an N-point FFT, the following equation is employed:

$$X[2k+1]=FFT((x[n]-x[n+N/2])*W_N^n$$

where $$W_N=e^{-j*2*\pi/N}.$$

In order to generate a 512-point FFT for the odd bins, as odd bin data samples are read out of dual port RAM 451, the arithmetic logic unit (ALU) 453 is controlled by FFT control logic unit 468 to take the difference between the data samples x[n] and x[n+N/2]. This difference is multiplied by a numerically controlled oscillator, modulator 455 and clocked into FFT processor 460, which generates the FFT of the odd frequency bins, i.e., $$X[2k+1]=FFT((x[n]-x[n+N/2])*W_N^n).$$

In the case of a 200 kHz channelizer, which employs a 64-point, power-of-four FFT engine, neither ALU 453 nor oscillator 455 is required, so they are disabled by FFT control logic unit 468.

As described earlier, the FFT engines 460 employ a block floating point algorithm, outputting a four bit scaling factor with the complex FFT data. This scaling factor is fed to a scaling logic circuit 466 to control a barrel shift circuit 470, to which the output of the FFT engine is coupled. Barrel shift circuit 470 adjusts the data as it is read out from the FFT engines in order to ensure that consecutive FFTs are aligned to the same scale. The output of barrel shift circuit 471 is coupled to a dual port RAM 473.

As described in the above-referenced Crochiere text, the output of the Fourier transform operator (here the FFT engines of processor 460) is multiplied by a complex exponential $W_N^{-kmM}$, where M is the decimation rate, k is the FFT bin number, and m is the FFT (block) number (i.e. for the first FFT generated, m=0; for the next FFT, m=1; for the third FFT, m=2; etc.). The decimation rate M is programmed into the FFT's control logic unit 468 during initialization. To execute an equivalent operation, the FFT unit 42 of FIG. 5B uses the following identity:

$$x[((n-r))_N]=FFT(W_N^{-r k *}X[k]),$$

where x[n] is the FFT input sequence, as set forth above, and $x[((n-r))_N]$ is the circular shift of x[n] by r modulo N. In the illustrated embodiment of FIG. 5B, r is equal to mM.

Rather than perform the complex multiplication downstream of the FFT, control logic unit 468 controllably addresses dual port RAM 473, so as to access processed data values in an order that effects a circular shifting of the FFT's input data sequence.

Once FFT-processed data for each channel (frequency bin) has been written into an output dual port RAM 473, the FFT control logic unit 468 signals an attendant time division multiplexed (TDM) bus interface circuit 475 to assert the data onto TDM bus 480 so that it may be applied to attendant processors 113 (FIG. 3) on the TDM bus. Such processors correspond to processors 113, referenced previously, and may comprise digital signal processors which are operative to demodulate and extract voice or data from the channel data, as well as to perform the functions of the interpolators 43-1 , . . . , 43-N, as will be described shortly.

Data on the TDM bus 480 is divided into a plurality of time slots (e.g. 400 time slots per TDM frame). The TDM bus may be driven by a 20 MHz clock, which allows a single time slot to be used to output a single channel of data up to a 50 kHz sample rate. If a higher channel sample rate is required, multiple time slots may be assigned to a single channel. For example, a 300 kHz sample rate would be allocated six time slots. Time slots may be allocated dynamically by the system controller, which configures the channelizer with all active time slots. If data is available in dual port RAM 473 and the time slot is active, the channelizer outputs the data via buffer unit 481 and a data available signal on TDM bus 480. All digital signal processors collecting data from that time slot will read data from the TDM bus. The bus connected processors are synchronized to the TDM bus by a conventional framing signal, so that the processors 113 (FIG. 3) will know the correct time slot from which to read data.

INTERPOLATION FILTERS (FIGS. 7 THROUGH 13)

As mentioned briefly above in connection with FIG. 4A, in the preferred embodiment, the digital channel signals provided by the FFT 42 are not directly presented to the demodulation and/or error correction algorithms performed by the digital signal processors 113-1, . . . , 113-N. This is because, for the best probability of detection, the demodulation algorithms used by the DSP processors 113 expect to have the samples of each channel signal taken at or near the peak amplitude of each symbol. Typically, this peak amplitude occurs at or near the center of each symbol.

In the single channel systems of the prior art, each channel is processed separately and thus each digitized channel represented information from only one channel. In such an approach, where the output of the A-D converter 103 (FIG. 3) contains information pertaining to only one channel, it is common to use phase lock loop techniques to insure that the samples from the output of the FFT 42 have the optimum phase.

However, for a wideband channelizer 111 such as that shown in FIG. 4A, there are signals from many channels present in the output of the A-D converter 103. Furthermore, these channel signals are not necessarily guaranteed to be synchronous with one another. Therefore, there is no single optimum sampling time for the A-D converter 103 because each of the individual channel signals are not guaranteed to be in phase. Thus, one cannot provide optimum sampling for each channel by simply adjusting the sampling time of the A-D converter 103.

One possible solution in such a situation would be to increase the number of digital samples output by the FFT 42 by an interpolation factor, L, so that at least one sample is guaranteed to occur at or near the peak of each symbol of each digital channel signal. By thus increasing the output sample rate of the FFT 42, it would be possible to insure that there is a sample for each of the channels sufficiently close to the optimum point.

However, increasing the size of the FFT requires quite a bit more computational complexity. For example, to merely increase the FFT size by a factor of four, thereby guaranteeing a sample being taken within at least ninety degrees (90°) of the optimum point, would require approximately eight times the computing resources. This is because the complexity of an FFT calculation increases on the order of $$\frac{N}{2} \log_2(N).$$

So for example, in the embodiment discussed above for FIG. 5B, the three FFT engines 461, 462, and 463 would have to be replaced by twenty-four FFT engines to effect just a four times sample rate increase.

Thus, rather than greatly increase the amount of FFT computing power, the rate converters 43-1, . . . , 43-N are employed. The rate converters 43 use an efficient interpolation and decimation technique to effectively interpolate the samples output by the FFT, and then decimate these samples only at at the optimum sampling points.

The topmost plot of FIG. 8A illustrates the signal processing performed by an exemplary one of the rate converters 43-i on a digital channel signal, $x(n)$, as provided by one of the outputs of the FFT 42. As can be seen by the solid curve, the channel signal $x(n)$ consists of a series of alternating symbols, with the first symbol being a magnitude plus one, the second symbol being a magnitude minus one, and the third symbol being a magnitude plus one. The actual samples provided as the digital channel signal $x(n)$ are indicated by the darker vertical sample lines having an "x" marked along the horizontal, discrete time axis. These actual samples are taken at an input sampling rate, $f_i$.

The rate converter 43-i determines the positions of interpolated samples which are taken at a rate, $f_s$, which is at an integer multiple of the input sample rate $f_i$. A subset of these interpolated samples, namely those interpolated samples which occur closest to the center of each symbol, are then selected as the optimum samples. The optimum samples are located at the times indicated by the double arrows. The lower plot in FIG. 8A is an illustration of the output, $z(n)$, of the rate converter 43-i, which consists of only these optimally positioned samples, taken at an output sampling rate, $f_o$.

To perform this optimum interpolation between input samples, the digital channel signal $x(n)$ is first, in effect, padded with additional zero-valued samples between the actual samples. The positions of these additional zero-valued samples are indicated in the plot of $x(n)$ by samples shown with letter "o" on the x axis. Typically, this zero padding occurs at some integer multiple of the actual sample rate, $f_i$, of $x(n)$. In the illustrated example, this interpolation factor, L, is set equal to eight.

To generate the values of each of the L–1 interpolated samples between each actual sample, the zero padded signal could be filtered by a lowpass filter having a linear phase response, such as an FIR filter. The time domain impulse response of an example of one such linear phase filter, $h(n)$, is shown in the top-most plot of FIG. 8B. The impulse response $h(n)$ has a time duration, also called a number of taps, equal to N', where N' is determined by the desired filter parameters such as response time, cutoff frequency, and overshoot.

However, because only certain ones of the interpolated output samples will be of interest at any given time, only certain portions of the entire impulse response $h(n)$ need to be calculated. In other words, only a particular one of L possible decimated filters needs to operate on the digital channel signal, $x(n)$, at any given time. The L possible decimated filters represent the L possible phase shifts for the rate converter 43-i.

The particular one of the L decimated filters implemented at any given time by the rate converter 43-i is determined by a filter index number parameter, "p".

Figure 7:
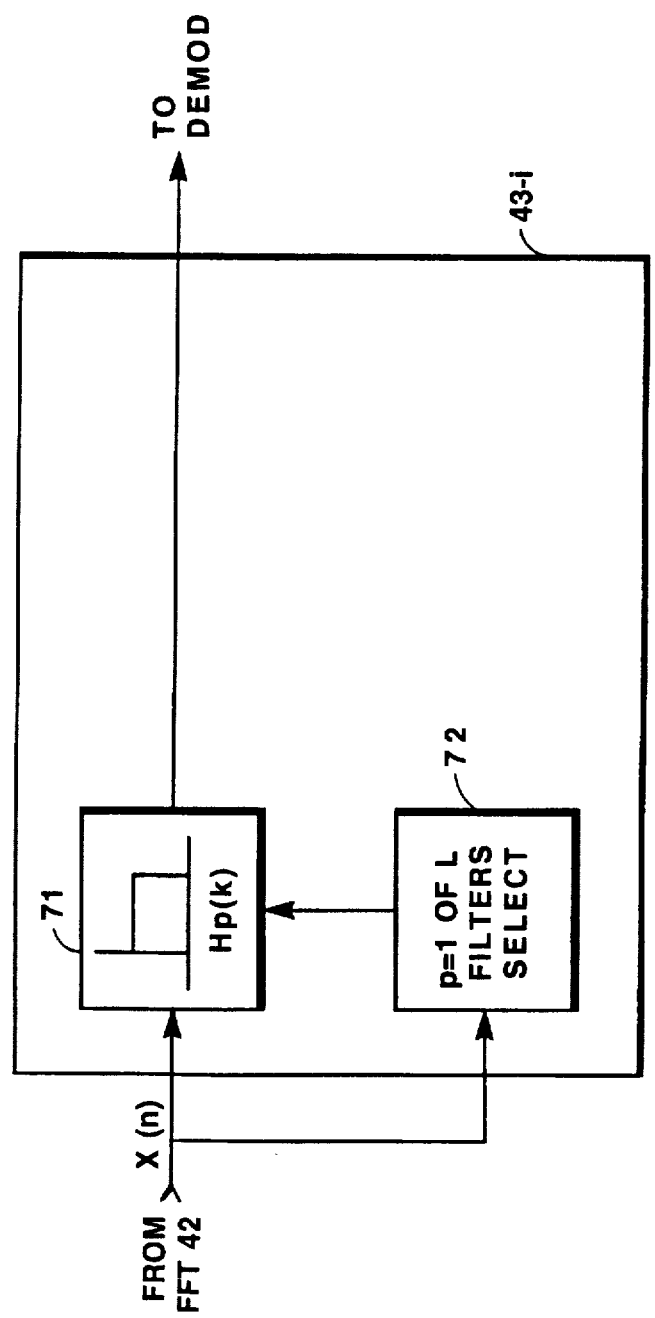
FIG. 7 diagramatically illustrates an interpolation filter which, together with the convultional filter and FFT forms part of the channelizer of FIG. 4A.

An exemplary rate converter 43-i can thus be implemented using a digital filter implementation which has a selectable phase input parameter, "p", as shown in FIG. 7. From the output of the FFT unit 42, the digital channel signal $x(n)$ is fed to a lowpass filter structure 71 which implements one of the L possible decimated filters. The individual decimated filters in the filter structure 71 have "g" taps, where "g" is determined by the ratio of the total impulse response length, N', of $h(n)$ to the interpolation rate, L. In the example shown, N' is equal to 32 and L is equal to 8, so g is equal to 4. (Please note that in this discussion of the rate converter, although the value N' is used for convenience to denote the length of the filter $h(n)$, this value N' is not related to the value of N discussed above in connection with the description of the FFT processr.) To understand how the L sets of filter coefficients needed to implement the L filters are determined, turn attention now to FIG. 8B, and consider that the time domain response of the L possible decimated filters are given by the following relationships:

$$h_o(n)=h(n), \text{ for } n=0,L,2L,3L, \ldots$$

$$h_1(n)=h(n), \text{ for } n=1,L+1,2L+1,3L+1, \ldots$$

$$h_2(n)=h(n), \text{ for } n=2,L+2,2L+2,3L+2, \ldots$$

$$h_k(n)=h(n), \text{ for } n=k,L+k,2L+k,3L+k, \ldots$$

$$h_{L-1}(n)=h(n), \text{ for } n=L-1,2L-1,3L-1, \ldots$$

Figure 8B:
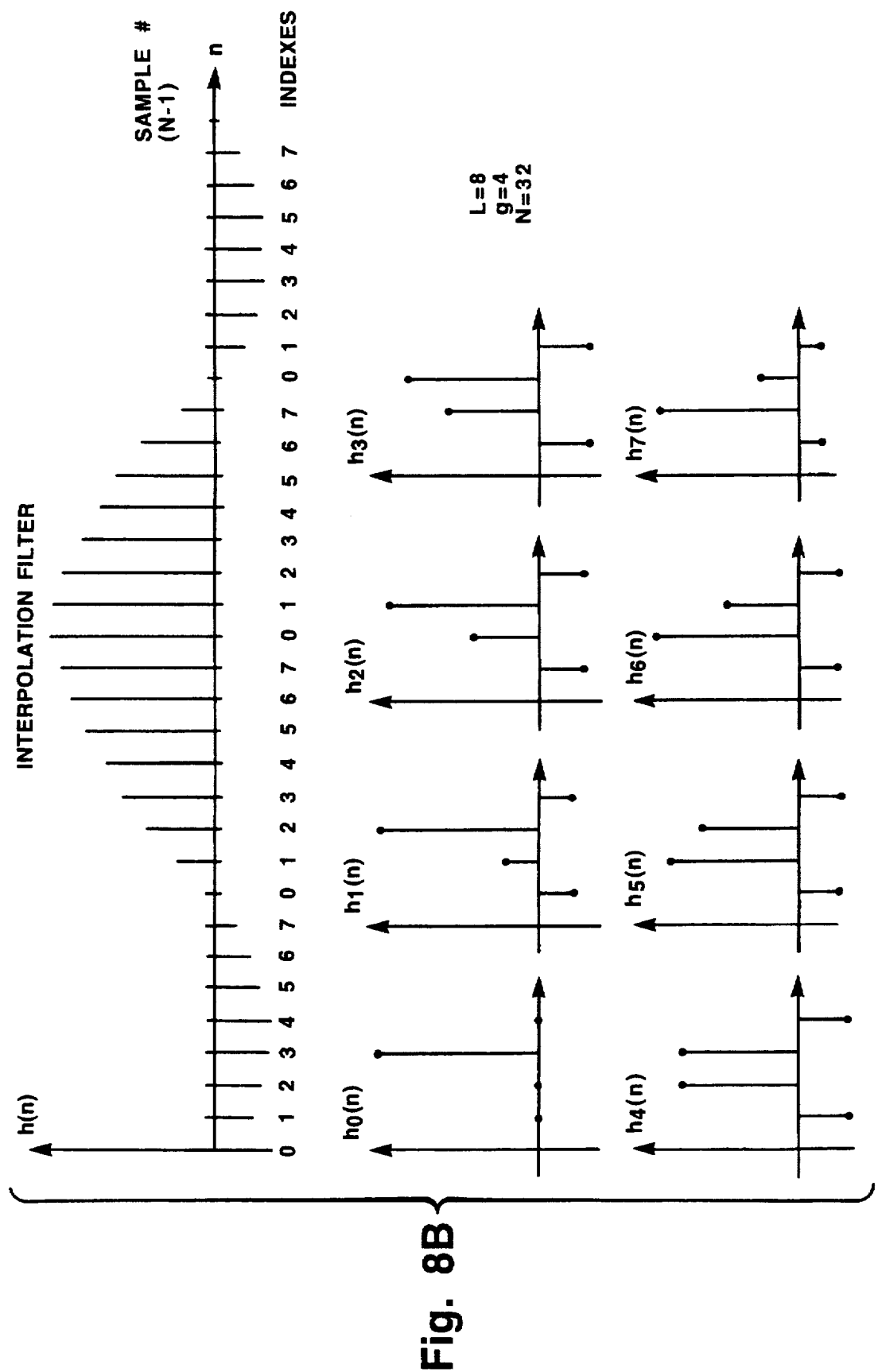

The time domain response of each of these filters is plotted in the lower portion of FIG. 8B.

The selector 72 determines the desired filter index, p, based upon a number of factors. In general, the selector 72 performs an initial timing synchronization process to find a best possible "p" as a starting point. Then, by accurately tracking the sample timing offsets caused by any fractional difference in the ratio between the input sample rate $f_i$ and output sample rate $f_o$, the parameter p can be adjusted as necessary, and the rate converter 43-i will always have the proper phase.

For these timing synchronization purposes, certain intermediate samples taken at a rate, $f_s$, are used. The positions of these intermediate samples are indicated by the single arrows in FIG. 8A. The intermediate sample rate, $f_s$, is equal to the desired output rate, $f_o$, times a factor, M'. It should be noted that this synchronization factor, M', is not necessarily equal to or even an integer multiple of the interpolation factor, L. (Please note that the interpolation factor is labeled M' here for convenience in the context of discussing the rate converter, but that this value M' is not related to the M discussed discussed in connection with the operation of the FFT processor.)

Figure 9:
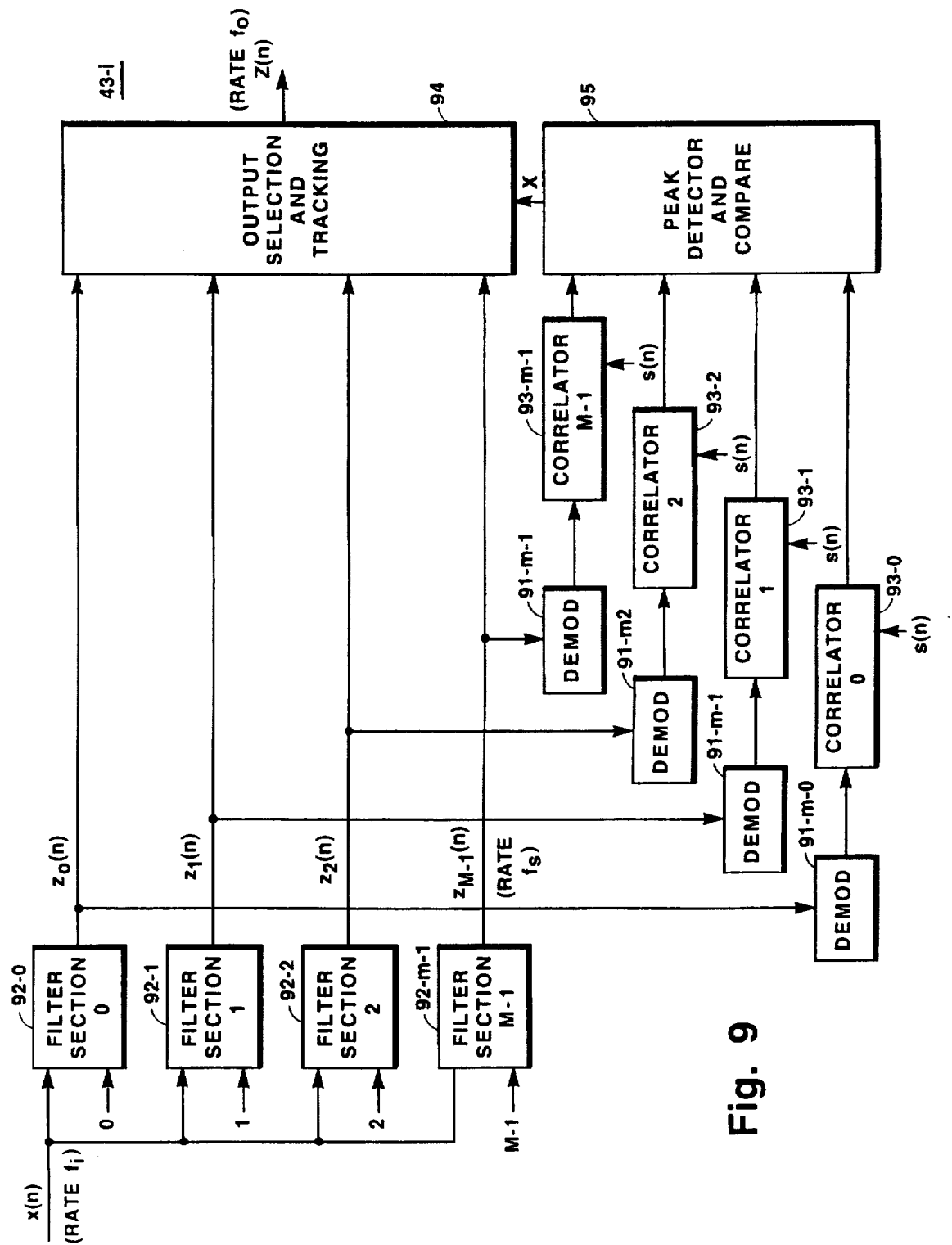
FIG. 9 is a functional diagram of a preferred embodiment of a filter index selector which operates in conjunction with the interpolation filter shown in FIG. 7.

FIG. 9 is a detailed block diagram of the selector 72 which determines the values of the intermediate samples by generating a set of M intermediate output signals $z_0(n)$ through $z_{M'-1}(n)$. Each intermediate output signal provides samples at the desired output symbol rate, $f_o$, but for a different possible phase. The effect is thus to generate an integer number, M', of samples for each symbol in the ouput signal z(n).

Figure 10:
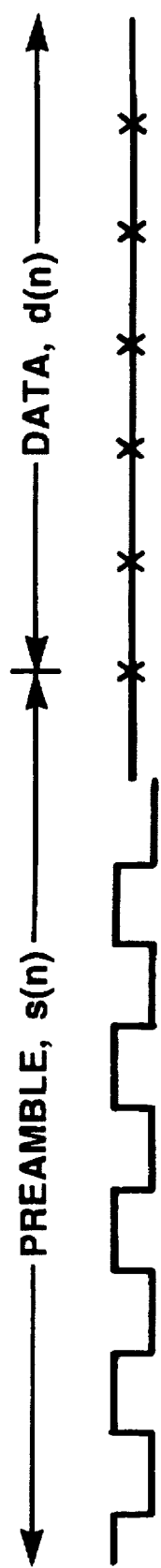
FIG. 10 is a time domain plot of a series of symbols which are expected to be received in each channel, the series of symbols comprising a frame including a preamble portion and a data portion.

Before proceeding with a detailed discussion of the operation of the selector 72, consider that, as shown in FIG. 10, a typical channel signal x(n) consists of a preamble portion, s(n) and a data portion d(n). During the preamble portion s(n), the channel signal x(n) consists of a predetermined and well-known sequence of data symbols such as an alternating sequence of minus or plus one and minus one symbols values as shown. The basic concept behind the operation of the selector 72 is to determine an actual response of each of the M' possible filter sections to this preamble portion. Since the desired response to the preamble is known, a figure of merit for each of the M' filter responses can then be determined by correlating, or comparing, each of the M' actual responses with the ideal response. The filter section which has the best correlation to the ideal preamble response is then chosen as the filter section to be used when the rate converter 43-i is receiving the data portion d(n).

As shown in FIG. 9, the exemplary rate converter 43-i consists of a plurality, M', of filter structure sections 92-0, . . ., 92-M'−1, a like plurality of correlators 93-0, . . ., 93-M'−1, a like plurality of demodulators 91-0, . . ., 91-M'−1, a phase selection and tracking circuit 94, and a peak detector and compare circuit 95. The illustrated embodiment performs the functions of both the filter structure 71 as well as the selector 72 of FIG. 7.

To perform the function of the the selector 72, the digital channel signal x(n) is first fed to each of the M' filter sections 92-0, . . ., 92-M'−1 in parallel, with each one of the sections 92 corresponding to one of the M' possible phases. The particular phase of a given filter 92 is input as a parameter, u. Each of the M' filter sections 92 operate on the digital channel signal x(n) to provide the M' filtered signals $z_0(n)$, . . ., $z_{M'-1}(n)$.

These M' filtered signals are in turn fed to the respective ones of the demodulators 91-0, . . ., 91-M'−1 which remove any symbol modulation such as phase encoding. For example, one such encoding to be removed is known as $\frac{\pi}{4}$ DQPSK (differential quadrature phase shift keying), as specified by the "EIA/TIA Interim Standard Cellular System Dual Mode Mobile Station Base Station Compatibility Standard IS-54-B, dated April, 1992 by the Telecommunications Industry Association, The outputs of the M' demodulators are then fed to the correlators 93-0, . . ., 93-M'−1, with the other inputs to the correlators being the ideal preamble sequence, s(n). In the example being described, the ideal preamble consists of an alternating sequence of plus one and minus one symbols. The correlator circuits 93-0, . . ., 93-M' each output a value indicating the correlation between their respective intermediate filtered signal $z_0(n)$, . . ., $z_{M'-1}(n)$ and the ideal symbol sequence s(n). This correlation can be performed in any suitable manner, such as by integrating the difference of the two signals for the direction of the preamble.

The peak detect and compare 95 then processes each of the correlator outputs. In particular, when a peak is detected in the output of one of the correlators 93-0, . . ., 93-M'−1, then the magnitudes of all of the correlator outputs are compared. The particular filter section 92 corresponding to the maximum output correlator 93 is then chosen as the desired filter section 92 to be used the rate converter 43-i when operating on the data portion of the digital channel signal x(n). This is indicated by outputting a parameter, x.

The rate converter 43-i then enters a tracking mode where the selected intermediate signal $z_x(n)$ is maintained as the desired output signal z(n) by the selection and tracking circuit 94. Thus, in this mode, only the selected filter section 92 needs to be operational. This tracking mode is maintained until the preamble mode is entered again, typically upon detection of another preamble.

As will be discussed shortly, the selection and trackng circuit 94 may also actively adjust the parameter x by comparing the response of the selected filter section 92-x against a subset of all of the filter sections 92-0, . . ., 92-M'−1, to determine when a filter section with another phase provides a better sample value, based upon an error detection criterion.

Figure 12:
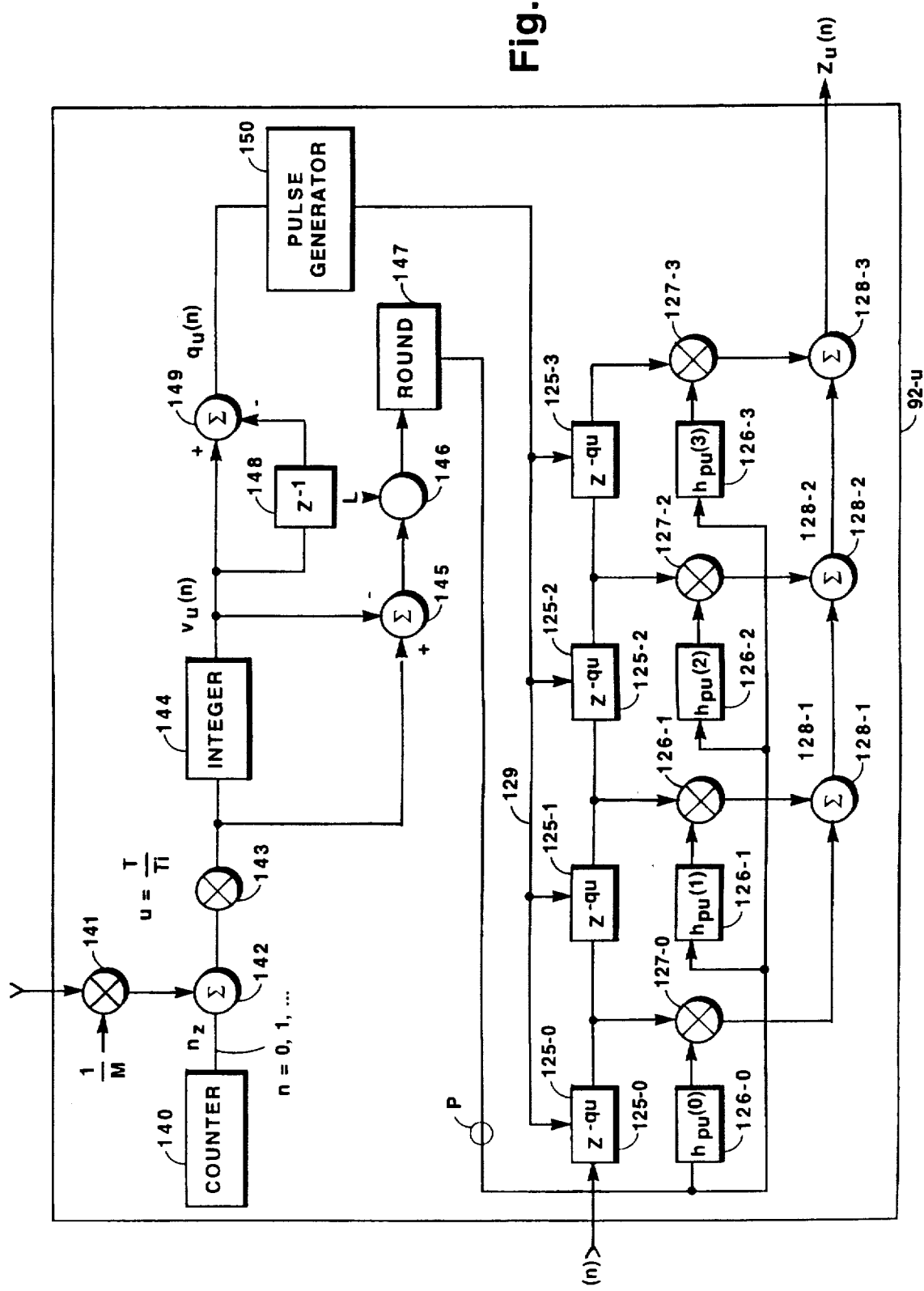
FIG. 12 is a functional diagram of interpolation filter mechanism and a filter clock generator circuit used when the sample rate of x(n) is not an exact integral multiple of the sample rate of z(n)

A signal flow diagram of an exemplary one of the M' filter sections 92-u is shown in FIG. 12. In the example being described, g, the number of taps, is equal to four. Therefore, the filter section 92-u consists of four delay units, 125-0, . . ., 125-3, four filter coefficient memories, 126-0, . . ., 126-3, four multipliers 127-0, . . ., 127-3, and three adders 128-1, . . ., 128-3. The filter 92-u is a standard digital filter structure in that each input sample x(n) is first fed to a first delay unit 125-0, and then to subsequent delay units 125-1, 125-2, and 125-3 upon the occurrence of subsequent sample counts, or clock cycles, as indicated by a clock signal 129. The clock signal 129 provides one or more clock pulses per sample of the input digital channel signal x(n).

The first stage of the filter 92-u also includes a multiplier 127-0, which accepts the output of the delay unit 125-0 as one of its inputs. The other input of the multiplier 127-0 is taken from a coefficient store 126-0, which stores the zero numbered coefficient, $h_p(0)$, for each of the L possible filter sections. The previsouly described filter index parameter, p, is thus also input to the coefficient store 126-0, to enable selection of the desired $h_p(0)$. The output of the first filter stage is multiplier 127-0 then provided to the adder 128-1.

Similarly, the second filter stage consists of a delay unit 125-1, coefficient store 126-1, which stores the coefficients $h_p(1)$ for each of the L possible filters, and a multiplier 127-1. The output of the second filter stage is fed, together with the output of the first filter stage, to adder 128-1. Subsequent third and fourth filter stages are similarly implemented.

The output samples comprising $z_u(n)$ of the filter section 92-u are then taken from the output of the last stage, which in the illustrated example is a third stage adder 128-3.

To effect the sample timing adjustment so that the maximum probability of correct symbol detection occurs, the correct filter index parameter p must also be maintained. This would be a somewhat simple matter if the input sample rate, $f_o$, that is, the sampling rate of the input digital channel signal $x(n)$, were the same as the sample rate of the output signal $z(n)$, or at least an integer multiple of that rate. In such an instance, the initial phase difference would not change as the input digital channel signal progressed. However, in most any actual system, this is not the case, and either one of the sample rates may be larger or smaller than the other, and the ratio may not necessarily be an integer. The invention thus also provides a convenient way in which to adjust for this non-integer sample rate difference.

In particular, by appropriately controlling the frequency of the clock signal 129 which is input to the filter section 92-u as well as the parameter p, any sample rate differential can be accurately adjusted for. To understand how this can be accomplished, consider a typical exemplary input channel signal sequence $x(n)$ and output signal $z(n)$ as shown in FIG. 11A. The samples of $x(n)$ for n=−2 through n=5 are shown along the top of the horizontal time line. The desired output samples $z(n)$ are shown along the bottom of the time line. The hash marks, such as indicated by reference numeral 116, indicate the potential locations of interpolated samples. In the example being described, since L=8, there are eight possible positions for each interpolated sample. As also shown, the first sample of the output digital channel signal $z(0)$ will be delayed relative to the timing of the nearest output sample $x(0)$. This delay is the initial estimate of the parameter p.

For a given $x(n)$ and a given $z(n)$, one can determine a sample rate adjustment factor, It, which is equal to the ratios of the frequency of each of the sequences. In the example shown in FIG. 11A, the sampling frequency of the digital channel signal $x(n)$ is 45 kilosamples per second (ksps) and the desired sampling rate of the interpolated output signal, $z(n)$ is 24.3 ksps. The rate adjustment factor g is thus equal to 1.851. There are, therefore, approximately two, but not quite exactly two, samples of the input sequence $x(n)$ for each desired sample of the output sequence, $z(n)$.

The actually desired output sampling rate $f_o$ is typically dictated by the symbol rate of the particular signaling standard being implemented by the receiver 100. For example, the above output sample rate of 24.3 ksps is specified by an exemplary time division multiple access (TDMA) implementation of a cellular system, such as that described in the IS-54-B Standard referred to previously. (It should be understood that the usefulness of this technique is not limited to IS-54-B.)

Recall, however, that the rate converter 43-i actually consists of M' filter sections 92-0, . . . , 92-M'−1. To determine how to best accommodate the sample rate difference, g, between the input digital channel signal $x(n)$ and output digital channel signal $z(n)$, consider that the times of the desired samples output by the filter section 92-u are given by $$t_u(n)=(n+u/M')T$$

where u is the index of the filter section 92-u, M' is the total number of filter sections 92, and T is the symbol interval. Knowing the input sample interval, $$T_i=1/f_i,$$

then then rate adjustment factor, μ is given by $$\mu=T/T_i,$$

and the index of a particular input sample, $v_u$, at discrete time, n, is given by $$v_u(n) = \text{integer}\left(\frac{t_u(n)}{T_i}\right) = \text{integer}\left[\left(n+\frac{u}{M'}\right)\frac{T}{T_i}\right],$$

and the parameter, p, by $$p_u(n) = \text{round}\left[L\left(\frac{t_u(n)}{T_i} - v_u(n)\right)\right].$$

The number of samples to shift the input sequence $x(n)$ for each sample of the output sequence $z(n)$ is just the difference between the input sample indexes:

$$q_u(n)=v_u(n)-v_u(n-1).$$

FIG. 12 illustrates how the clock 129 which drives the filter section 92-u and parameter, p, are determined. A counter 140 counts the number of z-samples, synchronous to the desired output rate $f_o$ for the output signal $z(n)$. The contents of the z-sample counter 140 thus provide a sample index number, $n_z$, which is equal to an index of the current output sample.

A multiplier 141 then determines the ratio u/M', and an adder 142 adds this to the present U sample index number, $n_z$. To determine the appropriate offset due to the difference in the input and output sample rates, this value is then multiplied by the rate adjustment factor μ by a multiplier 143. The output of multiplier 143 is then fed to an integer part selector 144 as well as to a subtractor 145. The output of the integer part selector 144 thus provides $v_u(n)$.

This value $v_u(n)$ is then fed to a subtractor 149 and delay unit 148. The output of the subtractor 149 is the number, $q_u(n)$, indicating the difference between the index of the previous sample of $x(n)$ which was used to produce the previous output sample $z(n)$, and the index of the sample of $x(n)$ being used for the currently desired output sample of $z(n)$. In the example discussed in FIG. 11A, where μ=1.851, $q_u(n)$ will either have a value of two or a value of one, depending upon the current time $n_z$.

To maintain proper output sample timing, this value $q_u(n)$ is then fed to a clock pulse generator 150, which outputs the indicated number of clock pulses to the delay units 125-0, . . . , 125-g−1 of the filter section 92-u.

To determine the filter index parameter, p, in a situation where the input and output sample rates are different, the result of the multiplication from multiplier 143 is fed to a subtractor 145, together with the index $v_u(n)$. By multiplying this result times the interpolation factor, L, in multiplier 146 and then rounding the result in block 147, the parameter p is determined.

Thus, as the z symbol counter 140 progresses and subsequent samples of the output sequence $z(n)$ are desired, the index p and clock signal 149 are adjusted to insure the appropriate selection of the L possible filters.

In the discussion so far, it has been assumed that the output selector 94 (FIG. 12) is simply a one of M selector that chooses one of the imtermediate signals $z_x(n)$ given the parameter, x, from the peak compare 95. Thus, when in the tracking mode only the filter section 92-x needs to be implemented. However, if dynamic adjustment of the filter section index is desired, the tracking function 94 may be augmented by performing a type of delay lock loop determination.

Figure 13:
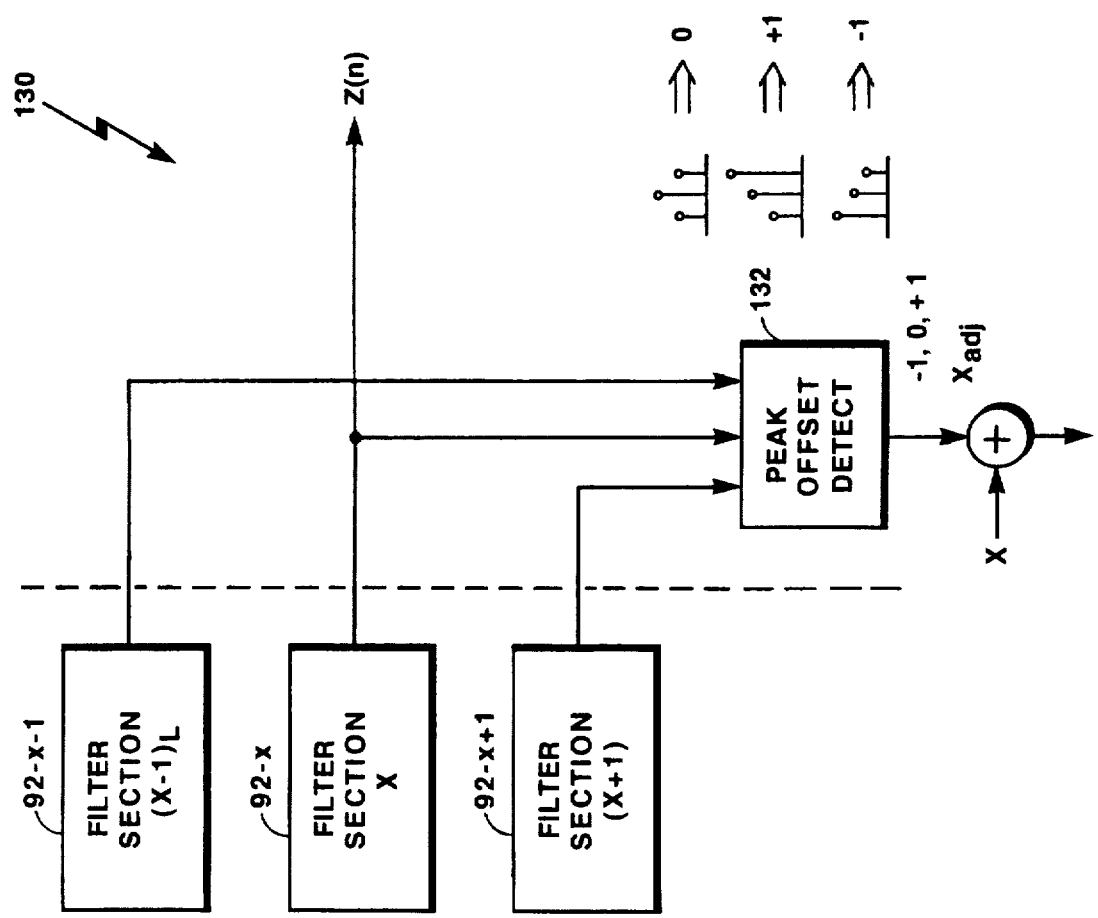
FIG. 13 diagramatically illustrates sample phase tracking function which may be used to maintain the proper timing relationship for the interpolation filter.

As shown in FIG. 13, this consists of determining the outputs of three of the filter sections, 92-x−1, 92-x, and 92-x+1. The outputs of each of these three filter sections are then forwarded to a peak offset detect circuit 132, which determines an adjustment factor $x_{adj}$.

As shown in FIG. 13, if the amplitude of the sample from the currently selected, or puncutal filter section 92-x is greater than both the sample from a lagging filter section 92-x−1 and the sample from a leading filter section 92-x+1, then no adjustment is necessary. In this instance, the $x_{adj}$ factor is set to zero, and x is not adjusted.

However, if the amplitude of the sample from leading filter section 92-x+1 is greater than the value of the punctual filter section 92-x and that of the lagging filter section 92-x−1, that indicates that a phase adjustment may be necessary to bring the rate converter 43-i output closer to the center of the symbol. Thus, an $x_{adj}$ factor of +1 is output, and added to the x paramenter from the peak detect and compare 95 before being used to select the active filter section 92-x.

Likewise, in the event that the amplitude of the sample from the lagging filter section 92 x−1 is greater than both the punctual filter section 92x and leading filter section 92-x+1, that may indicate that an adjustment in the opposite direction is needed.

The foregoing operations of the rate converter 43-i are typically implemented in the respective DSP 113-u associated with the particular channel, i. However, it should be understood that the operations of the rate converter 43-i can also be performed by appropriately arranged hardware. In addition, there may be a DSP unit 113 dedicated to performing the functions of the rate converter 43-i for more than one channel.

OVERLAP AND ADD COMBINER (FIGS. 14–14C)

Figure 14:
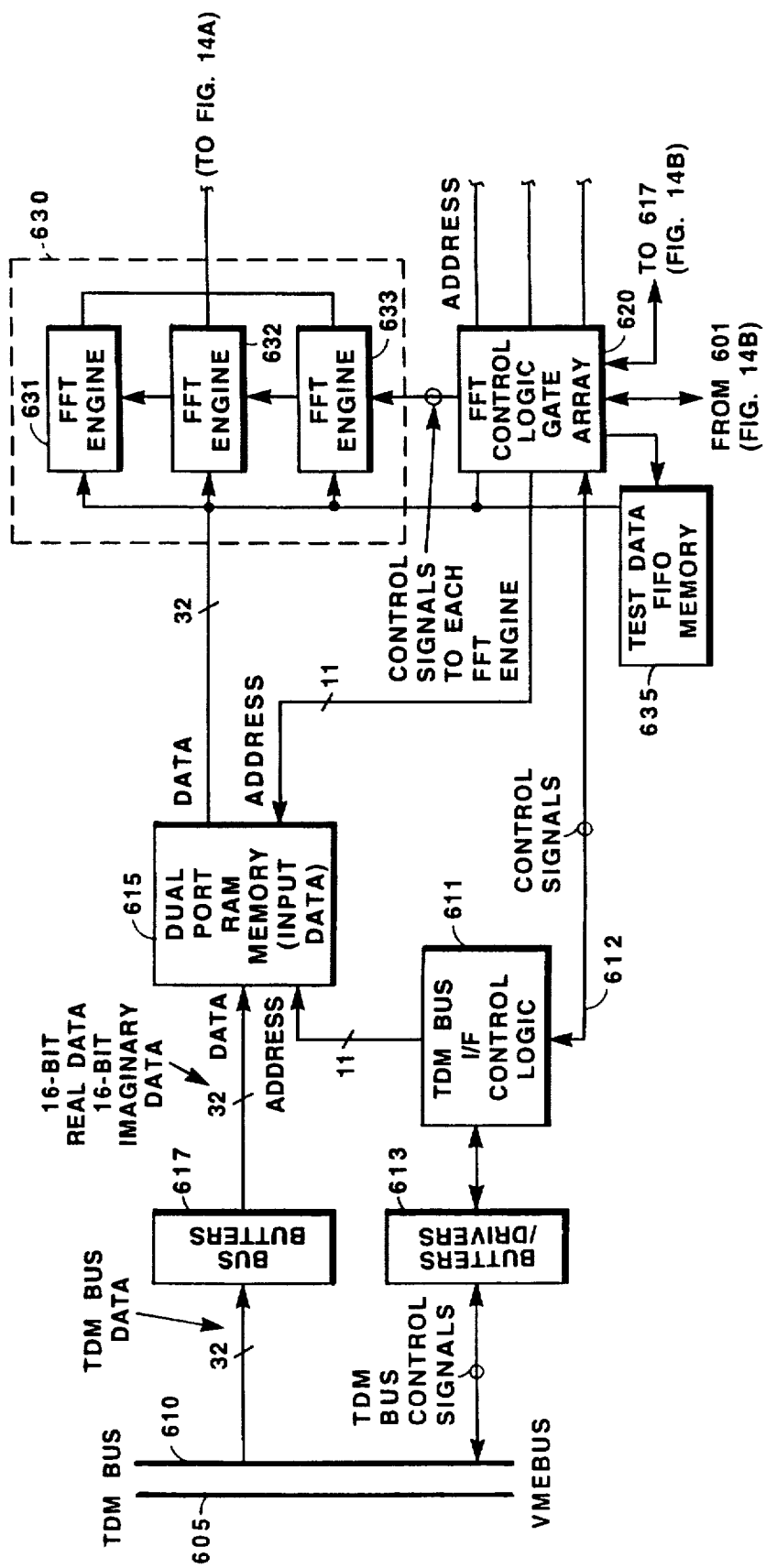
FIGS. 14–14A diagramatically illustrate the signal processing architecture of a multichannel overlap and add deconvolutional filter which forms part of the combiner of FIG. 4B and which is functionally complementary to the overlap and add convultional filter of FIGS. 5–5A.
Figure 14A:
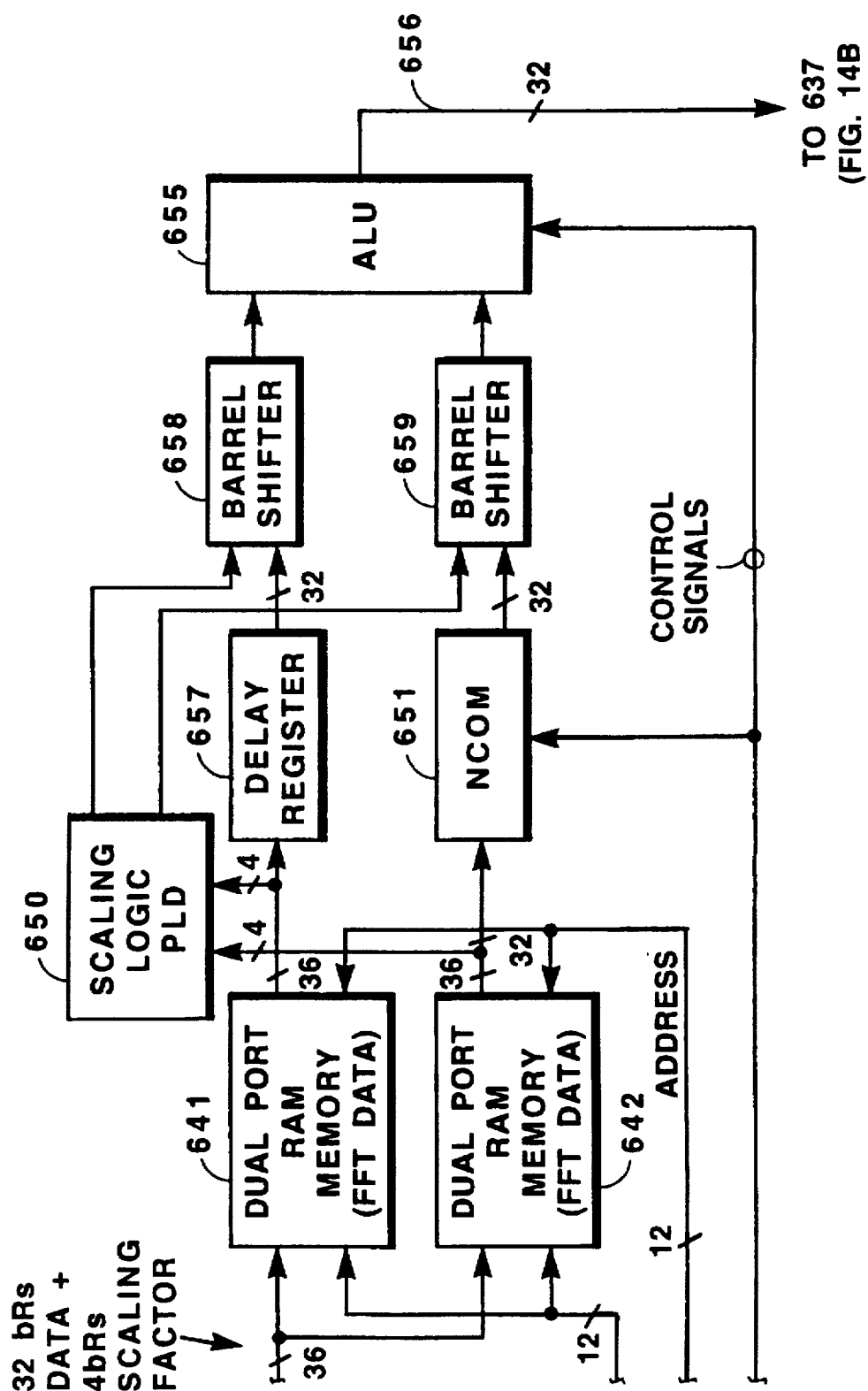
Figure 14B:
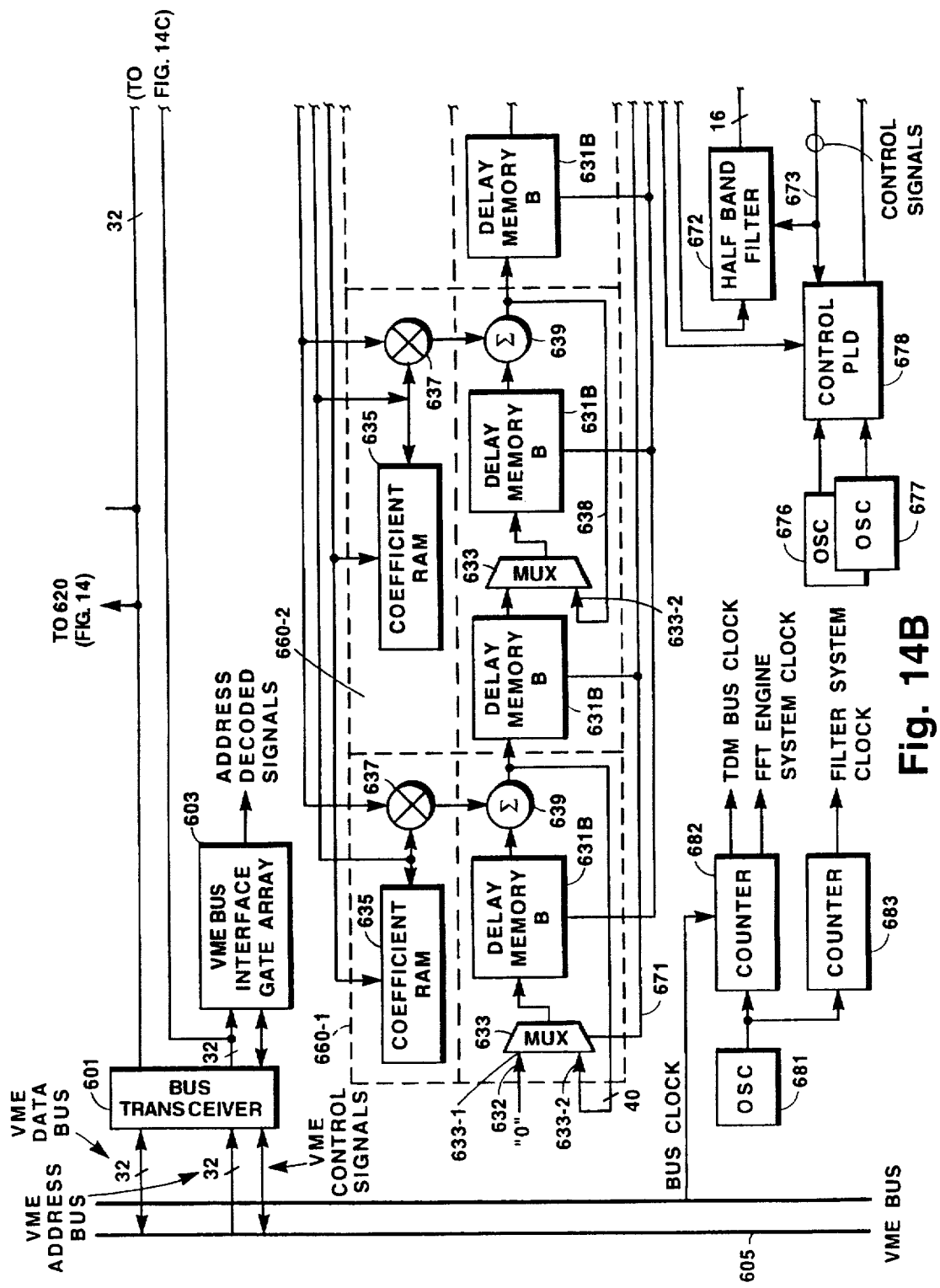
FIGS. 14B–14C diagramatically illustrate an inverse fast Fourier transform processor which forms part of the combiner of FIG. 4B and which is complementary to the FFT processor of FIGS. 5B–5C.
Figure 14C:
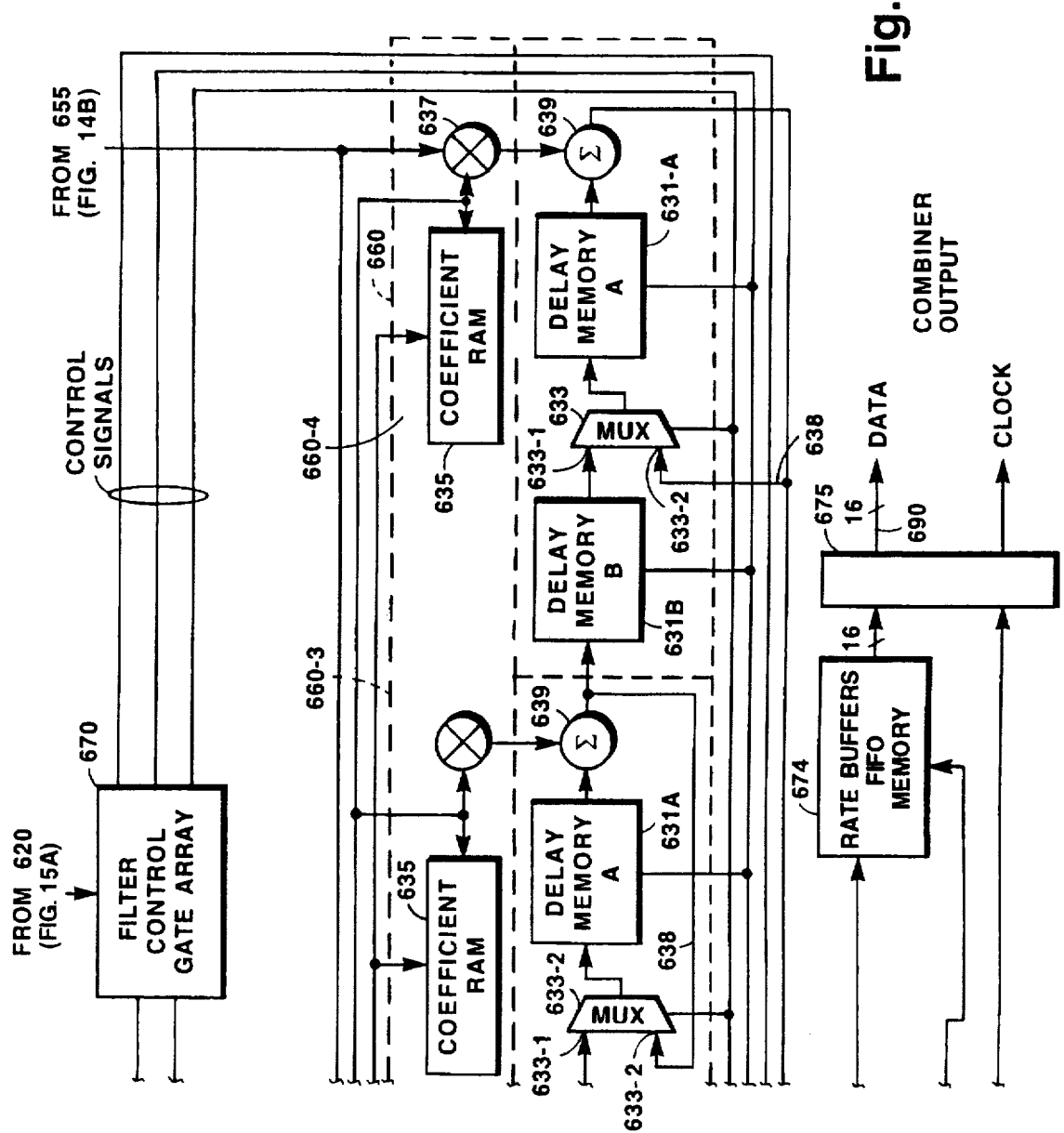

FIGS. 14–14C diagrammatically illustrate the signal processing architecture of a multichannel combiner 131, which is complementary to the wideband channelizer 111 having the overlap and add filter structure of FIGS. 5–5A, described above. As in the case of the channelizer, the signal processing functionality of multichannel combiner essentially corresponds and is functionally equivalent to the signal processing flow diagram shown in FIG. 17, which corresponds to FIG. 7.20 of the above referenced Crochiere text.

Like the overlap and add channelizer shown in FIGS. 5–5A, described above, combiner unit 131 employs a practical implementation that allows real-time processing of multiple digital voice or data signals, and performs frequency translation and signal combining to an IF (intermediate frequency) output sample rate. The implementation of FIG. 14A provides fully programmable control of the system parameters via a standard VMEbus$^{tm}$ interface 601, 603 and channelized data collection over a custom, time division multiplexed (TDM) data bus 605.

As in the above description of the channelizer of FIGS. 5–5C, the overlap and add combiner of FIGS. 14–14C will be described for non-limitative examples of a 400 channel/30 kHz system which can be used in a NADC (TDMA) cellular system, and a 50 channel/200 kHz system which can be used with the European GSM cellular standard. For 30 kHz channels, a sample rate of 50 kHz is assumed. For 200 kHz, a 300 kHz sample rate is assumed. Channelized data is received by the combiner as analytic baseband signals. Channel sample rates depend upon the combiner's filter design.

The combiner architecture of FIGS. 14–14C employs a custom TDM bus 610 for collecting data for a large number of channels at relatively high data rates, since the aggregate data rate from all channels typically exceeds the bus bandwidth of the VMEbus$^{tm}$ 605 and other standard bus protocols. TDM bus 610 has its clock set at 20 MHz, so as allow 400 time slots per frame. Each time slot can transfer a single channel of data up to the above-referenced 50 kHz sample rate. For higher rates, multiple slots per frame can be assigned to a single source. As noted above with reference to the TDM bus of the channelizer of FIG. 4, a 300 kHz sample rate would require six slots per frame, since each slot handles a sample rate of 50 kHz (and six times 50 kHz is 300 kHz).

The sources of the channelized data that are asserted onto the TDM bus are DSP processors 113 (FIG. 3) that format (e.g. to a cellular standard) and modulate incoming voice or data signals from an attendant telephone network, thereby providing a baseband analytic signal. Each data source is assigned one or more time slots during which it will transfer a single complex sample when requested by the combiner. No two sources can be allocated the same time slot. Time slots are assigned by a system controller (a separate CPU on VMEbus$^{tm}$ 605) during system initialization. The system controller also programs the combiner to specify all times slots that contain valid data.

A sample from each DSP processor is requested via control signals applied to TDM bus 610 from a TDM bus controller 611 (logic array-implemented state machine) and associated buffer/drivers 613. This sample is written into a dual port RAM buffer 615 via bus buffer unit 617. TDM bus control logic unit 611 synchronizes addressing of RAM buffer 615 to framing signals of the TDM bus, thereby insuring that each channel is written to the proper address in dual port RAM 615. When the combiner has collected data from all operative channels, the TDM bus controller 611 couples control signals via link 612 to an FFT control logic unit 620, causing FFT control logic unit 620 to initiate FFT processing. Like logic gate array 468 in the channelizer, FFT control logic unit 620 is a state machine preferably implemented as a logic gate array. Complementary to the forward FFT processor functionality of the channelizer of FIG. 4, the combiner of FIG. 6 causes an inverse FFT to be performed. In terms of a practical implementation, however, generation of an inverse FFT is effected using a forward FFT, as will be described.

FFT PROCESSOR

The FFT processor, shown at 630 in FIGS. 14–14A, is configured to have a size equal to the next 'power of two' greater than the number of channels to be combined. As noted above, four hundred 30 kHz channels require a 512-point FFT, while fifty 200 kHz channels require a 64-point FFT. FFT size is programmed into the FFT engines during initialization. The channel rate also specifies the FFT processing rate in accordance with the equation:

*FFT* rate=1/(channel sample rate)

As explained previously, a 50 kHz sample rate for 30 kHz channels requires that a 512-point FFT be generated every 20 microseconds, while a 300 kHz sample rate requires a 64-point FFT every 3.333 microseconds. Since currently available typical FFT devices do not operate at these speeds, to maintain throughput, FFT processor 630 contains a plurality of FFT engines (e.g. three—631, 632, 633 in the illustrated example) that have been programmed with the proper FFT size associated with the signal processing parameters of interest. Implementing FFT processor 630 with plural engines reduces the FFT revisit time for the 512 point FFT processor to 60 microseconds, and 10 microseconds for the 64 point FFT processor.

A 512-point inverse FFT requires 512 samples; however, there are only 400 time slots. These 400 time slots are centered in the 512 bin window of FFT processor 630. Control logic unit 620 causes zeros to be written sequentially into an FFT engine for the first 56 bins. For the next 400 bins, data may be read from dual port RAM 615 for the active channels. If the channel is not an active channel, control logic unit 620 will write a zero into that bin. The identities of those channels that are active are 5 programmed into control logic unit 620 during system initialization. For the last 56 bins, zeros are written into those bins. (For a 64-point FFT, zeros are written into the first and last seven FFT bins allowing fifty 200 kHz channels.)

To provide built-in-test capability, test data may be written into one or more bins via VMEbus$^{tm}$ 605. For this purpose, a first-in-first-out (FIFO) memory 635, dedicated for test capability, is coupled to bus 605 via transceiver unit 601, so as to allow a CPU on the VMEbus$^{tm}$ to write a test signal to the combiner. In addition, the system controller can program FFT control logic unit 620 to read data from FIFO memory 635 rather than dual port RAM 615 for specific bins. Test data may be written into the first and last seven FFT bins, thus leaving fifty 200 kHz channels available for incoming active data channels.

In order to generate an inverse FFT using a forward FFT, the following identity is used:

$$x[n]=K*FFT(X[((-k))K]),$$

where x[n] is the inverse FFT of X[k], n is the sample number, k is the FFT bin number, K is the FFT size, and $X[((-k))_K]$ represents a sequence which is the reverse of the order of the sequence X[k], by modulo K. By generating a mirror of the input data to the FFT about bin number 0, the forward FFT becomes an inverse FFT scaled by the FFT size. Control logic unit 620 addresses the input dual port RAM 615 in a reverse order when writing data into the FFT engines.

As in the channelizer implementation of FIGS. 5A and 5B, to generate a 512-point FFT in the combiner architecture of FIGS. 14A and 14B, the FFT engines employ a radix-4 (block floating point) algorithm having FFT sizes that are a power of four. To generate the even bins of an N-point FFT using an N*2 point FFT, it is necessary that:

$$X[k]=G[k]+H[k]*W_N^k$$

where X[k] is the N-point FFT of an input sequence x[n], k is the FFT bin number, N is the FFT size (512), G[k] is the N/2-point FFT of the even samples of x[n], H[k] is the N/2-point FFT of the odd samples of x(n], and $$W_N=e^{-j*2*\pi/N}.$$

Figure 5C:
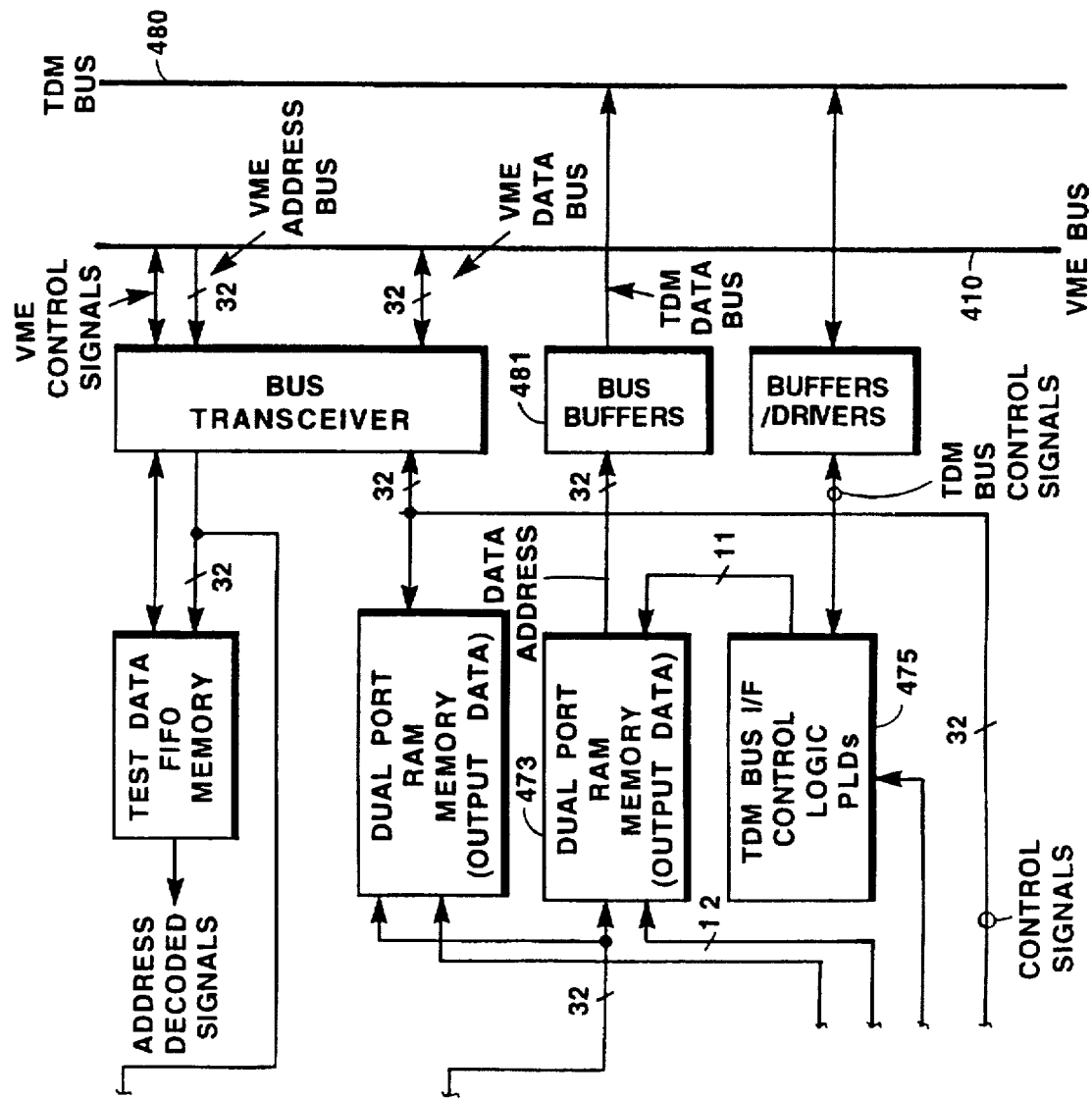

As in the channelizer of FIGS. 5–5C, a 512-point FFT for the combiner is generated from two 256-point FFTs.

The N/2-point FFTs are generated from even and odd samples of the 512-point input sequence. In the architecture of FIG. 6, a first (upper, as viewed in the Figure) FFT data dual port RAM 641 stores G[k]. A second (lower as viewed in the Figure) FFT data dual port RAM 642 stores H[k] *$W_N^k$. Multiplication of H[k] and $W_N^k$ is performed by a numerically controlled oscillator/modulator (NCOM) 651 for k=0 to 255. To process the first 256 bins of a 512-point FFT, the output of RAM 641 is summed with the output of RAM 642 by means of an arithmetic logic unit (ALU) 655. Since $$W_N^k=-W_N^{k-N/2}, \text{ for } k=256 \text{ to } 511,$$

the output N of RAM 642 is subtracted from the output of RAM 641 for the remaining 256 bins of the 512-point FFT.

In order to accommodate the propagation delay through NCOM 651 and ensure that the proper pair of samples are processed by ALU 655, a set of delay registers 657 are coupled in the output path from dual port RAM 641 to the ALU. (For the 200 kHz channels, a 64-point FFT is used. Since 64 is a power of 4, NCOM 651, dual port RAM 642, and ALU 655 are, not necessary and are disabled by control signals from control unit 620.)

Figure 17:
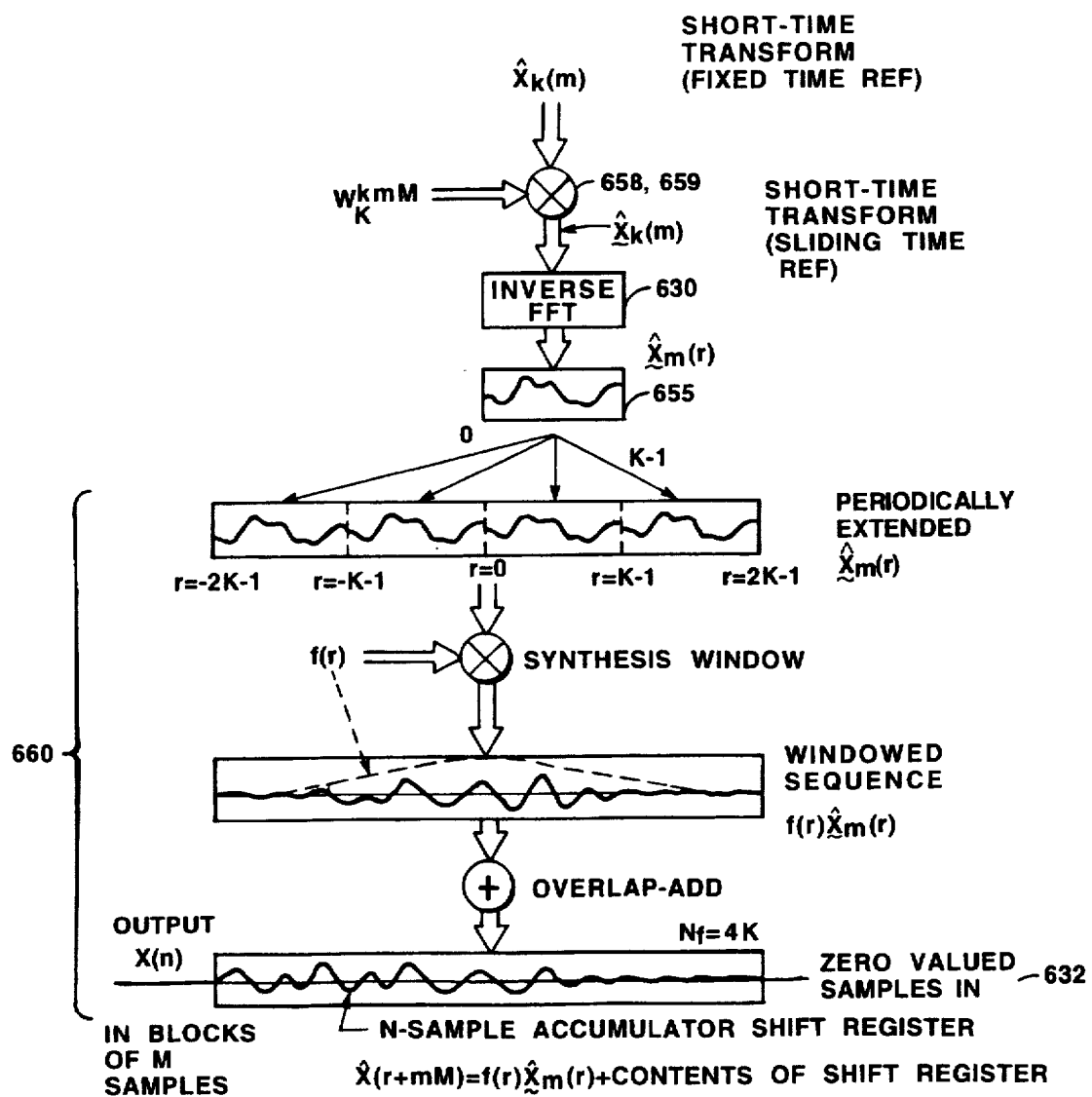
FIG. 17 is a functional diagram associated with the signal processing mechanism executed by the polyphase implementation of the overlap and add combiner of FIG. 14B.

As described in the above-referenced Crochiere text, and shown in FIG. 17, the combiner algorithm requires the input sequence of the inverse FFT be multiplied by the complex exponential, $W_K^{kmR}$, where k equals the input frequency bin number, K is equal to the inverse FFT size, m is the inverse FFT number (i.e. for the first inverse FFT generated, m=0; for the next FFT, m=1; etc.), R is the combiner's interpolation rate, and $$W_K=e^{-j*2*\pi/K}$$

Using a mathematical identity, this multiplication operation can be effected by a circular rotation of the output samples of the inverse FFT, i.e.:

$$x[((n-r))k]=\text{inverse } FFT (W_K^{-rk*}X[k]),$$

where r is equal to −mR. By rotating the inverse FFT output samples by −mR, the phase shift of the complex exponential is generated. This rotation is performed by the FFT output addressing logic in FFT control logic gate array 620. The mount of rotation is preprogrammed during initialization of the combiner.

As noted earlier, the FFT engines generate FFTs using a block-floating point algorithm. The block-floating point FFT provides a scaling factor which depends upon the characteristics of the input data. Since the two 256-point FFTs used to generate a 512-point FFT may not have the same scaling factor or consecutive FFTs may not have the same scaling factor, barrel shifting circuits 658, 659 are coupled in the signal flow input paths to ALU 655. As described previously in connection with the operation of the channelizer of FIG. 4, the barrel shifters adjust the FFT data to the same scale to properly align the data for subsequent processing.

OVERLAP AND ADD FILTERING

As in the channelizer of FIGS. 5–5C, the deconvolutional overlap and add filter of the combiner of FIG. 6, shown at 660 in FIGS. 14B–14C, comprises four filter tap stages 660-1, 660-2, 660-3 and 660-4. The FFT size and the number of stages set the overall length of the filter, which is defined by:

Filter Length=N*number of stages, where N is the FFT size.

Filter 620 is designed as a real low pass filter with a cutoff frequency equal to one half the channel bandwidth. It should be observed that the filter is not limited to a four stage filter; more stages may be employed, if desired, which will increase channel selectivity, reduce aliasing within the channel and can decrease the channel sample rate. A respective stage 630-i of filter 630 is formed of one or both of memory elements 631A and 631B, a feedback multiplexer 633, a coefficient memory 635 and a multiplier 637. Each coefficient memory stores a respective set of N filter (weighting) coefficients, the number of which corresponds to the size of the FFT processor. The coefficients are downloaded to the coefficient memory 635 via the VMEbus™ 605 during initialization. Address inputs for the coefficient memories are supplied via links 629 from a (gate array logic-implemented) filter control state machine 670, while data inputs are coupled via data links.

The first N coefficients are loaded into the coefficient memory 635 of the first or leftmost stage 630-1; the second N coefficients are stored in the coefficient memory 635 of tap stage 630-2; the third N coefficients are stored in the coefficient memory 635 of tap stage 630-3; and the fourth N coefficients are stored in the coefficient memory 635 of tap stage 630-4. The output of the FFT processor from ALU 655 is distributed via link 656 to multipliers 637 of all filter stages and multiplied by the coefficients of each stage simultaneously. The outputs of multipliers 637 are coupled to adders 639, to be added to data being accumulated and shifted through the delay memories.

As in the filter of the channelizer of FIG. 4, the delay memory of each stage, with the exception of the first stage 630-1, is divided into two memory sections 631A and 631B. The first filter tap stage 630-1 does not require a delay memory section 631B, since zeros, supplied via link 632 to multiplexer 633, are shifted into the first filter stage. The length of each delay memory is determined by the filter interpolation rate, which is defined in accordance with the channel and output sample rates. The output sample rate of the combiner is given by:

Output sample rate=$N$*channel bandwidth.

For 30 kHz channels, the output sample rate is $3.0*10^4*512=15.36$ MHz. For 200 kHz channels, the output sample rate is $2.0*10^5*64=12.8$ MHz. The filter interpolation rate, R, is the nearest integer of the following quotient:

R=*round* (output sample rate/channel sample rate)

As noted above, for the example of using 30 kHz channels with a 50 kHz channel sample rate, the interpolation rate is R=307; for 200 kHz channels with a 300 kHz channel sample rate, the interpolation rate is R=43. The length of each of delay memory sections 631A is R, while the length of delay memory section 631B, also known as the filter overlap, is given by:

overlap=$(N-R)$.

Thus, for 30 kHz channels, the filter overlap is 205; for 200 kHz channels the filter overlap is 21. The interpolation rate R also specifies the required signal processing rate of the overlap and add filter. The minimum clock rate the filter must process data to maintain throughput is given by:

filter processing rate=output rate*$N/R$.

For a 30 kHz channel system the minimum rate is 25.62 MHz. For a 200 kHz channel system, the rate is 19.05 MHz.

For every N samples output by the inverse FFT processor, overlap and add filter 660 outputs R samples. For the first R samples of each inverse FFT, filter control state machine 670, selects, via select control link 671, a first or upper input port 633-1 through the multiplexers 633. During this time, all data is shifted or clocked via clock control link 669 from left to right, as viewed in FIG. 6, and summation values produced by adder 639 in the last stage 630-4 of the filter are input to a half band filter 672.

For the remaining N–R samples, a second or lower port 633-2 of each multiplexer 633 is selected, and the outputs of adders 639 are fed back via links 638 to the delay memory sections 631A. During this time memory sections 631B are not shifted and the data at the last stage 630-4 is not clocked into the half band filter. Again, as in the channelizer filter, the feedback of the last N–R samples provides the filter overlap.

HALF BAND FILTER AND RATE BUFFER

The output of filter 630 is coupled to a half band filter 672, since RF transmitter exciters typically require a real signal rather than a complex one. Half band filter 630 is configured as an integrated circuit that provides complex to real data conversion, which doubles the output sample rate. Although the entirety of the combiner of FIG. 6 could be implemented as a completely real system, this would require all sample rates, processing rates and FFT sizes to be doubled, increasing complexity and cost. A rate buffer FIFO memory 674 is coupled to the output of half band filter 672 to allow a continuous flow of data from the combiner. Data stored in FIFO memory 674 is coupled via output driver unit 675 to an output data link 690 for application to D-A converter 133 (FIG. 3) of the transmit side of the transceiver site.

As noted earlier, overlap and add filter 630 provides a burst of R samples every N clock cycles, and the output FIFO 674 provides a continuous flow of data at the real output sample rate. Additionally, a half full flag from the FIFO is supplied over a control signal line 673 to a control logic circuit, to indicate to the TDM bus interface unit 611, via control links distributed among the respective state machines, when to request data. When the quantity of data stored in FIFO 674 falls to less than half the capacity of the FIFO, the flag becomes inactive, which signals the TDM bus interface to request channel data from its active channels and being processing to maintain the continuous flow of output data.

As in the channelizer architecture of FIGS. 5–5C, respective oscillators are provided for each output sample rate required. For the present example of a combiner capable of processing either 30 kHz or 200 kHz channels, respective 30.72 MHz and 25.6 MHz (2*output sample rate) clocks 676 and 677 are provided. During initialization of the combiner by the system controller, the proper oscillator is selected by an associated control logic unit 678.

An additional set of logic circuits is included to generate additional clock signals employed by the combiner. As in the channelizer architecture of FIGS. 5–5C, the clock output of a high rate (approximately 200 MHz) oscillator 681 is divided down by counters 682 and 683 to generate the necessary filter processing clock, TDM bus clock, and FFT engine system clock.

CHANNELIZER USING POLYPHASE FILTERS
(FIGS. 15–15C)

A second embodiment of the wideband channelizer of the present invention is configured as a polyphase filter structure, which is functionally expressible by the signal processing flow diagram shown in FIG. 7.15 of the above referenced Crochiere text. Again, since algorithms for each of the filter transform functions (respectively employed by polyphase implementations of the filter structure contained in channelizer 111 and combiner 131 of FIG. 3) are rigorously set forth in the Crochiere text, they will not be repeated here.

Figure 15:
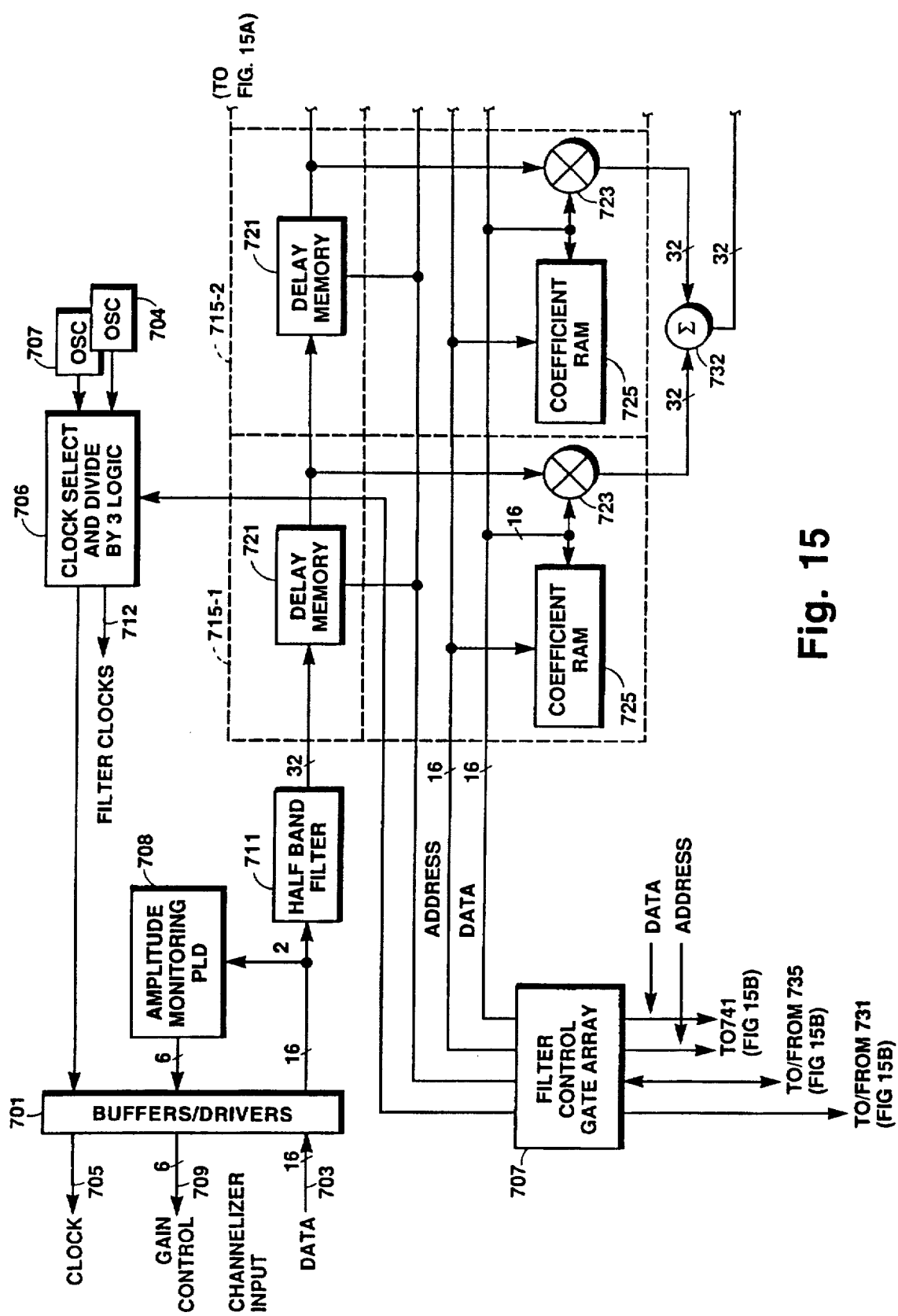
FIGS. 15–15C diagrammatically illustrate the configuration of a channelizer employing a polyphase convolutional filter in accordance with an alternate embodiment of the invention.
Figure 15A:
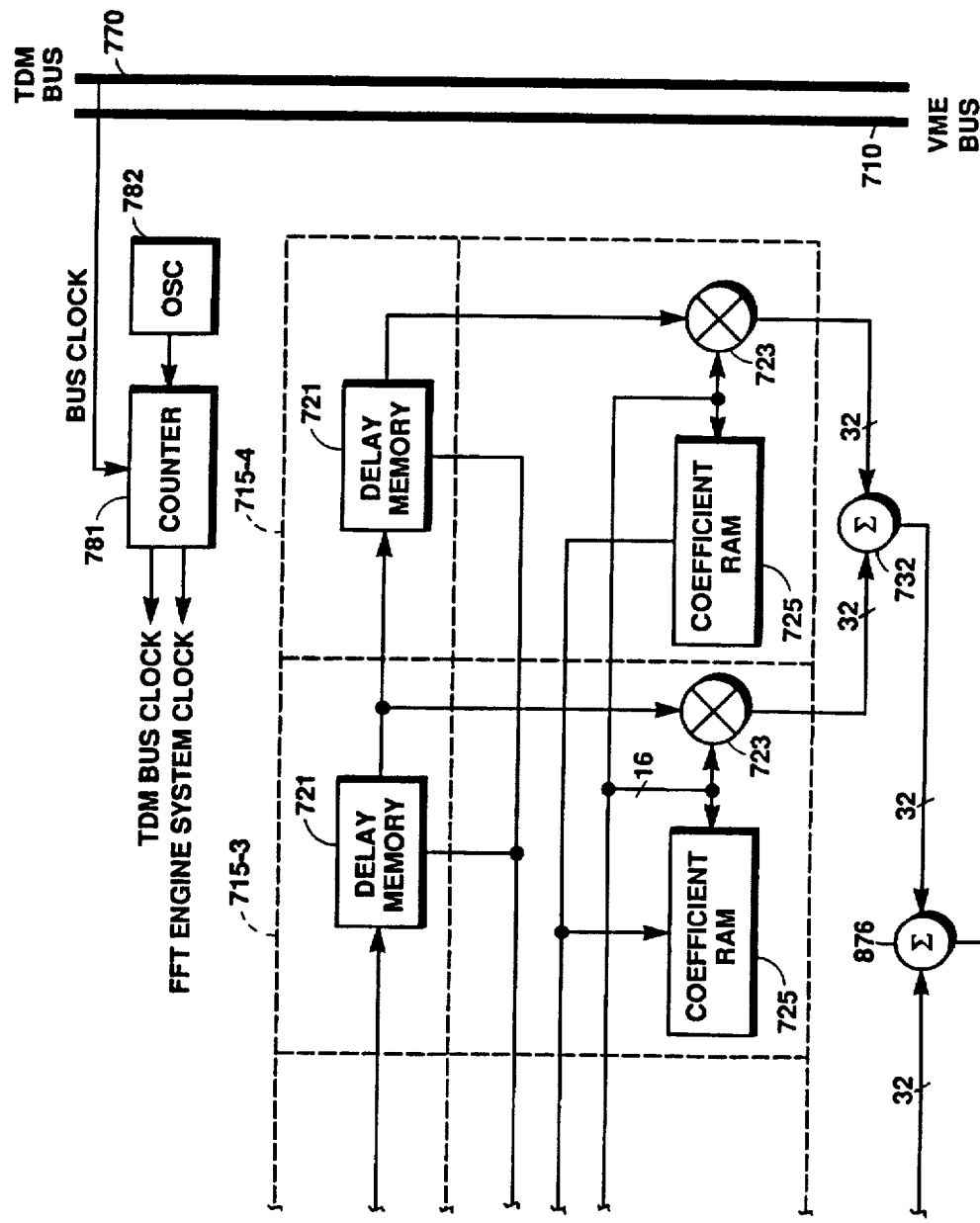

As in the overlap and add channelizer embodiment of FIGS. 5–5A, the architecture of an FFT-based polyphase filter bank analysis (channelizer) system of FIGS. 15–15A accepts real-time wide band IF (intermediate frequency) signals and performs frequency translation and channelization to a number of individual narrow baseband analytic signals. The polyphase filter channelizer provides full programmable control of the system parameters via a standard VMEbus™ interface and channelized data distribution over a custom, time division multiplexed (TDM) data bus. (Keeping with the foregoing examples, the description of the polyphase filter embodiment to follow will address specifics of a 400 channel/30 kHz system, and a 50 channel/200 kHz system.)

A characteristic of the polyphase channelizer architecture is that the input sample rate is an integral multiple of the channel sample rate. This implies that the channel sample rate must be a multiple of the channel bandwidth. In the present description the channels are oversampled by a factor of two; therefore, a 60 kHz sample rate for 30 kHz channels is assumed, and a 400 kHz sample rate for 200 kHz channels is assumed. Channelized data is distributed by the channelizer as analytic baseband signals.

HALF BAND FILTER, AND AMPLITUDE MONITORING

Now referring to FIGS. 15–15A more particularly, the channelizer's input interfaces via a buffer/driver unit 701 to upstream wide band digital receiver, in particular, to the digital data output link 703 from A-D converter 103 of FIG. 3. Clock line 705 supplies the sample clock which is to be used for the converter's encoding clock. The input sample clock rate is determined by the number of channels being received and the bandwidth of those channels. An amplitude monitoring logic circuit 708 monitors the two most significant bits of the input data from the digital receiver's A-D converter on data link 703, in order to provide automatic gain control of the input signal. This insures that the full dynamic range of the A-D converter 103 in the receiver is being utilized. Amplitude monitoring logic circuit outputs a control word to the receiver on link 709 which may be used to control a digital attenuator upstream of the A-D converter.

Respective oscillators 702, 704 are provided for each input rate the channelizer may use. A select and divide-by-two logic circuit 706, under the control of a filter control state machine 707, is coupled to oscillators 702, 704. During initialization, a system controller (a CPU on VMEbus™ 710) configures the channelizer to select the proper oscillator. The oscillator clock is also divided down to generate a clock on output clock link 712 to drive the channelizer's shift register delay memory, to be described. The input samples on data link 703 are clocked into a half band filter 711, which is configured as a finite impulse response (FIR) filter that performs a real-to-complex conversion of the input data. Half band filter 711 also decimates by two, reducing the clock rate of the data by half. The complex samples are then fed into a shift register 713 of a polyphase filter 715. In particular, the output of halfband filter 711 is clocked into a delay memory 721 of a shift register 713 of a first filter stage 715-1 of filter 715. The length of each delay memory 721 is equal to the FFT size in the channelizer. The output of each delay memory 721 is applied to coefficient multipliers 723. Coefficient multipliers 723 and other hardware components operate at a rate that is I times the clock rate of shift register 713, where I is the oversampling factor. As mentioned above, the oversampling factor equals two. This implies that each sample at the output of the delay memories is multiplied to two (I=2) filter coefficients, prior to being clocked into the next delay memory.

In the filter architecture of FIG. 15A, polyphase filter 715 consists off our filter stages 715-1, 715-2, 715-3 and 715-4. The FFT size, oversampling factor, and the number of stages establish the overall length of the filter. The length of the filter is:

Filter Length=$I*N*S$ where S is the number of filter taps. As noted earlier, more filter stages increase channel selectivity and reduce aliasing within the channel. Filter coefficients are downloaded to coefficient RAMs 725 by way of filter control gate array 707, as supplied via bus transceivers 731 from VMEbus™ interface 710. The RAM 725 of each stage 715-i store's N coefficients. The filter coefficients are decimated by the number of taps (here—four) when loading coefficient RAMs 725 in accordance with the following decimation equation:

$C_a[n]=c[S*n+a]$, for $n=0$ to $N*I-1$ where c(n) is the sequence of filter coefficients, a is the tap number (a=0 to S−1), and $c_a[n]$ are the coefficients to be loaded into a tap. For example, coefficient RAM 725 of the first filter tap stage 715-1 is loaded with the following coefficients:

$c_0[n]=\{c[O],c[4],c[8],c[12] \ldots c[I*N-S]\}$

The outputs of coefficient multipliers 723 are then summed by way of adders 732, 734 and 736 and written into a dual port RAM 740, which comprises memory sections 741 and 742.

FFT PROCESSOR FOR POLYPHASE FILTER
(FIGS. 15B–15C)

Figure 15B:
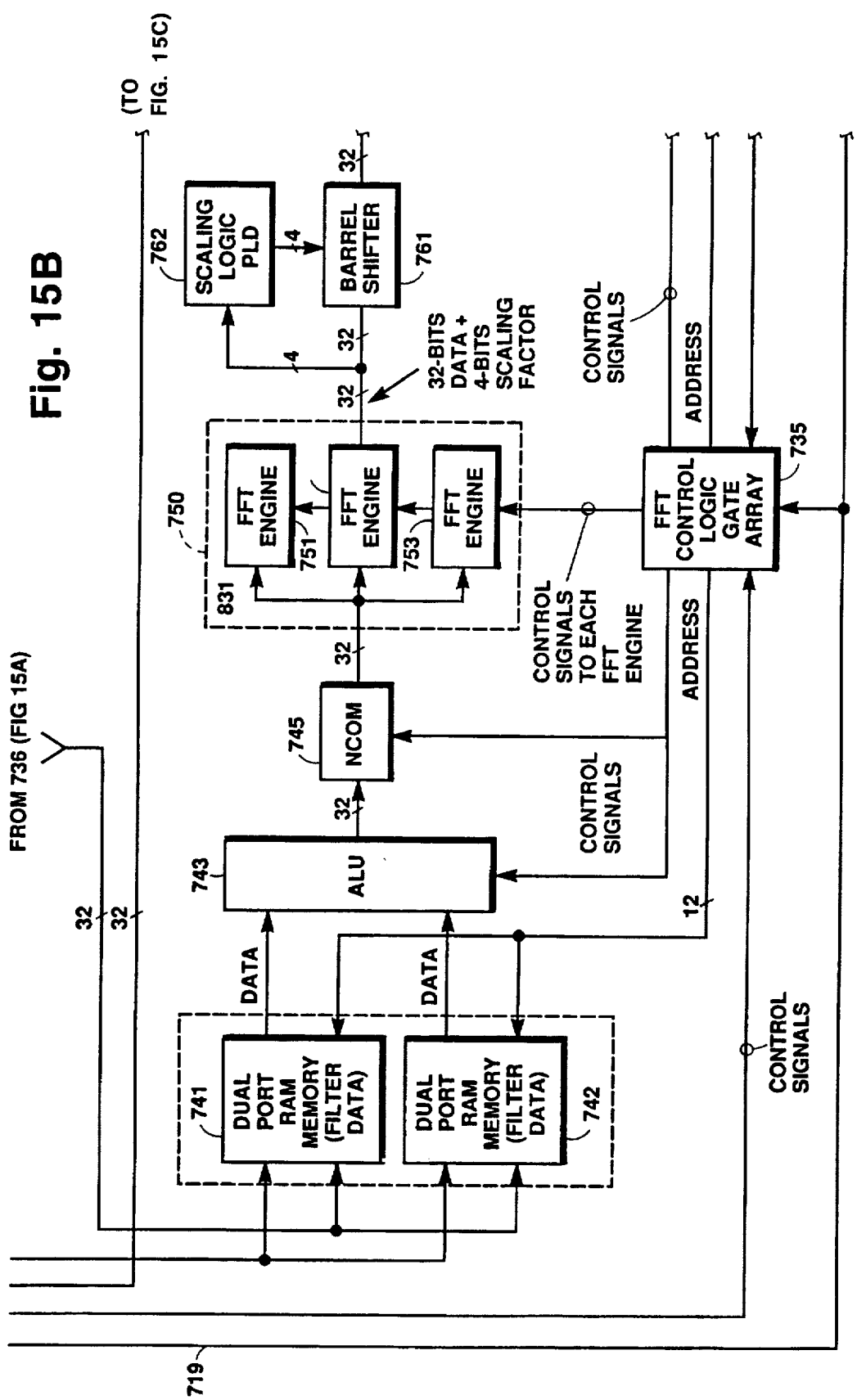
Figure 15C:
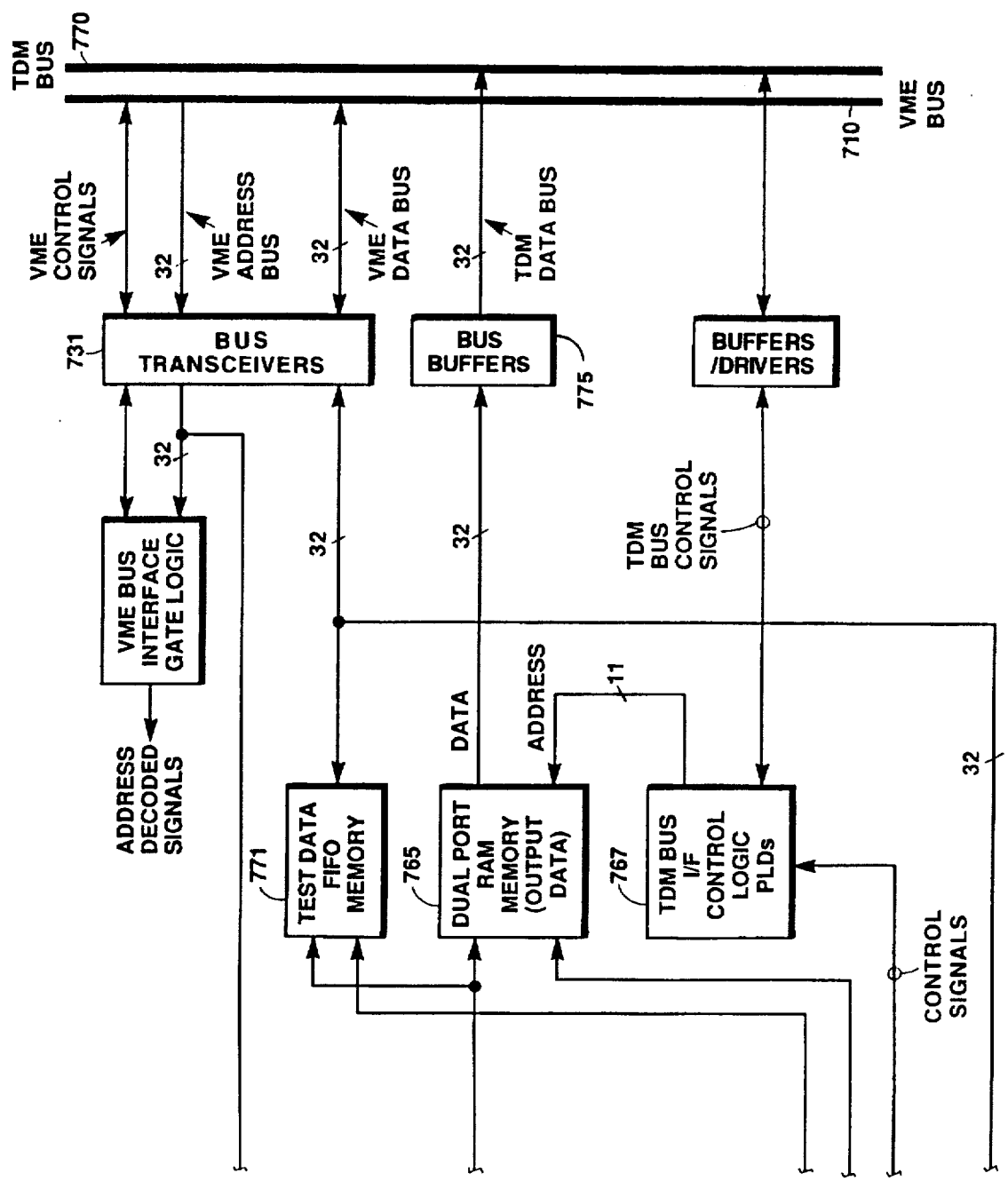

The FFT processor of the polyphase combiner, shown in FIGS. 15B–15C, has effectively the same configuration and operates in substantially the same manner as the FFT processor of the overlap and add channelizer of FIGS. 5B–5C, described above. After N samples have been written into dual port RAM 740, filter control unit 707 couples control signals over link 719 to (gate array logic-implemented state machine) FFT control unit 735 to begin FFT processing. Within FFT processor 750, a set of three FFT engines 751, 752, 753 have previously been programmed with the proper FFT size during initialization.

As in the overlap and add embodiment of FIGS. 5B–5C, the FFT engines employed in the polyphase combiner use a radix-4 algorithm and generate FFT sizes that are a power of four. In the architecture of FIGS. 15B–15C, all 512 bins of the FFT are produced by using two 256-point FFTs preceded by a decimation-infrequency radix-2 FFT butterfly.

In the course of generating the even bins of the FFT, data samples are read from dual port RAM 740 and fed into arithmetic logic unit (ALU) 743. ALU 743 sums the values of x[n] and x[n+N/2] and couples the sum directly to the FFT processor, as a numerically controlled oscillator, modulator (NCOM) 745 is disabled during even bin processing. For odd bin processing FFT control logic unit 735 configures ALU 743, via control link 744, to take the difference of x[n] and x[n+N/2]. This difference value is multiplied by $W_N^n$ by NCOM 745 and clocked into an FFT engine, which produces odd bins of the 512-point FFT. (For a 200 kHz channelizer, which requires a 64-point FFT as a power of four, ALU 743 and NCOM 745 are not necessary and are disabled by FFT control unit 735.)

As previously described, FFT engines 751, 752, 753 use a block floating-point algorithm and output a four bit scaling factor with complex FFT data. The scaling factor is used to control a downstream barrel shifter 761 under the control of a scaling logic circuit 762. Again, the barrel 10 shifter is employed to adjust the data as it is read from the FFT engines, in order to insure that data from consecutive FFTs are aligned to the same scale. From the barrel shifter 761, the data is written into a dual port RAM memory 765.

As noted above, the channelizer algorithm requires that the output of the FFT processor be multiplied by a complex exponential, $W_N^{-kmM}$, where M=decimation rate, k=FFT bin number, and m=FFT (block) number (i.e. m=0, for the first FFT generated; m=1 for the next FFT generated; 20 etc.). Namely, using the following identity:

$$x[((n-r))_N]=FFT(W_N^{-rk}*X[k])$$

where x[n] is the FFT input sequence, and $x[((n-r))_N]$ is the circular shift of x[n] by r modulo N, the channelizer performs an equivalent operation. Here, mM=r. Rather than multiply the complex exponential downstream of the FFT processor, the channelizer's FFT control logic unit 735 controllably addresses dual port RAM 765, so as to access processed data values in an order that effects a circular shifting of the FFT's input data sequence.

Once FFT-processed data for each channel (frequency bin) has been written into dual port RAM 765, FFT control logic unit 735 signals an attendant time division multiplexed (TDM) bus interface circuit 767 to assert the data onto TDM bus 770, so that it may be applied to attendant digital signal processors on the bus, which are operative to demodulate and extract voice or data from the channel data.

The polyphase channelizer can also be configured to write one or more channels of data into a test FIFO memory 771. FIFO memory 771 allows a CPU on VMEbus™ to collect and analyze channel data without interfacing to custom TDM bus 710.

Once data from each channel has been written into dual port RAM 765 from the FFT engines, the FFT control logic unit 735 signals TDM bus interface logic circuit 767 to distribute the data to digital signal processors on the bus, which are operative to demodulate and extract voice or data from the channel data. A bus buffer unit 775 is coupled between dual port RAM 765 and TDM bus 770. Data on the TDM bus may be divided into 400 time slots per frame supplied by a counter circuit 781, as driven by a high speed reference oscillator 782, thereby allowing a single time slot to be used to output a single channel of data up to a 60 kHz sample rate. If a higher channel sample rate is needed, multiple time slots may be assigned to a single channel. For example, as described above, a 400 kHz sample rate would be allocated seven time slots.

Time slots may be allocated dynamically by the system controller. The channelizer is configured by the controller with all active time slots. If data is available in the dual port RAM and the time slot is active, the channelizer outputs the data and a data available signal on TDM bus 770. All processors collecting data from that time slot will read data from the TDM bus. The processors are synchronized to the TDM bus 770 by a framing signal, so that the processors will know the proper time slot(s) from which to read data.

POLYPHASE COMBINER (FIGS. 16–16C)

Figure 16:
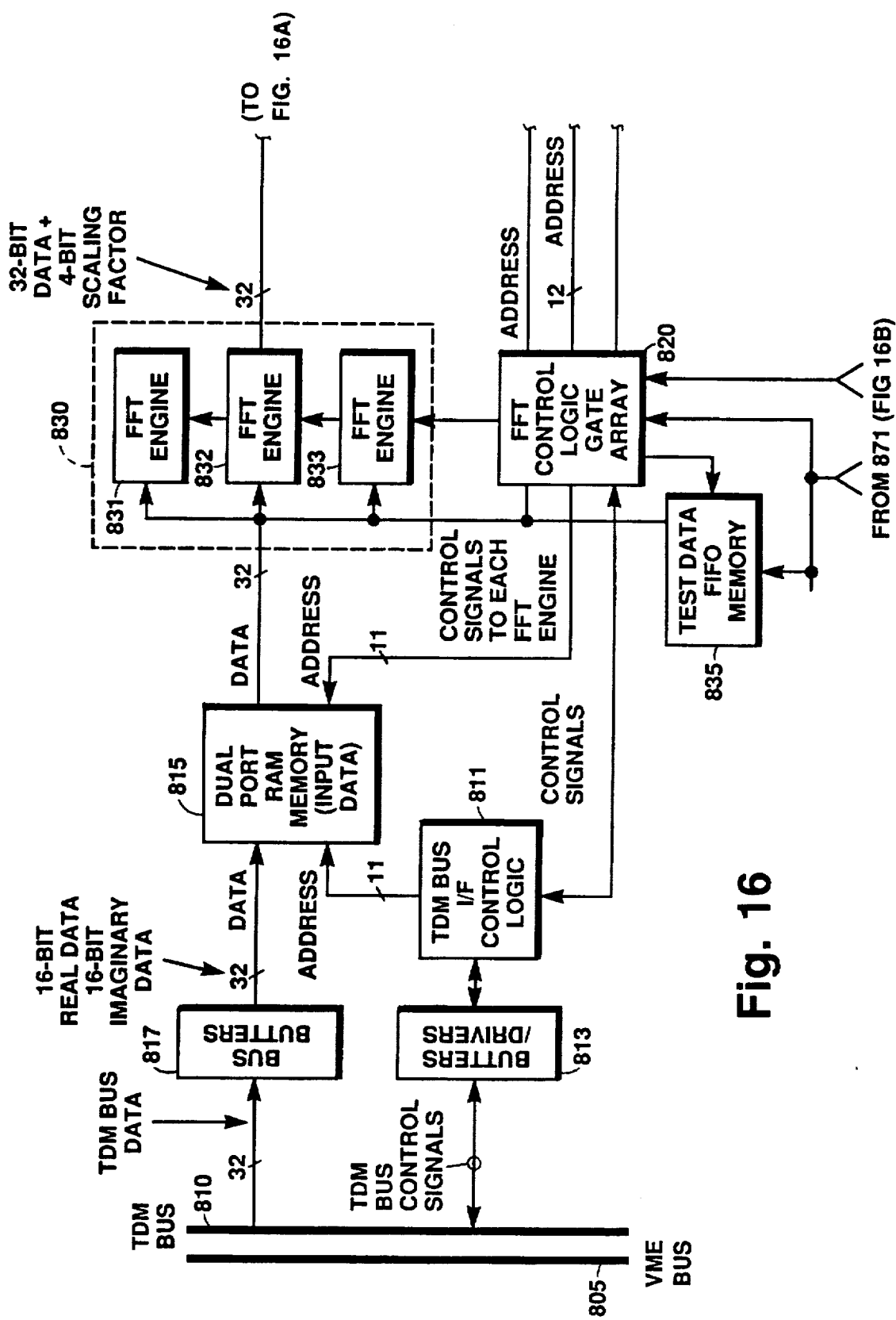
FIGS. 16–16C diagrammatically illustrate the configuration of a combiner employing an inverse FFT and polyphase deconvolutional filter, respectively, in accordance with the second embodiment of the invention.
Figure 16A:
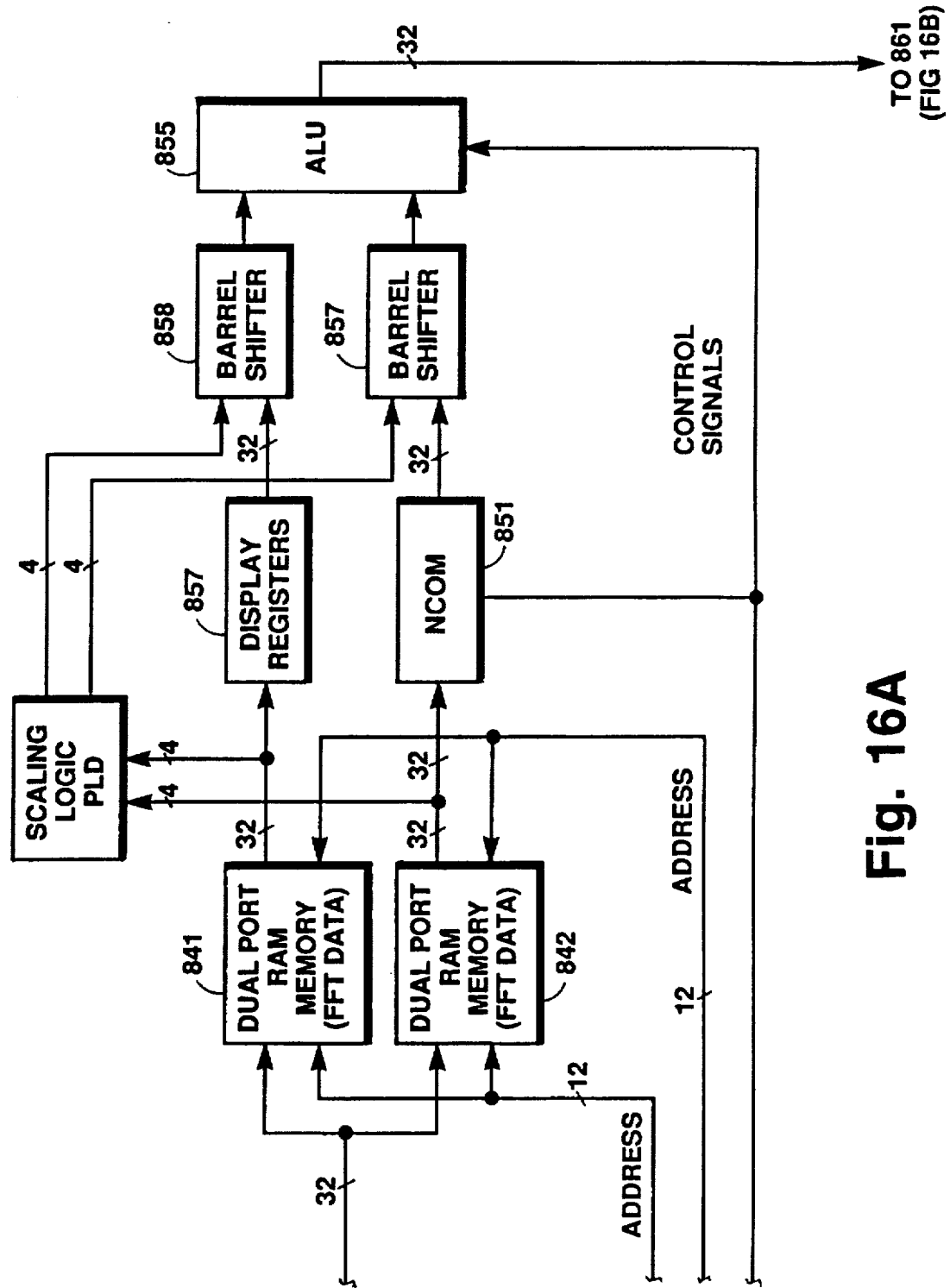
Figure 16B:
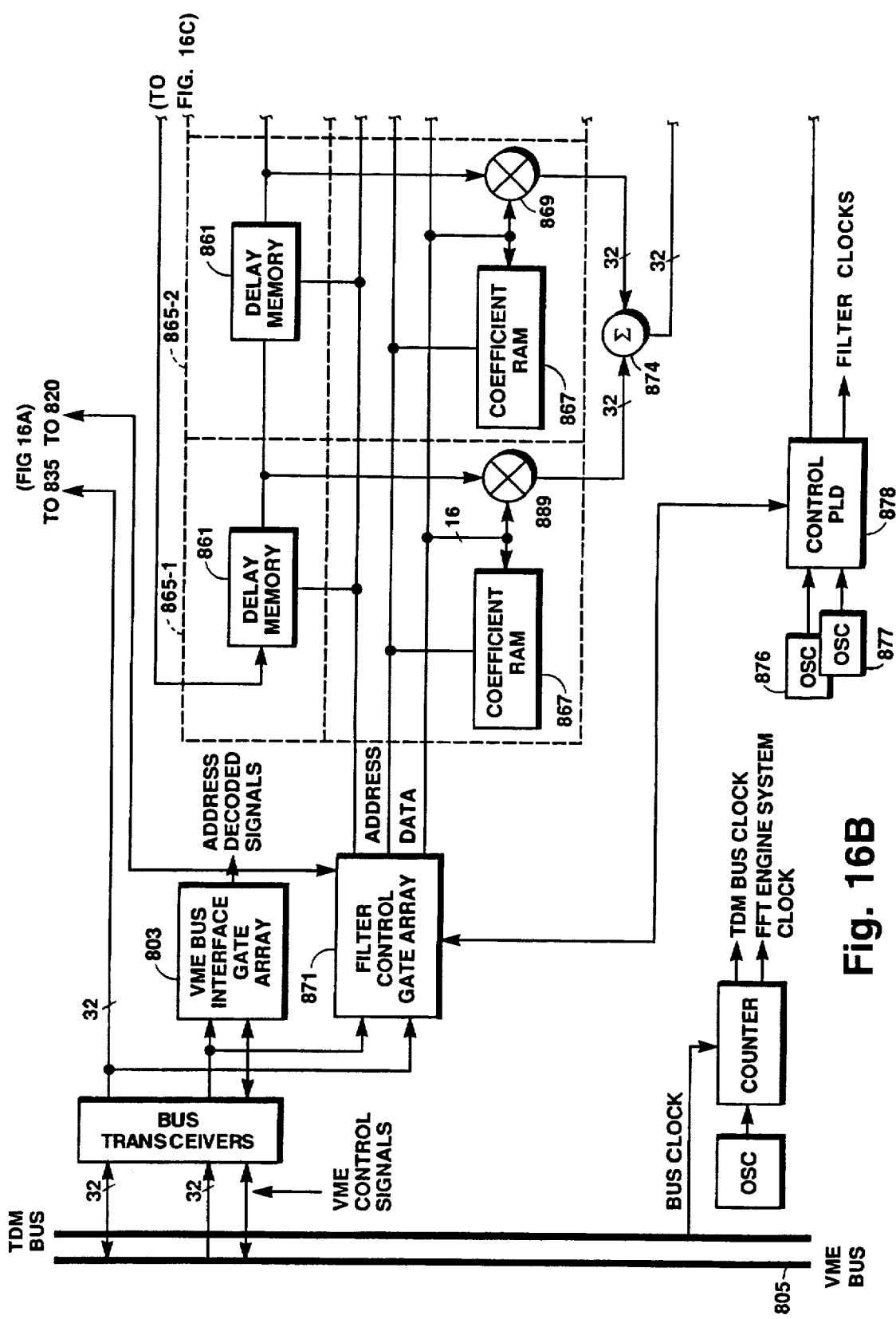
Figure 16C:
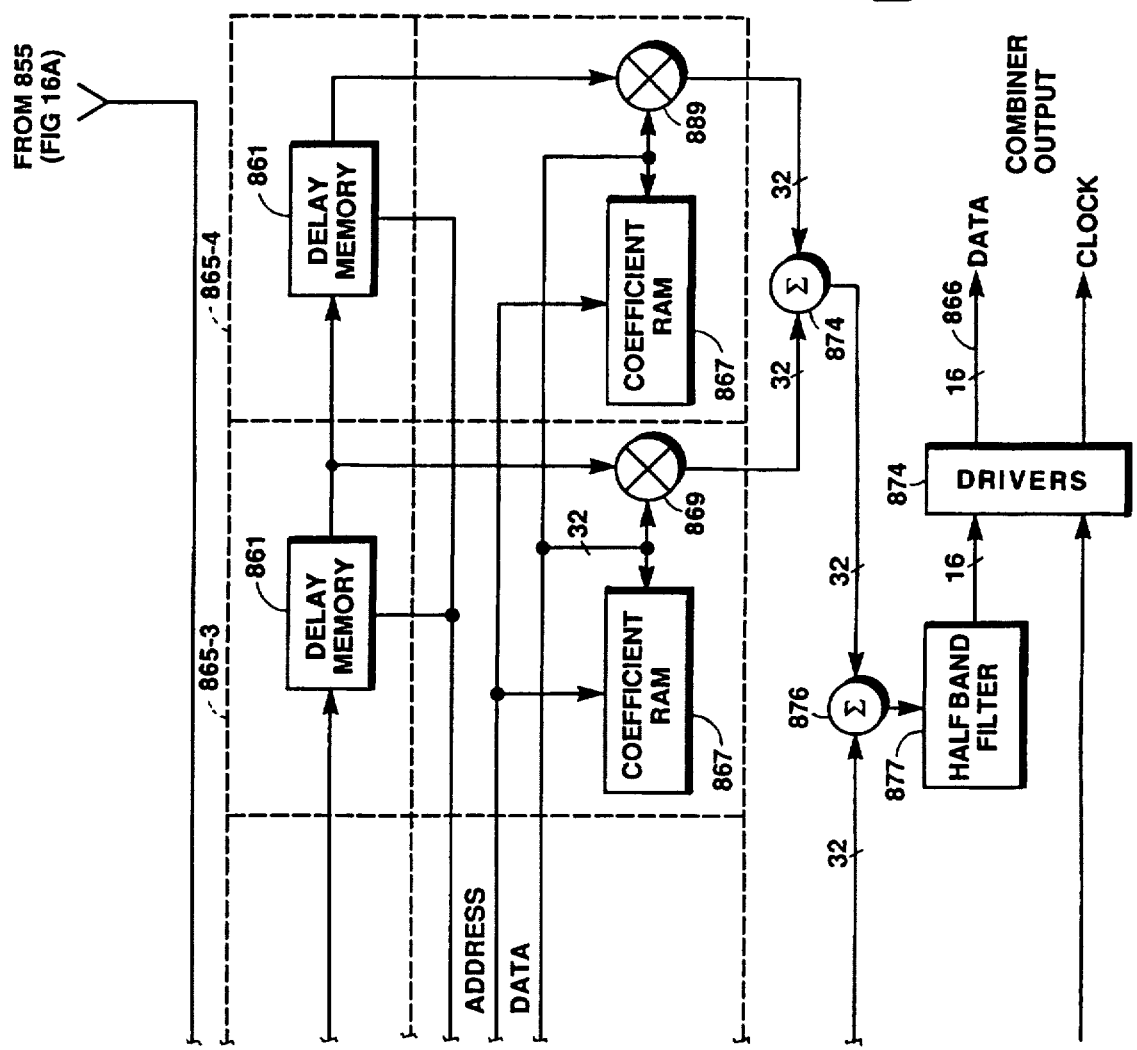

FIGS. 16–16C diagrammatically illustrates the signal processing architecture of a polyphase implementation of combiner 131, which is complementary to the wideband 20 channelizer having the polyphase filter structure of FIGS. 15–15A and a 15B–15C, described above. A characteristic of the polyphase combiner is that the output sample rate is an integer multiple of the channel sample rate. This implies that the channel sample rate must be a multiple of the channel 25 bandwidth. In the present description the channel is oversampled by a factor of two; therefore, a 60 kHz sample rate for 30 kHz channels is assumed, and a 400 kHz sample rate for 200 kHz channels is assumed. Channelized data is received by the polyphase combiner as analytic baseband signals.

Like the overlap and add combiner shown in FIGS. 14–14C, described above, the polyphase combiner employs a practical implementation that allows real-time processing of multiple digital voice or data signals, and performs frequency translation and signal combining to an IF (intermediate frequency) output sample rate. The implementation of FIGS. 16–16C provides fully programmable control of the system parameters via a standard VMEbus™ interface 801, 803 and channelized data collection over a custom, time division multiplexed (TDM) data bus 805.

Again, as in the previous description of the polyphase channelizer, the polyphase combiner will be described for non-limitative examples of a 400 channel/30 kHz system which can be used in a NADC (TDMA) cellular system, and a 50 channel/200 kHz system which can be used with the European GSM cellular standard. For 30 kHz channels, a sample rate of 60 kHz is assumed. For 200 kHz, a 400 kHz sample rate is assumed. Channelized data is received by the combiner as analytic baseband signals. Channel sample rates depend upon the combiner's filter design.

The combiner architecture of FIGS. 16–16C employs a custom TDM bus 810 for collecting data for a large number of channels at relatively high data rates, since the aggregate data rate from all channels typically exceeds the bus bandwidth of the VMEbus™ 805 and other standard bus protocols.

To implement a transceiver system employing the polyphase combiner (and channelizer) it is convenient to set the TDM bus 810 clock equal to 24 MHz, so as to allow 400 time slots per frame, with each time slot transferring a single channel of data up to the above-referenced 60 kHz sample rate. This clock rate differs from the TDM bus clock rate of the overlap and add combiner/channelizer embodiment of the transceiver system which has been given as an example of a 50 kHz channel sample rate. The clock rate is not limited to this value but has been selected in order to provide a simplified example of an implementation of a transceiver system.

For higher rates, multiple slots per frame can be assigned to a single source. As noted above with reference to the TDM bus of the channelizer of FIGS. 16A and 16B, a 400 kHz sample rate would require seven slots per frame.

The sources of the channelized data that are asserted onto the TDM bus are DSP processors that format (e.g. to a cellular standard) and modulate incoming voice or data signals from an attendant telephone network, thereby providing a baseband analytic signal. Each data source is assigned one or more time slots during which it will transfer a single complex sample when requested by the combiner. No two sources can be allocated the same time slot. Time slots are assigned by a system controller (a separate CPU on VMEbus 805) during system initialization. The system controller also programs the combiner to specify all times slots that contain valid data. A sample from each DSP processor is requested via control signals applied to TDM bus 810 from a TDM bus controller 811 (logic array-implemented state machine) and associated buffer/drivers 813. This sample is written into a dual port RAM buffer 815 via bus buffer unit 817. TDM bus control logic unit 811 synchronizes addressing of RAM buffer 815 to framing signals of the TDM bus, thereby insuring that each channel is written to the proper address in dual port RAM 815.

When the combiner has collected data from all operative channels, the TDM bus controller 811 couples control signals via link 812 to an FFT control logic unit 820, causing FFT control logic unit 820 to initiate FFT processing. FFT control logic unit 820 is a state machine preferably implemented as a logic gate array. Complementary to the forward FFT processor functionality of the channelizer of FIG. 7, the polyphase combiner of FIG. 8 causes an inverse FFT to be performed. As in the overlap and add combiner of FIG. 6, in terms of a practical implementation, however, generation of an inverse FFT is effected using a forward FFT, as will be described.

When the combiner has collected data from all operative channels, the TDM bus controller 811 couples control signals via link 812 to an FFT control logic unit 820, causing FFT control logic unit 820 to initiate FFT processing. FFT control logic unit 820 is a state machine preferably implemented as a logic gate array.

FFT PROCESSOR (FIGS. 16–16A)

Complementary to the forward FFT processor functionality of the channelizer of FIGS. 15B–15C, the polyphase combiner of FIGS. 16–16A causes an inverse FFT to be performed. As in the overlap and add combiner of FIG. 6, in terms of a practical implementation, however, generation of an inverse FFT is effected using a forward FFT, as will be described.

The FFT processor, both polyphase 777 shown in FIGS. 16–16A, at 830, is configured to have a size equal to the next 'power of two' greater than the number of channels to be combined. As noted above, four hundred 30 kHz channels specify a 512-point FFT, while fifty 200 kHz channels require a 64-point FFT. FFT size is programmed into the FFT engines during initialization. The channel rate also specifies the FFT processing rate in accordance with the equation:

$$FFT\ \text{rate}=1/(\text{channel sample rate})$$

As explained previously, a 60 kHz sample rate for 30 kHz channels requires that a 512-point FFT be generated every 16.667 microseconds, while a 400 kHz sample rate requires a 64-point FFT even 2.5 microseconds. Since currently available typical FFT devices do not operate at these speeds, to maintain throughput, FFT processor 830 contains a plurality of FFT engines (e.g. three—831, 832, 833 in the illustrated example) that have been programmed with the proper FFT size associated with the signal processing parameters of interest. Implementing FFT processor 830 with three engines reduces the FFT revisit time for the 512 point FFT processor to 50 microseconds, and 7.5 microseconds for the 64 point FFT processor.

As described previously, a 512-point inverse FFT requires 512 samples; however, there are only 400 time slots. These 400 time slots are centered in the 512 bin window of FFT processor 830. Control logic unit 820 causes zeros to be written sequentially into an FFT engine for the first 56 bins. For the next 400 bins, data may be read from dual port RAM 815 for the active channels. If the channel is not an active channel, FFT control logic unit 820 will write a zero into that bin. The identities of those channels that are active are programmed into control logic unit 820 during system initialization. For the last 56 bins, zeros are written into those bins. (For a 64-point FFT, zeros are written into the first and last seven FFT bins allowing fifty 200 kHz channels.)

To provide built-in test capability, test data may be written into one or more bins via VMEbus 805. For this purpose, a first-in-first-out (FIFO) memory 835, dedicated for test capability, is coupled to bus 805 via transceiver unit 801, so as to allow a CPU on the VMEbus to write a test signal to the combiner. In addition, the system controller can program FFT control logic unit 820 to read data from FIFO memory 835 rather than dual port RAM 815 for specific bins. Test data may be written into the first and last seven FFT bins, thus leaving fifty 200 kHz channels available for incoming active data channels.

To generate an inverse FFT using a forward FFT, FFT control logic unit 820 addresses the input dual port RAM 815 in a reverse order when writing data into the FFT engines.

As in the overlap and add combiner implementation of FIGS. 14–14A, to generate a 512-point FFT in the polyphase combiner architecture of FIGS. 16–16A, the FFT engines employ a radix-4 (block floating point) algorithm having FFT sizes that are a power of four. Also in the combiner of FIGS. 14–14A, a 512-point FFT for the combiner is generated from two 256-point FFTs. The N/2-point FFTs are generated from even and odd samples of the 512-point input sequence.

In the architecture of FIGS. 14–14A, a first (upper, as viewed in the Figure) FFT data dual port RAM 841 stores holds G[k]. A second (lower as viewed in the Figure) FFT data dual sport RAM 842 stores H[k]. Multiplication of H[k] and $W_N^k$ is performed by a numerically controlled oscillator/modulator (NCOM) 851 for k=0 to 255. To process the first 256 bins of a 512-point FFT, the output of RAM 841 is summed with the output of RAM 842 by means of an arithmetic logic unit (ALU) 855. Since $$W_N^k = -W_N^{k-N/2}, \text{ for } k=256 \text{ to } 511,$$

The output of RAM 842 is subtracted via the NCOM from the 15 output of RAM 841 for the remaining 256 bins of the 512-point FFT.

In order to accommodate the propagation delay through NCOM 851 and ensure that the proper pair of samples are processed by ALU 855, a set of delay registers 857 are coupled in the output path from dual port RAM 841 to the ALU (For the 200 kHz channels, a 64-point FFT is used. Since 64 is a power of 4, NCOM 851, dual port RAM 842, and ALU 855 are not necessary and are disabled by control signals from control unit 820.)

As pointed out above, with reference to the Crochiere text, the combiner algorithm requires the input sequence of the inverse FFT be multiplied by the complex exponential, $W_K^{kmR}$, where k is equal to the input frequency bin number, K is the inverse FFT size, m is the inverse FFT number, R is the combiner's interpolation rate, and $$W_k = e^{-j*2*\pi/k}.$$

Using a mathematical identity, this multiplication operation can be effected by a circular rotation of the output samples of the inverse FFT, i.e.:

$$x[((n-r))_K] = \text{inverse } FFT\ (W_K^{-rk} * X[k]),$$

where r is equal to −mR. By rotating the inverse FFT output samples by −mR, the phase shift of the complex exponential is generated. This rotation is performed by the FFT output addressing logic in FFT control logic gate array 820. The amount of rotation is preprogrammed during initialization of the combiner.

Again, the FFT engines generate FFTs using a block-floating point algorithm, which provide a scaling factor that depends upon the characteristics of the input data. Since the two 256-point FFTs used to generate a 512-point FFT may not have the same scaling factor or consecutive FFTs may not have the same scaling factor, barrel shifting circuits 858, 859 are coupled in the signal flow input paths to ALU 855. As described previously in connection with the operation of the overlap and add combiner of FIGS. 14–14A, the barrel shifters are operative to adjust the FFT data to the same scale to properly align the data for subsequent processing.

POLYPHASE FILTER (FIGS. 16–16C)

The output of the FFT, as supplied by ALU 855, is clocked into a delay memory 861 of a shift register 863 of a first filter stage 865-1 of a filter 865. The length of each delay memory 861 is equal to the FFT size. The output of each delay memory 861 is applied to a respective coefficient multiplier 869. Coefficient multipliers 869 and other hardware components operate at a rate that is I times the clock rate of shift register 863, where I is the 10 oversampling factor. As mentioned above, the oversampling factor equals two. This implies that each sample at the output of the delay memories is multiplied by two (I=2) filter coefficients, prior to being docked into the next delay memory.

In the filter architecture of FIGS. 16B–16C, the polyphase filter 865 consists of four filter stages 865-1, 865-2, 865-3 and 865-4. The FFT size, oversampling factor, and the number of stages establish the overall length of the filter. The length of the filter is:

Filter Length=$N*S$ where S is the number of filter taps. As noted earlier, more filter stages increase channel selectivity and reduce aliasing within the channel. Filter coefficients are downloaded to coefficient RAMs 867 by way of filter control gate array 871, as supplied via bus transceivers 801 from VMEbus™ interface 803. The RAM 867 of each stage 865-i stores N coefficients. The filter coefficients are decimated by the number of taps (here, four) when loading coefficient RAMs 867 in accordance with the following decimation equation:

$$c_a[n] = c[S*n+a], \text{ for } n=0 \text{ to } N-1,$$

where c(n) is the sequence of filter coefficients, a is the tap number (a=0 to S−1), and $c_a[n]$ are the coefficients to be loaded into the a tap. For example, coefficient RAM 867 of the first filter tap stage 865-1 is loaded with the following coefficients:

$$c_0[n] = \{c[0], c[4], c[8], c[12] \ldots c[N-S]\}$$

The outputs of coefficient multipliers 869 are then summed by way of adders 872, 874, 876 and applied to a half-band filter 872.

HALF BAND FILTER AND RATE BUFFER (FIGS. 16B–16C)

As in the overlap and add combiner of FIGS. 14–14A, a half band filter 672 is employed, since RF transmitter exciters typically require a real signal rather than a complex one. Half band filter 872 is configured as an integrated circuit that provides complex to real data conversion, which doubles the output sample rate. Although the entirety of the combiner of FIG. 8 could be implemented as a completely real system, this would require all sample rates, processing rates and FFT sizes to be doubled, increasing complexity and cost.

The output of half band filter 872 is coupled via output driver unit 874 to an output data link 866 for application to D-A converter 133 (FIG. 3) of the transmit side of the transceiver site. As in the combiner architecture of FIG. 6, respective oscillators are provided for each output sample rate required. For the present example of a combiner capable of processing either 30 kHz or 200 kHz channels, respective 30.72 MHz and 25.6 MHz (2*output sample rate) clocks 876 and 877 are provided. During initialization of the combiner by the system controller, the proper oscillator is selected by an associated control logic unit 878.

An additional set of logic circuits is included to generate additional clock signals employed by the combiner. As in the combiner architecture of FIG. 6, the clock output of a high rate oscillator (approximately 200 MHz) is divided down by counters 882 and 883 to generate the necessary filter processing clock, TDM bus clock, and FFT engine system clock.

As will be appreciated from the foregoing description, the limited channel capacity and substantial hardware requirements associated with signal processing architectures currently employed by multichannel wireless communication (e.g. cellular) service providers are successfully obviated by the multichannel transceiver apparatus of the present invention, which reduces the amount of hardware required to provide broad coverage for an increased (full spectrum) capacity cellular transceiver site by applying convolutional-decimation spectral analysis techniques to each of a wideband multichannel signal extraction architecture and a wideband multichannel signal combining architecture. Since all of the channels of the operational communication band available to the service provider can be processed using digital processing components which operate at very high data rates that accommodate the substantial bandwidth of present day wireless communication systems, it is no longer necessary to either construct a separate narrowband signal processing unit for each channel, nor is it necessary to limit the number of channels per site to less than the full capacity of the network. The compact design of the invention allows it to be readily physically accommodated at a variety of installation sites, such as above the drop ceiling in an office building or on an electric utility pole, while having the capability of providing multichannel communication service that spans the entire channel capacity offered by the service provider, rather than only a subset of the available channels.

While we have shown and described several embodiments 20 in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A transceiver apparatus for a wireless communication network containing multiple frequency communication channels for supporting communications among a plurality of geographically distributed first sites, by way of one or more transceiver sites, said transceiver apparatus being installable at a respective one of said one or more transceiver sites and comprising:

a receiver unit which is operative to receive a plurality of signals from a set of said multiple frequency communication channels and output a digital composite receiver signal representative of the signals received from said set of multiple frequency communication channels;

a Fourier transform based channelizer unit which is coupled to receive the digital composite receiver signal from said receiver unit and is operative to output respective digital channel signals representative of the contents of respective ones of the signals received from the plurality of communication channels received by said receiver unit;

a plurality of rate conversion units, respectively associated with said digital channel signals output by said Fourier transform based channelizer unit and being operative to output interpolated digital channel signals representative of respective ones of said digital channel signals in interpolated form with a sample rate timing different from a sample rate timing of the digital channel signals;

a first plurality of signal processor units, respectively associated with said interpolated digital channel signals output by said rate conversion units and being operative to demodulate respective ones of said interpolated digital channel signals and to supply demodulated ones of said digital channel signals at respective output ports thereof;

a second plurality of signal processor units, respectively associated with respective ones of a plurality of incoming communication signals to be transmitted over respectively different communication channels of said network, and being operative to process respective ones of said plurality of incoming communication signals and to supply processed ones of said incoming channel signals at respective output ports thereof;

a Fourier transform-based combiner unit which is coupled to receive said processed ones of said communication signals processed by said second plurality of digital signal processor units and to output a digital combined transmit signal representative of the contents of the incoming communication signals processed by said second plurality of digital signal processor units; and a transmitter unit which is operative to transmit a multiple frequency communication channel signal in accordance with the digital combined transmit signal output by said Fourier transform-based combiner unit.

2. A transceiver apparatus according to claim 1, wherein said Fourier transform-based channelizer unit includes an overlap and add filter to which the composite signal output by said receiver unit are coupled, and an N-point fast Fourier transform-based processor coupled to the output of said overlap and add filter.

3. A transceiver apparatus according to claim 2, wherein said overlap and add filter contains a plurality of cascaded filter tap stages, each of plural ones of which comprises a plurality of delay memories switchably coupled in series with one another, so as to selectively enable the delay memories of successive filter tap stages to be coupled in series.

4. A transceiver apparatus according to claim 3, wherein said overlap and add filter has a decimation rate M, and wherein said plurality of delay memories comprises a first delay memory having a length of M data samples and a second delay memory having a length of N–M data samples.

5. A transceiver apparatus according to claim 4, wherein said Fourier transform-based channelizer unit is configured to process successive sets of odd and even numbered filtered data sample outputs of said overlap and add filter.

6. A transceiver apparatus according to claim 5, wherein said Fourier transform-based channelizer unit is configured to multiply filtered data sample output of said overlap and add filter by a complex exponential signal, the resultant product value being coupled to said N-point fast Fourier transform-based processor.

7. A transceiver apparatus according to claim 6, wherein said Fourier transform-based channelizer unit includes a numerically controlled oscillator modulator controlled by filtered data sample outputs of said overlap and add filter so as to effectively multiply said filtered data sample outputs by a complex exponential signal.

8. A transceiver apparatus according to claim 4, wherein said each filter tap stage includes a controllable switch, coupled in a signal flow path between plural delay memories of said stage, and being operative to either selectively enable the plural delay memories of said stage to be connected in series with one another, and thereby in a cascaded signal flow path with other tap stages of said filter, or to feed back the contents of one of said plural delay memories to itself.

9. A transceiver apparatus according to claim 8, wherein said each filter tap stage further includes a coefficient memory which stores a plurality of N weighting coefficients, and a multiplier which is operative to multiply respective weighting coefficients stored in said coefficient memory by data sample values from a signal flow path through said delay memories.

10. A transceiver apparatus according to claim 9, wherein said overlap and add filter further includes a summation stage for summing together products output by respective multipliers of said filter tap stages, the output of said summation stage being coupled to said N-point fast-Fourier transform processor.

11. A transceiver apparatus according to claim 2, wherein said Fourier transform-based channelizer unit is configured to process successive sets of odd and even numbered filtered data sample outputs of said overlap and add filter.

12. A transceiver apparatus according to claim 11, wherein said Fourier transform-based channelizer unit is configured to multiply filtered data sample outputs of said overlap and add filter by a complex exponential signal, the resultant product value being coupled to said N-point fast Fourier transform-based processor.

13. A transceiver apparatus according to claim 12, wherein said Fourier transform-based channelizer unit includes a numerically controlled oscillator modulator controlled by filtered data sample outputs of said overlap and add filter so as to effectively multiply said filtered data sample outputs by a complex exponential signal.

14. A transceiver apparatus according to claim 1, wherein said Fourier transform-based combiner unit includes an N-point fast Fourier transform processor coupled to receive communication channel signals processed by said second plurality of digital signal processor units and an overlap and add filter to which the output of said N-point fast Fourier transform processor are coupled.

15. A transceiver apparatus according to claim 14, wherein said overlap and add filter contains a plurality J of cascaded filter tap stages, each of plural ones of which comprises a plurality of delay memories switchably coupled in series with one another, so as to selectively enable the delay memories of successive filter tap stages to be coupled in series.

16. A transceiver apparatus according to claim 15, wherein said overlap and add filter has a decimation rate M, and wherein said plurality of delay memories comprises a first delay memory having a length of M data samples and a second delay memory having a length of N–M data samples.

17. A transceiver apparatus according to claim 16, wherein said Fourier transform-based combiner unit is operative to multiply Fourier processed data samples by a complex exponential signal, the resultant product value being coupled to said overlap and add filter.

18. A transceiver apparatus according to claim 17, wherein said Fourier transform-based combiner unit includes a numerically controlled oscillator, modulator the output of which is controlled by Fourier processed data samples so as to effectively multiply said Fourier processed data samples by a complex exponential signal.

19. A transceiver apparatus according to claim 14, wherein said Fourier transform-based combiner comprises a plurality of block floating point fast Fourier transform engines, the outputs of which are shifted to align the outputs of the engines to a common scale.

20. A transceiver apparatus according to claim 15, wherein said each filter tap stage includes a coefficient memory which stores a plurality of multiply respective weighting coefficients stored in said coefficient memory by Fourier processed data samples, and an adder to which the output of said multiplier and one of said plurality of delay memories is coupled, said adder having an output coupled to a second of said plurality of delay memories of a successive filter tap stage.

21. A transceiver apparatus according to claim 20, wherein said each filter tap stage includes a controllable switch, coupled in a signal flow path between plural delay memories of said stage, and being operative to either selectively enable the plural delay memories of said stage to be connected in series with one another, and thereby in a cascaded signal flow path with other tap stages of said filter, or to feed back the contents of one of said plural delay memories to itself.

22. A transceiver apparatus according to claim 21, wherein said overlap and add filter has a first tap stage containing a coefficient memory which stores a plurality of N weighting coefficients, a multiplier which is operative to multiply respective weighting coefficients stored in said coefficient memory by Fourier processed data samples, a controllable switch having a first input port coupled to receive a sequence of prescribed data values, a second input port coupled to the output of said adder, and an output port coupled to an N–M sample delay memory, said N–M sample delay memory having an output coupled to said adder to be summed with the output of said multiplier, and wherein the output of the multiplier of said first filter tap stage is coupled to a successive filter tap stage of said overlap and add filter, and wherein said controllable switch is operative to either couple said sequence of prescribed data values to said N–M sample memory or to feed back the contents of said delay memory to itself.

23. A transceiver apparatus according to claim 22, wherein the i-th one of said plurality i of filter tap stages has its adder output coupled to provide a combined signal representative of the contents of the communication channel signals processed by said second plurality of digital signal processor units.

24. A transceiver apparatus according to claim 23, wherein said Fourier transform-based combiner unit is configured to process successive sets of odd and even numbered filtered data samples supplied by said second plurality of digital signal processor units.

25. A transceiver apparatus according to claim 1 in which said rate conversion units each additionally comprise a decimating, linear phase low-pass digital filter.

26. A transceiver apparatus according to claim 25 wherein the decimating low-pass digital filter section additionally comprises:

a filter clock generator, for controlling a set of times at which samples of the digital channel signal are advanced through the decimating low-pass filter.

27. A transceiver apparatus according to claim 1 in which said rate conversion units additionally comprise:

a decimating low pass filter structure, which is connected to receive the respective one of the digital channel signals, and connected to output the interpolated digital channel signals, the decimating low pass filter structure providing one of a plurality, L, of possible filter responses.

28. A transceiver apparatus according to claim 1, wherein said Fourier transform-based channelizer unit includes a polyphase filter to which the digital signals output by said multichannel receiver unit are coupled and an N-point fast Fourier transform-based processor coupled to the output of said polyphase filter.

29. A transceiver apparatus according to claim 28, wherein said polyphase filter comprises a finite impulse response filter containing a plurality of filter tap stages, each of which comprises a delay memory, so that the delay memories of successive filter tap stages are coupled in series, each filter tap stage further including a coefficient memory which stores a plurality of N weighting coefficients, and a multiplier which is operative to multiply respective weighting coefficients stored in said coefficient memory by data sample values from a signal flow path through said delay memories, and a summation stage for summing together products output by respective multipliers of said filter tap stages, the output of said summation stage being coupled to said N-point fast-Fourier transform processor.

30. A transceiver apparatus according to claim 29, wherein said Fourier transform-based channelizer unit is configured to process successive sets of odd and even numbered filtered data sample outputs of said polyphase filter.

31. A transceiver apparatus according to claim 30, wherein said Fourier transform-based channelizer unit is configured to multiply filtered data sample outputs of said polyphase filter by a complex exponential signal, the resultant product value being coupled to said N-point fast Fourier transform-based processor.

32. A transceiver apparatus according to claim 31, wherein said Fourier transform-based channelizer unit includes a numerically controlled oscillator modulator controlled by filtered data sample outputs of said polyphase filter so as to effectively multiply said filtered data sample outputs by a complex exponential signal.

33. A transceiver apparatus according to claim 28, wherein said Fourier transform-based channelizer unit is configured to process successive sets of odd and even numbered filtered data sample outputs of said polyphase filter.

34. A transceiver apparatus according to claim 33, wherein said Fourier transform-based channelizer unit is configured to multiply filtered data sample outputs of said polyphase filter by a complex exponential signal, the resultant product value being coupled to said N-point fast Fourier transform-based processor.

35. A transceiver apparatus according to claim 34, wherein said Fourier transform-based channelizer unit includes a numerically controlled oscillator modulator controlled by filtered data sample outputs of said polyphase filter so as to effectively multiply said filtered data sample outputs by a complex exponential signal.

36. A transceiver apparatus according to claim 1, wherein said Fourier transform-based combiner unit includes an N-point fast Fourier transform processor coupled to receive communication channel signals processed by said second plurality of digital signal processor units and a polyphase filter to which the output of said N-point fast Fourier transform processor are coupled.

37. A transceiver apparatus according to claim 36, wherein said polyphase filter comprises a finite impulse response filter containing a plurality of filter tap stages, each of which comprises a delay memory, so that the delay memories of successive filter tap stages are coupled in series, each filter tap stage further including a coefficient memory which stores a plurality of N weighting coefficients, and a multiplier which is operative to multiply respective weighting coefficients stored in said coefficient memory by data sample values from a signal flow path through said delay memories, and a summation stage for summing together products output by respective multipliers of said filter tap stages, the output of said summation stage being coupled to said multichannel transmitter unit.

38. A transceiver apparatus according to claim 1 in which each rate converter provides as the interpolated output signal a signal consisting of interpolated samples of its respective digital channel signal taken at or near positions of expected peak symbol amplitude for that channel.

39. For use with a wireless communication network having multiple frequency communication channels for supporting communications among a plurality of geographically distributed first sites by way of one or more transceiver sites, a method of transmitting and receiving wideband communication signals at a respective one of said one or more transceiver sites and comprising the steps of:

(a) receiving signals from a plurality of said multiple frequency communication channels and generating a plurality of digital signals representative of the contents of said plurality of multiple frequency communication channels;

(b) Fourier transform based channelizer processing said plurality of digital signals generated in step (a) and producing therefrom respective digital channel signals representative of the contents of respective ones of the signals received from the communication channels in step (a);

(c) converting the sample rate of respective ones of said digital channel signals, to provide respective interpolated digital channel signals representative of respective ones of said digital channel signals in interpolated form at a sample rate timing different from a sample rate timing of the digital channel signals;

(d) processing respective ones of said interpolated digital channel signals; (e) processing respective ones of a plurality of incoming digital communication signals to be transmitted over respectively different frequency channels of said network;

(f) Fourier transform-processing digital communication signals processed in step (d) and producing therefrom a combined signal representative of the contents of the digital communication channel signals processed in step (e); and (g) transmitting a multiple frequency communication channel signal in accordance with the combined signal produced in step (f).

40. A method according to claim 39, wherein step (b) comprises filtering said plurality of digital signals generated in step (a) by means of an overlap and add filter and processing the resultant filtered signals by an N-point fast Fourier transform-based processor.

41. A method according to claim 40, wherein said overlap and add filter contains a plurality of cascaded filter tap stages, each of plural ones of which comprises a plurality of delay memories switchably coupled in series with one another, and the step (b) further comprises the step of:

selectively enabling the delay memories of successive filter tap stages to be coupled in series.

42. A method according to claim 41, wherein the step (b) further comprises the step of (iii) selectively enabling said overlap and add filter has a decimation rate M, and wherein said plurality of delay memories, with a first delay memory having a length of M data samples and a second delay memory having a length of N–M data samples.

43. A method according to claim 42, wherein step (b) comprises Fourier transform-processing successive sets of odd and even numbered filtered data sample outputs of said overlap and add filter.

44. A method according to claim 43, wherein the step (b) further comprises the step of:

(v) multiplying filtered data sample outputs of said overlap and add filter by a complex exponential signal.

45. A method according to claim 39, wherein step (f) comprises applying communication channel signals processed in step (e) to an N-point fast Fourier transform processor and filtering the output of said N-point fast Fourier transform processor by an overlap and add filter.

46. A method according to claim 45, wherein said overlap and add filter contains a plurality of cascaded filter tap stages, each of plural ones of which comprises a plurality of delay memories switchably coupled in series with one another, and the step (vii) further comprises:

selectively enabling the delay memories of successive filter tap stages to be coupled in series.

47. A method according to claim 46, wherein said overlap and add filter has a decimation rate M, and wherein the step (viii) further comprises:

selectively enabling said plurality of delay memories to provide a first delay having a length of M data samples and a second delay having a length of N–M data samples.

48. A method according to claim 47, wherein step (f) further includes the step of:

(ix) multiplying Fourier transform-processed digital communication signals by a complex exponential signal, and (x) applying the resultant product signal to said overlap and add filter.

49. A method according to claim 46, wherein said each filter tap stage includes a coefficient memory which stores a plurality of weighting coefficients, and step (b) further comprises:

(xi) multiplying respective weighting coefficients stored in said coefficient memory by Fourier processed data samples; and (xii) adding the output of said multiplying step (xi) and the output of one of said plurality of delay memories, said addition step output being coupled to a second one of said plurality of delay memories of a successive filter tap stage.

50. A method according to claim 49, wherein said each filter tap stage includes a controllable switch, coupled in a signal flow path between plural delay memories of said stage, and step (b) further comprises:

selectively enabling the plural delay memories of said stage to be connected in series with one another, and thereby in a cascaded signal flow path with other tap stages of said filter, to feed back the contents of one of said plural delay memories to itself.

51. A method according to claim 50, wherein said overlap and add filter has a first tap stage containing a coefficient memory which stores a plurality of N weighting coefficients, and step (b) further comprises:

(xiii) multiplying respective weighting coefficients stored in said coefficient memory by Fourier processed data samples; and (xiv) controllably switching a first input port coupled to receive a sequence of prescribed data values, and a second input port coupled to the output of said addition step (xii), and an output port coupled to an N–M sample delay memory, said N–M sample delay memory having an output coupled to said adder to be summed with the output of said multiplying step (xiii);

(xv) coupling the output of the multiplier of said first filter tap stage to a successive filter tap stage of said overlap and add filter; and (xvi) operating said controllable switching step to either couple said sequence of prescribed data values to said N–M sample memory or to feed back the contents of said delay memory to itself.

52. A method according to claim 51, additionally comprising the step of coupling an adder to the output of the Jth one of said plurality i of filter tap stages to provide a combined signal to be transmitted in step (g).

53. A method according to claim 39, wherein in steps (b) and (f) the Fourier transform processing is executed with a plurality of block floating point fast Fourier transform engines, the outputs of which are shifted to align the outputs of the engines to a common scale.

54. A method according to claim 39, wherein step (b) comprises filtering said plurality of digital signals generated in step (a) by means of a polyphase filter and processing the resultant filtered signals by an N-point fast Fourier transform-based processor.

55. A method according to claim 54, wherein said polyphase filter comprises a finite impulse response filter containing a plurality of filter tap stages, each of which comprises a delay memory, so that the delay memories of successive filter tap stages are coupled in series, each filter tap stage further including a coefficient memory which stores a plurality of N weighting coefficients, and the step (b) further comprises:

multiplying respective weighting coefficients stored in said coefficient memory by data sample values from a signal flow path through said delay memories;

(xvii) summing together products output by respective multipliers of said filter tap stages; and (xviii) coupling the output of said summation stage to said N-point fast-Fourier transform processor.

56. A method according to claim 55, wherein step (b) comprises Fourier transform-processing successive sets of odd and even numbered filtered data sample outputs of said polyphase filter.

57. A method according to claim 56, wherein step (b) further comprises the step of:

(xix) multiplying filtered data sample outputs of said polyphase filter by a complex exponential signal; and (xx) coupling the resultant product value to said N-point fast Fourier transform-based processor.

58. A method according to claim 39, wherein step (f) comprises applying said digital communication channel signals to an N-point fast Fourier transform processor and filtering the output of said N-point fast Fourier transform processor by a polyphase filter.

59. A transceiver apparatus for a wireless communication network containing multiple frequency communication channels for supporting communications, among a plurality of geographically distributed first sites, by way of one or more transceiver sites, said transceiver apparatus being installable at a respective one of said one or more transceiver sites and comprising:

a receiver unit which is operative to receive a plurality of said multiple frequency communication channels and output a digital signal representative of the contents of said plurality of multiple frequency communication channels;

a Fourier transform based channelizer unit which is coupled to receive a digital signal from said receiver unit and is operative to output respective digital channel signals representative of the contents of respective ones of the communication channels received by said receiver unit;

a plurality of rate conversion units, respectively associated with the digital channel signals output by said channelizer unit and being operative to output interpolated digital channel signals representative of respective ones of said digital channel signals in interpolated form, at least one of said rate conversion units including a decimating low pass filter structure, which is connected to receive the respective one of the digital channel signals, and connected to output the interpolated digital channel signals, the decimating low pass filter structure providing one of a plurality, L, of possible filter responses, and in which said decimating low pass filter structure additionally comprises a filter response selection unit, the filter response selection unit connected to the decimating low pass filter structure, to provide a filter selection signal to the decimating low pass filter structure to determine which of the L filter responses is selected as an active filter response at a given time;

a first plurality of signal processor units, respectively associated with the interpolated digital channel signals output by said rate conversion units and being operative to demodulate respective ones of said interpolated digital channel signals and to supply demodulated ones of said digital channel signals at respective output ports thereof;

a second plurality of signal processor units, respectively associated with respective ones of a plurality of incoming communication signals to be transmitted over respectively different frequency channels of said network, and being operative to process respective ones of said plurality of incoming communication signals and to supply processed ones of said communication channel signals at respective output ports thereof;

a Fourier transform,based combiner unit which is coupled to receive communication channel signals processed by said second plurality of digital signal processor units and to output a combined signal representative of the contents of the communication channel signals processed by said second plurality of digital signal processor units; and a transmitter unit which is operative to transmit a multiple frequency communication channel signal in accordance with the combined signal output by said Fourier transform-based combiner unit.

60. A transceiver apparatus according to claim 59 in which the digital channel signals comprise a preamble portion and a data portion, and wherein the filter response selection unit determines which of the L possible filter responses to select by determining a sampling phase differential during the preamble portion of its respective digital channel signal.

61. A transceiver apparatus according to claim 59 in which the digital channel signals comprise a preamble portion and a data portion, and wherein the filter response selection unit determines which one of the L possible filter responses to select by determining which one of the L possible filter responses provides an optimum response to the preamble portion of the digital channel signal.

62. A transceiver apparatus according to claim 59 in which the digital channel signals comprise a preamble portion and a data portion, and wherein the filter response selection unit additionally comprises:

a plurality, M, of filter sections, each of the M filter sections being one of the L possible filter responses, each filter section providing an intermediate interpolated digital signal.

63. A transceiver apparatus according to claim 59 in which the digital channel signals comprise a preamble portion and a data portion, and wherein the filter response selection unit additionally comprises:

a plurality, M, of filter sections, each of the M filter sections being one of the L possible filter responses, each filter section providing an intermediate interpolated digital signal;

a plurality, M, of correlation units arranged to receive the respective ones of the M intermediate interpolated digital signals and an expected preamble digital signal, and operative to correlate the M filter responses with the expected preamble digital signal, and to provide M correlator output signals;

a comparator, for receiving the M correlator output signals and determining an index, x, of the one of the correlator output signals indicating the greatest correlation between the respective one of the M intermediate interpolated digital signals and the expected preamble digital signal; and whereby the desired one of the L filter sections is selected by the filter selection unit depending upon the index, x, determined by the comparator.

64. A transceiver apparatus according to claim 63 wherein each of the L filter sections additionally comprises:

a filter clock generator, for controlling a set of times at which samples of the digital channel signal are advanced through the decimating low-pass filter.

65. A transceiver apparatus according to claim 64 wherein the filter clock generator comprises:

a digital channel signal sample index counter, connected to count the samples of the input digital channel signal, and to provide a sample index value;

a multiplier, for multiplying the sample index value by a sample rate adjustment factor, the sample rate adjustment factor depending upon a ratio of the rate of the samples of the input digital channel signal to the rate of the samples of the respective one of the intermediate interpolated digital signals.

66. A transceiver apparatus according to claim 63 wherein only the selected filter having index x is operational during the data portion of the digital channel signal.

67. A transceiver apparatus according to claim 63 additionally comprising a tracking unit, connected to receive the index value x of the currently selected one of the L filter sections, and also connected to receive at least the intermediate interpolated digital signal from the currently selected filter section, and operating to compare the response of the selected filter section against at least the response of at least one of the other L filter sections, to provide an index value adjustment amount if the said other filter section provides samples closer to the desired position of the samples nearest the symbols in the digital channel signal; and an index value adjuster, connected receive the index value, x, and the index value adjustment amount, and arranged to periodically adjust the index value by the adjustment amount.

* * * * *